(12) United States Patent
Newman et al.

(10) Patent No.: US 10,741,889 B2
(45) Date of Patent: Aug. 11, 2020

(54) MULTIPLE-ZONE THERMOCOUPLE BATTERY MODULE TEMPERATURE MONITORING SYSTEM

(71) Applicant: NIO USA, Inc., San Jose, CA (US)

(72) Inventors: Austin L. Newman, San Jose, CA (US); Alexander J. Smith, Mountain View, CA (US); Adam H. Ing, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 122 days.

(21) Appl. No.: 15/928,780

(22) Filed: Mar. 22, 2018

(65) Prior Publication Data

US 2019/0296407 A1    Sep. 26, 2019

(51) Int. Cl.
*H01M 10/48* (2006.01)
*H01M 10/63* (2014.01)
(Continued)

(52) U.S. Cl.
CPC ....... *H01M 10/486* (2013.01); *H01M 10/482* (2013.01); *H01M 10/613* (2015.04);
(Continued)

(58) Field of Classification Search
CPC ........... H01M 10/486; H01M 10/6551; H01M 10/482; H01M 10/6555; H01M 10/613;
(Continued)

(56) References Cited

U.S. PATENT DOCUMENTS

| 4,448,863 A | 5/1984 | Terrell |
| 5,364,203 A | 11/1994 | Ishikawa |

(Continued)

FOREIGN PATENT DOCUMENTS

| DE | 102010033806 | 2/2012 |
| EP | 1026770 | 8/2000 |

(Continued)

OTHER PUBLICATIONS

Official Action for U.S. Appl. No. 15/900,079, dated Nov. 15, 2019 12 pages.

(Continued)

*Primary Examiner* — Gary D Harris
(74) *Attorney, Agent, or Firm* — Sheridan Ross P.C.

(57) ABSTRACT

A multiple-zone thermocouple battery module temperature monitoring system is provided configured to determine a plurality of temperatures along a depth of the battery module at different locations. The system may include a number of temperature probes each including a first temperature sensor oriented at a base of a group of cells in the module and a second temperature sensor oriented at an upper portion of the group of cells in the module. Providing upper and lower battery cell temperature sensors in each probe of the system allows a battery management system to detect and record a temperature gradient of the battery cells in the module at a number of different locations. These recordings can determine a gradient and temperature difference between the upper and lower battery cell portions over an operable threshold difference, and command a thermal management system to return the battery module to limits within the operable threshold.

14 Claims, 25 Drawing Sheets

(51) Int. Cl.
*H01M 10/625* (2014.01)
*H01M 10/613* (2014.01)
*H01M 10/6555* (2014.01)
*H01M 10/6551* (2014.01)

(52) U.S. Cl.
CPC ......... *H01M 10/625* (2015.04); *H01M 10/63* (2015.04); *H01M 10/6551* (2015.04); *H01M 10/6555* (2015.04); *H01M 2220/20* (2013.01)

(58) Field of Classification Search
CPC ............... H01M 10/625; H01M 10/63; H01M 2220/20; H01M 2010/4271; H01M 2/1077; H01M 10/6554; H01M 10/617; H01M 10/425; H01M 10/4207
USPC .......................................................... 429/50
See application file for complete search history.

(56) References Cited

U.S. PATENT DOCUMENTS

| | | |
|---|---|---|
| 6,381,122 B2 | 4/2002 | Wagener |
| 6,420,655 B1 | 7/2002 | Yang et al. |
| 6,619,005 B1 | 9/2003 | Chen |
| 6,672,914 B1 | 1/2004 | Claprood |
| 7,007,471 B2 | 3/2006 | Sinclair |
| 7,489,105 B2 | 2/2009 | Weinstein et al. |
| 7,820,319 B2 | 10/2010 | Mehta et al. |
| 8,586,226 B2 | 11/2013 | Hashida |
| 8,893,714 B2 | 11/2014 | Ricci et al. |
| 8,920,955 B1 | 12/2014 | Chuang et al. |
| 9,160,040 B2 | 10/2015 | Koenekamp et al. |
| 9,208,756 B2 | 12/2015 | Isaac |
| 9,287,200 B2 | 3/2016 | Higgins, III |
| 9,444,122 B2 | 9/2016 | Zheng et al. |
| 9,472,794 B1 | 10/2016 | Zakhrayan et al. |
| 9,545,010 B2 | 1/2017 | Coakley et al. |
| 9,548,476 B2 | 1/2017 | Cicero et al. |
| 9,577,240 B2 | 2/2017 | Choi et al. |
| 9,579,963 B2 | 2/2017 | Landgraf |
| 2008/0272742 A1 | 11/2008 | Hart et al. |
| 2010/0092849 A1 | 4/2010 | Wood et al. |
| 2010/0247996 A1 | 9/2010 | Ijaz et al. |
| 2011/0052949 A1 | 3/2011 | Byun et al. |
| 2011/0068623 A1 | 3/2011 | Kenington |
| 2012/0003508 A1 | 1/2012 | Narbonne et al. |
| 2012/0100761 A1 | 4/2012 | Große et al. |
| 2012/0121949 A1 | 5/2012 | Eberhard et al. |
| 2013/0202928 A1 | 8/2013 | Beulque et al. |
| 2013/0320918 A1* | 12/2013 | Ohmer ............. H01M 10/4207 320/107 |
| 2014/0113506 A1 | 4/2014 | Jones |
| 2014/0154539 A1 | 6/2014 | Kwok et al. |
| 2014/0234683 A1 | 8/2014 | Sweney |
| 2014/0255750 A1 | 9/2014 | Jan et al. |
| 2016/0020446 A1 | 1/2016 | Zheng et al. |
| 2016/0093846 A1 | 3/2016 | Malinski et al. |
| 2017/0018750 A1 | 1/2017 | Wintner |
| 2017/0040646 A1* | 2/2017 | Beaston ............. H01M 10/425 |
| 2017/0358832 A1 | 12/2017 | Sun et al. |

FOREIGN PATENT DOCUMENTS

| | | |
|---|---|---|
| EP | 1990849 | 11/2008 |
| EP | 2343755 | 7/2011 |
| WO | WO 2016/070801 | 5/2016 |

OTHER PUBLICATIONS

Official Action for U.S. Appl. No. 15/928,707, dated Oct. 3, 2019 10 pages.
Official Action for U.S. Appl. No. 15/928,738, dated Oct. 23, 2019 14 pages.
Official Action for U.S. Appl. No. 15/878,312, dated Aug. 21, 2019 12 pages.
U.S. Appl. No. 15/900,079, filed Feb. 20, 2018, Smith et al.
U.S. Appl. No. 15/928,707, filed Mar. 22, 2018, Newman et al.
U.S. Appl. No. 15/928,738, filed Mar. 22, 2018, Newman et al.
U.S. Appl. No. 15/878,312, filed Jan. 23, 2018, Newman et al.
U.S. Appl. No. 15/922,455, filed Mar. 15, 2018, Newman et al.
"Heat Staking, Staking plastic using heat and pressure," Amada, 2015, retrieved from http://www.amadamiyachi.com/servlet/servlet.FileDownload?retURL=%2Fapex%2Feducationalresources_articles&file=01580000001dQXV, 2 pages.
"OPTIMA™ Batteries," Optima Batteries, Inc., 2012, 9 pages.
Official Action for U.S. Appl. No. 15/928,738, dated May 15, 2019 6 pages, Restriction Requirement.
Notice of Allowance for U.S. Appl. No. 15/928,707, dated Feb. 6, 2020 7 pages.
Notice of Allowance for U.S. Appl. No. 15/878,312, dated Dec. 4, 2019 7 pages.
Official Action for U.S. Appl. No. 15/922,455, dated Dec. 30, 2019 14 pages.

* cited by examiner

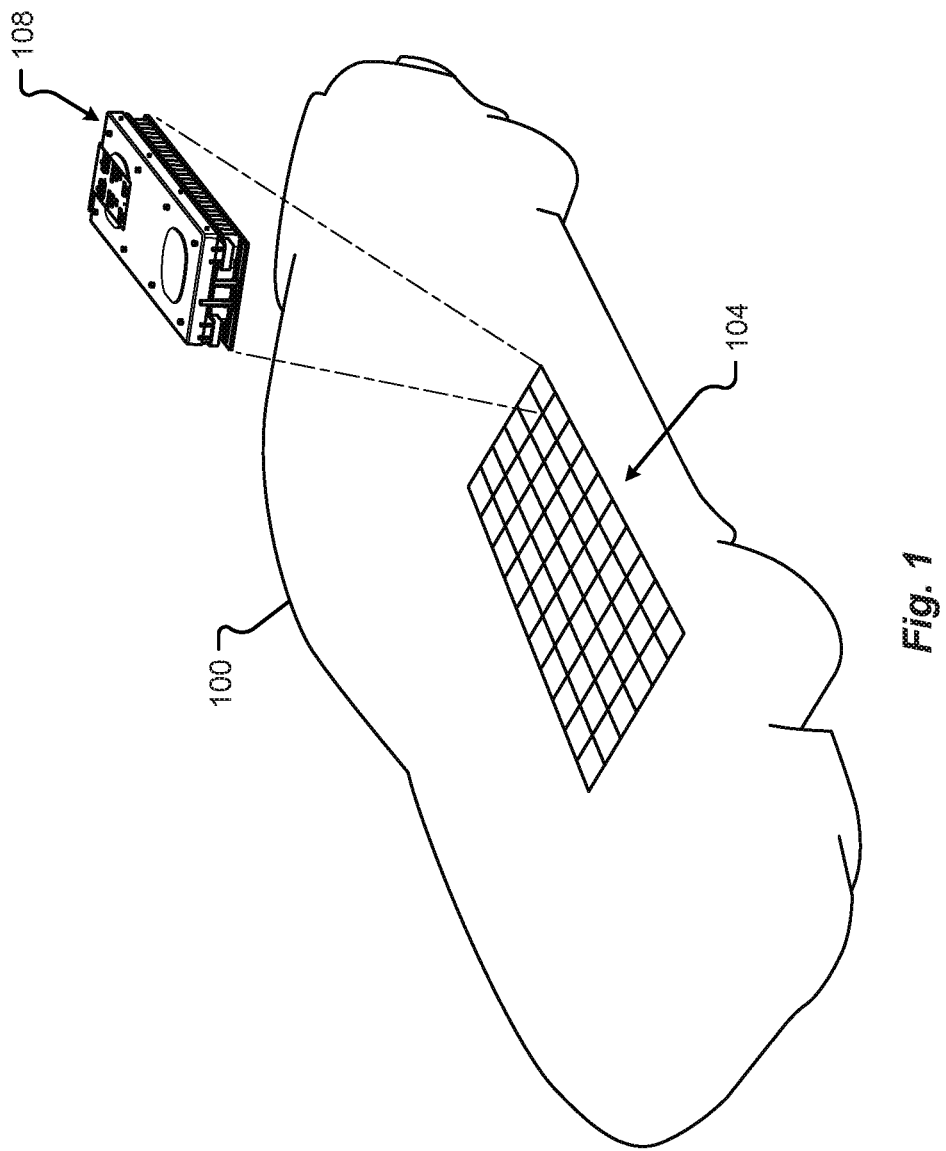

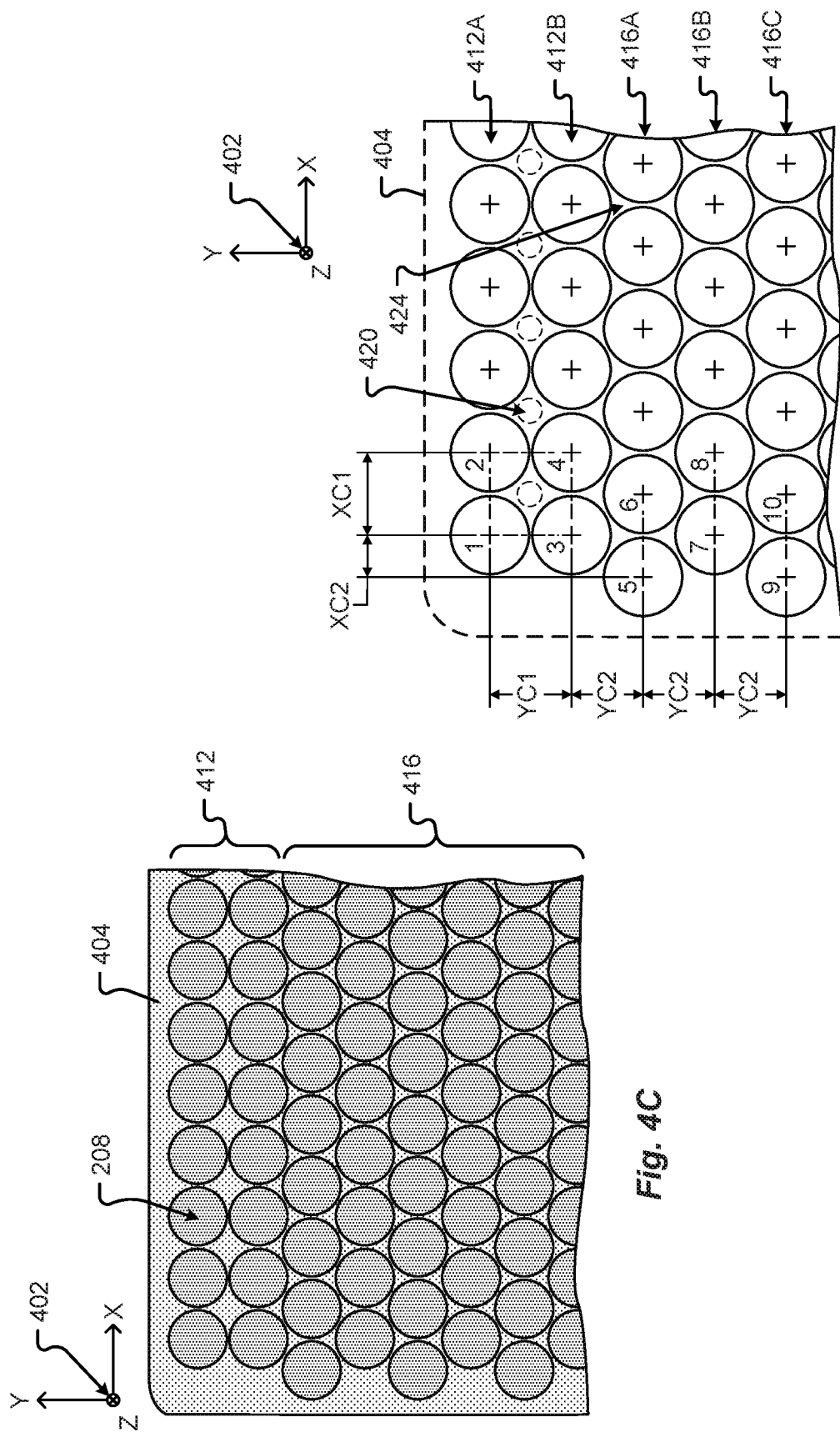

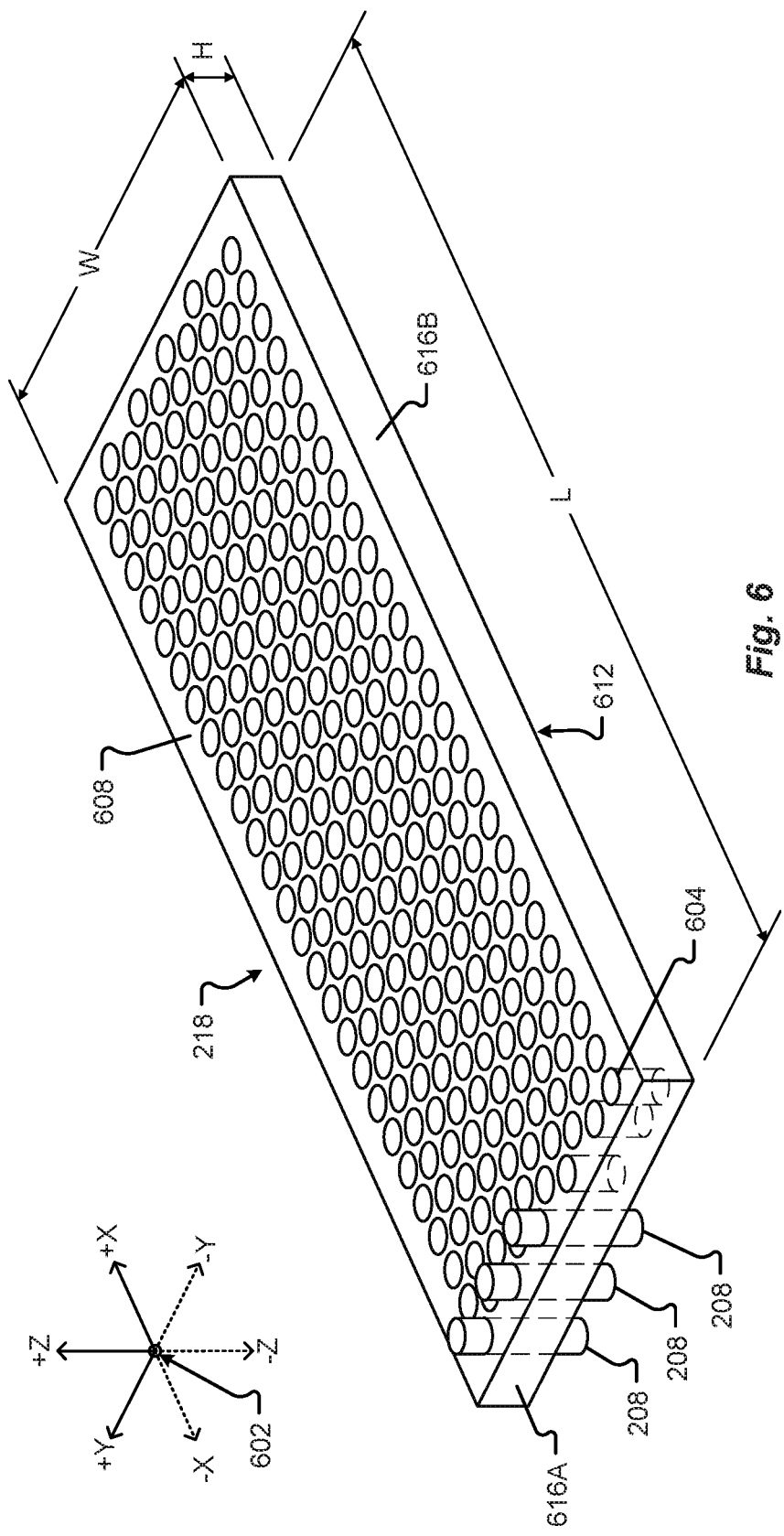

MULTIPLE-ZONE THERMOCOUPLE BATTERY MODULE TEMPERATURE MONITORING SYSTEM

FIELD

The present disclosure is generally directed to energy storage devices, in particular, toward batteries and battery modules for electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of on board energy storage devices. These vehicle energy storage devices are generally arranged in the form of electrically interconnected individual battery modules containing a number of individual battery cells. The battery modules are generally connected to an electrical control system to provide a desired available voltage, ampere-hour, and/or other electrical characteristics to a vehicle. In some cases, one or more of the battery modules in a vehicle can be connected to a battery management system that is configured to monitor the voltage sensed from each cell in the battery module and/or the entire battery.

Electric vehicles are dependent on the integrity and reliability of the on board electrical energy power supply and energy storage devices. Typical vehicle energy storage devices include a battery that is composed of a number of battery modules and each of these battery modules may include tens, if not hundreds, of battery cells. As can be appreciated, the chance of failure in a system is proportionate to the number of components, interconnections, and connection modes, etc., in the energy storage devices of a vehicle.

BRIEF DESCRIPTION OF THE DRAWINGS

FIG. 1 shows a schematic perspective view of an electrical energy storage system in accordance with embodiments of the present disclosure;

FIG. 4C shows a detail broken section plan view of the battery cells and structural support of FIG. 4B;

FIG. 4D shows a schematic detail broken section plan view of the spacing for the battery cells and structural support shown in FIG. 4C;

FIG. 6 shows a perspective view of a battery cell retaining form and/or gasket in accordance with embodiments of the present disclosure;

DETAILED DESCRIPTION

Figure 2A:
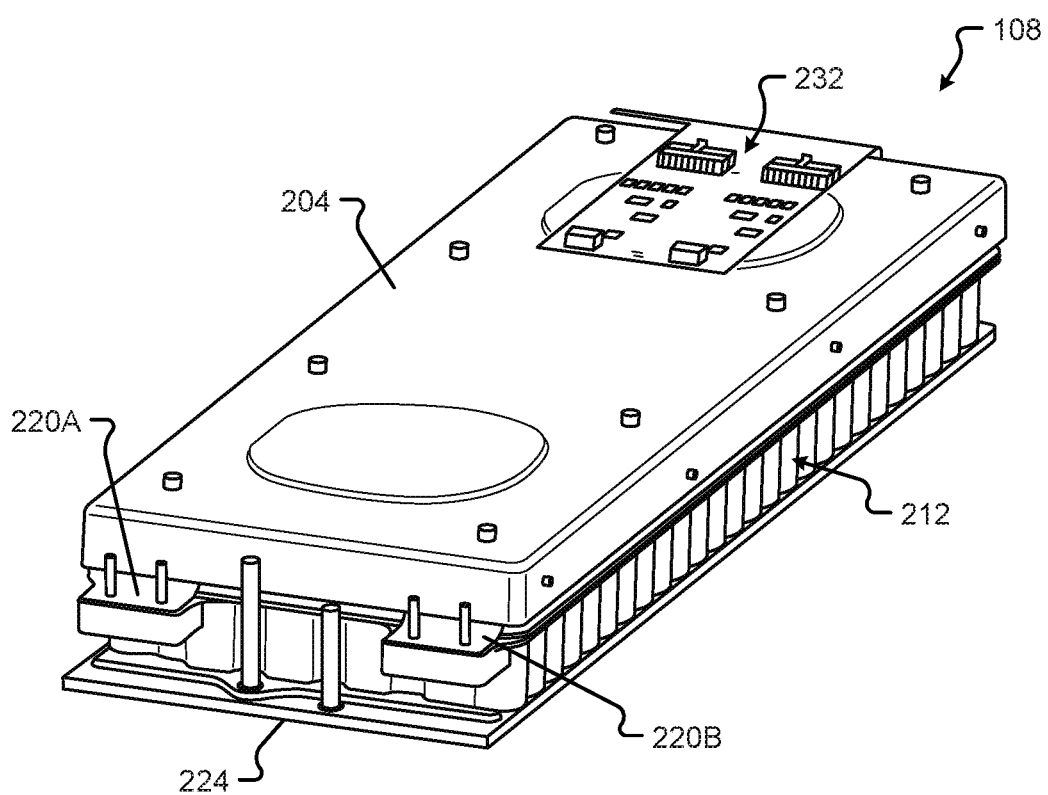
FIG. 2A shows a perspective view of a battery module in accordance with embodiments of the present disclosure.

Embodiments of the present disclosure will be described in connection with electrical energy storage devices, and in some embodiments the construction, structure, and arrangement of components making up a battery module for an electric vehicle drive system.

An electrical energy storage device for a vehicle may include at least one battery including a number of battery modules electrically interconnected with one another to provide electromotive force for the electrical drive system of a vehicle to operate. Each battery module in the at least one battery can include any number of battery cells contained and/or arranged within a battery module housing. Conventional battery module housings may include a base and a cover which are attached at a periphery of the battery module via one or more fasteners. Because these conventional housings are designed to maximize the number of battery cells contained therein, all of the fasteners and attachments are moved to an outer periphery of the housing, and the cover and base are generally made from thick plastic or metal to provide structural rigidity and integrity. As can be appreciated, these conventional housings (e.g., covers, bases, etc.) can be large, heavy, and costly. Furthermore, most battery modules include external safety structures to provide impact resistance.

Typically, the battery is also one of the largest, heaviest, and most expensive single components of an electric vehicle. As can be appreciated, any reduction in size and/or weight can have significant cost savings. The present disclosure describes a unified battery module including an integrated battery cell structural support system made up of structural foam, adhesive, and interconnecting carrier halves. In some embodiments, the present disclosure describes a method of forming a lightweight unified battery module including attaching separate battery module carrier portions together (via an adhesive flange joint) and filling a cavity inside the portions with a structural foam.

In one embodiment, the unified battery module may include a lower carrier portion and an upper carrier portion configured to surround one or more battery cells packed in a specific arrangement. The carrier portions may be temporarily joined together at a contacting flange via an adhesive and then permanently interconnected to one another via a structural foam, or other structural adhesive, injected between the battery cells and an inside of the adhesively-joined carrier portions.

Among other things, the unified battery module provides impact resistance by dissipating an impact across a structure (e.g., made up of solidified, or cured, structural foam etc.) encompassing, or at least partially surrounding, the battery cells inside the battery module. In some cases, the battery cells may behave as connection nodes, or bridges, to which the structural foam adheres and forms a protective internal structure for the battery module. The structure may be configured to flexibly move in response to an applied force or impact. This structural foam may act as a structural adhesive, thermal insulator, and even a dielectric barrier within the module. In some embodiments, the base of the module may be bonded to a cooling, or cold, plate using a structural adhesive that provides a thermal conductor (e.g., thermal interface material), and a di-electric barrier between the elements.

The upper and lower carrier portions of the battery module may be configured as thin dielectric (e.g., plastic, composite, or other electrically nonconductive or insulative material, etc.) components that house the battery cells and the structural foam. When joined together and filled with the structural foam, the carrier portions and the foam provide a lightweight battery module configured to absorb shock, impact, compression, and/or any other destructive force.

Among other things, the present disclosure describes manufacturing methods, construction, and an arrangement of components that fuse together forming a battery module. At least one benefit of the embodiments described herein is observed in the event of a crash scenario. For example, by mechanically coupling the cells together (e.g., via the structural adhesive) in the arrangement described, the load, force, or impact energy from a crash is distributed across a larger body rather than focused on a single battery cell or small group of battery cells. As can be appreciated, this distribution of forces provides a safer battery module assembly and battery for a vehicle since it is less likely that a single cell will be damaged to the extent that it would cause a thermal event or a non-passive failure in the energy storage device of the vehicle.

In some embodiments, during the assembly of a battery module, for instance, structural and/or adhesive foam may be injected from one or more sides of the battery module to provide rigidity, strength, insulation, and exact tolerance "no slop" fits between cells. At least one advantage to side-filling is that more of the structural and/or adhesive foam, while in a liquid state, is allowed to enter the battery module cavity at a faster rate (e.g., by providing an increased open space between the curved bodies of rows of battery cells, rather than via a space between only four adjacent battery cells). However, filling the battery module with foam from the side without any control structure could allow foam to cover the positive terminal, leak through openings, and otherwise disperse throughout the battery module in an uneven manner. Among other things, the present disclosure provides a control structure configured to contain foam in a particular volume of the battery module and protect portions of the battery cells and module from uncontrolled filling or leakage.

In one embodiment, the present disclosure provides a form having an array of die-cut apertures to accommodate the battery cells in the battery module. Each of the die-cut apertures may be configured to tightly fit around a battery cell (e.g., the apertures may be undersized or have a smaller diameter than a diameter of the battery cell—interference fit, be matched to the size of the battery cell diameter, and/or include a slip fit, etc.). This tight fit may prevent foam injected into the housing from extending beyond a designed level. In one embodiment, as the foam solidifies or hardens and expands, the form may be moved along an axis of the battery module a known amount.

The form may additionally contact one or more sides of the housing in a similar interference, tight, or slip fit (as described in conjunction with the apertures) providing a gasket that prevents material from pouring out of the connectors or other portions of the module. In some embodiments, the form may be made from a relatively thin amount of material (e.g., closed-cell foam, plastic, silicone, etc.).

In some embodiments, the form may be used to hold the battery cells in alignment with one another prior to filling with structural and/or adhesive foam and then may remain in place after foam has been injected.

The present disclosure describes a number of dielectric bolt compression sleeve mounts that interconnect a cover to a base of a battery module housing inside a periphery of the battery module and an area including battery cells. Among other things, moving the attachment features inside the battery cell array can provide a more rigid structure, allow for lighter materials (e.g., thinner cross-sections, composites, polymers, etc.) to be used, and allow a densely-packed battery comprising a number of battery modules in intimate or near-intimate contact with one another.

In some embodiments, the battery module may be held together via a number of dielectric compression sleeve mounts, or standoffs. Each sleeve mount may be configured as a substantially cylindrical (or other shaped) tube extending from a top of the battery module to a bottom of the battery module. In one embodiment, the sleeve mount may provide a fastener contact load surface at the top of the battery module, a compression region (e.g., along the length of the sleeve), and a mount frame contact load surface at the bottom of the battery module. The sleeve mount may be sized to provide a clamp height for the battery module such that when a fastener is inserted through the sleeve and tightened against the mount frame, a clamping force is provided holding the cover to the base of the housing, but any additional compressive force imparted by the fastener is taken up by the sleeve (preventing displacement of the cover below a predetermined height).

The sleeves may be made from Garolite G10, fiberglass, ceramic coated materials, fiberglass-epoxy laminates, etc. In one embodiment, one or more of the sleeves may be used as an assembly interface configured to interconnect with assembly equipment. For example, the sleeves may be configured to receive quick-release pins that when inserted into the sleeve compresses a ball-detent into the shaft of the pin and releases from a compressed position when the ball-detent passes through the sleeve (e.g., beyond the mount frame contact load surface). In some cases, the quick-release pins may be a part of a robot end-effector, pick-and-place, or other tool, and can be used to move or manipulate the battery module during assembly. Being disposed on the inside of the battery module periphery, the sleeves allow for closer packaging and automated assembly operations to be performed.

Not only does the bolt sleeve connect the upper and lower portions of the battery module housing, but the sleeves may act as a compression limiter, and create a dielectric barrier between the bolt and the live cell casings. The sleeves can also serve as a manufacturing aid, helping align each battery cell when building a battery module. In some embodiments, the sleeves may function as a structural anchor when structural foam and/or adhesive is added (the sleeve and plastic may be weak (e.g., in non-compression scenarios, etc.) until a major portion of the surface area of the sleeve encompassed by a filler material (e.g., the structural adhesive, etc.) creating a reinforced bar in the assembly of components.

In some embodiments, the present disclosure provides a battery module including a staggered battery cell internal array with two-dimensional inline terminal edges. The battery cells in a module may be staggered in an internal array, such that a first row of cells in a line are spaced apart, or offset, in a first direction from an immediately adjacent second row of cells in a line, and wherein a first cell in the second row of cells is offset from a first cell in the first row of cells in a second direction orthogonal to the first direction. In some cases, at least two adjacent rows in the module may include cells that are offset from one another but aligned in one direction (e.g., the second direction). Among other things, this arrangement may provide an engineered space between a group of four adjacent battery cells for fasteners, reinforcement structure, structural foam insert holes, thermocouples, and/or other objects. This design of combining battery cell arrangements creates a cross pack that saves space by moving conventional external components to an inside area of the battery module rather than taking up an increased amount of space external to the inside area. Moreover, the proposed arrangement maximizes the density and number of battery cells inside a battery module while moving fasteners and other features to an outermost point (inside battery module periphery) in between two rows of battery cells making up the terminal edges of the module. Contrary to conventional battery cell packing, where a battery cell is removed for fasteners, the battery cell spacing is increased to make room for fasteners, or mounting features are pushed to an outside of the battery module, maintaining a homogeneous packing structure, the present disclosure provides a densely packed array of "staggered" internal rows and outermost rows arranged inline to receive battery module and/or cover mounting features (e.g., fasteners, etc.). In some embodiments, larger battery modules (e.g., having an increased number of rows of battery cells, etc.) may include additional compression sleeves for mounting and/or fastening disposed in the middle of the battery module. For instance, the pattern of staggered battery cells (disposed internal to the outermost rows of the battery module) may be interrupted by two or more rows of battery cells arranged in a similar, if not identical, pattern as the two-dimensional inline terminal edges. Continuing this example, the pattern of battery cells may switch from one arrangement of cells to another across a width and/or length of the battery module. For example, across the width and/or length of the battery module, the pattern of battery cells (e.g., in a large battery module) may include aligned inline cell rows disposed at a first terminal edge (including spaces to receive compression sleeves, etc.), a staggered arrangement of cells approaching the center of the battery module from the first terminal edge, aligned inline cell rows disposed at the center of the battery module (including spaces to receive additional compression sleeves, etc.), a staggered arrangement of cells approaching a second terminal edge (e.g., in a direction away from the center of the battery module), and aligned inline cell rows disposed at the second terminal edge (including spaces to receive compression sleeves, etc.). As can be appreciated, any combination of arrangements of battery cell patterns in the battery module may be selected to accommodate a closer packing of cells (e.g., greater cell density per module, etc.) and/or provide additional spaces to receive compression sleeves, thermocouples, structural material/adhesive, etc.

As can be appreciated, because the battery is one of the largest, heaviest, and most expensive single components of an electric vehicle, any reduction in size and/or weight can have significant cost savings. In some embodiments, the present disclosure describes a lightweight battery cell location frame that is retained in the housing of a battery module. The battery cell location frame may be configured to locate and position each of the battery cells in the battery module prior to the insertion of a structural material and remain in place after assembly. The battery cell location frame may be a part of, or integral to, the housing and/or cover. In one embodiment, the battery cell location frame. In one embodiment, the frame may include a number of standoffs (e.g., three, six, etc.) surrounding a receptacle, or opening, that is configured to receive a battery cell. Each standoff may be joined by a bridge having a clearance volume disposed thereunder. The opening may be sized (e.g., oversized, or sized larger than the battery cell diameter, etc.) to allow the battery cell to be inserted therein from either side of the frame. In some cases, the receptacle may be oversized to receive a battery cell and accommodate for tolerance differences, thermal expansion, and/or receive a portion of the structural material. The standoffs may provide a number of structural material flow paths around a portion of the negative terminal end of the battery cell such that structural material injected into the battery module and flowing between battery cells may disperse under, through, and/or between these flow paths. In some embodiments, one or more of the standoffs may include a through hole for aeration of adhesive, such that an inserted frame may force adhesive into and through at least a portion of the through hole. This small hole disposed in between battery cells passes completely through the plastic. Among other things, the small hole provides a potential passage for air to escape (e.g., as air bubbles under the battery cells are undesirable) and depending on the fill height, structural material can flow up the hole and over the top surface of the standoff creating a structural "rivet" feature once cured. In one embodiment, a thermal adhesive or structural foam can be injected into the battery module (at a bottom, or lower, portion) and as the battery cells are seated in contact with glass (or dielectric) beads/spheres, the adhesive/foam may be forced into an empty volume of the flow path (under the bridges). Among other things, this volume may allow the material to dissipate or move from under each battery cell into the volume and allow the battery cells to move in contact with the glass beads/spheres providing an exact height for each cell in the module. In addition, the battery cell location frame also sets and maintains a desired spacing between the battery cells in the battery module. Moreover, the battery cell location frame provides an optimum distance between battery cells to allow structural foam (e.g., dielectric structural foam, etc.) to flow therebetween.

In some embodiments, the present disclosure describes a tapered busbar increasing in size from a first cross-sectional area at a first connection point to a larger cross-sectional area at a second and furthest connection point. Among other things, the tapered shape of the busbar may accommodate for increased energy/charge transfer, current flow, reduce overall resistance, and/or maintain a uniform current density along a length of the busbar. For instance, in a battery module arrangement where all of the cells in a row are connected to one another in series and then attached to the tapered busbar in sequential parallel rows, the busbar at the last parallel row is carrying the entire current of the module. The tapered busbar described in the present disclosure provides a busbar that is optimally sized for a specific current density defined at each position along its length. This tapered shape saves weight, material, and costs. In a system where every unnecessary additional gram negatively affects electric vehicle energy consumption and travel costs, the savings in weight for each module (e.g., two high voltage busbars per module) gained by the present disclosure offers a significant benefit to the overall efficiency of an electric vehicle. In addition, the attachment of the tapered busbar to the upper carrier makes the tapered busbar a structural member. For instance, the tapered busbar may be fastened to the upper carrier on a first side of the battery module via a number of mount points disposed along a length of the busbar and the end of the tapered busbar is attached to an orthogonal second side of the lower carrier providing a cantilevered reinforcement rib for the battery module (e.g., in an anatomy comparison, the busbar may act similarly to a bone and the upper carrier shell may be the skin).

In one embodiment, the present disclosure provides a reduced-size redundant connection to a high voltage busbar of a battery module via multiple connection studs. Conventional electric vehicle battery interconnections, or busbars, may be arranged as large metal strips configured to generally interconnect battery cells in a linear fashion. These conventional interconnections can be large, heavy, and costly. Moreover, conventional battery modules typically include a single positive and negative interconnection terminal. These terminals can be the source of a single point of failure in an electrically interconnected system. For instance, if the interconnection to the positive and/or negative terminal is lost, the system may not function properly. Rather than employing a single, large stud for connection to a particular (e.g., positive/negative) terminal, the present disclosure describes two or more connection studs per terminal, each having a reduced overall size and/or cross-sectional area. The reduced size of each stud allows the interconnection to make use of multiple connectors also having a reduced size. Among other things, this design provides redundancy in connection to the battery module and reduces the overall size of components connecting to the battery module. The multiple studs (e.g., two or more) of the present disclosure may provide a compact, redundant electrical interconnection to a critical area of the battery module and vehicle. Additionally or alternatively, the multiple connection studs act as a 2-way to 4-way for locating the busbars, the studs act as locating features when building the module (e.g., connecting the upper and lower carrier), and the theoretical clamp loading to reduce electrical losses is greater with two small studs than one large one stud, especially when maintaining a slim profile battery module.

In some embodiments, the present disclosure provides a system for interconnecting all of the battery cells in a battery module from a single side of the battery cell and module. Conventional battery module cell-to-cell interconnections may require positive and negative busbars to overlap one another. This type of overlapping generally requires some offset distance and/or a dielectric layer to separate the opposing terminal connections to insulate and/or prevent shorting of the positive and negative terminals. However, in the event of a fire, a mechanical break, and/or other interruption to this offset distance and/or dielectric layer, a number of battery cells may short and completely destroy a battery module. The cell busbar system of the present disclosure comprises a number of thin formed strips arranged to interconnect individual battery cells in a row together in series and each row in parallel along a length of the battery module. In particular, the cell busbar system may include two high voltage (or edge) strips and a number of cell-to-cell (or internal) strips electrically interconnected to the edge strips. The edge strips may include a number of interconnection legs configured to attach to a terminal of an immediately adjacent battery cell connecting a row of cells to other rows of cells at a tapered busbar, in parallel. The internal strips include interconnection legs configured to attach to a positive terminal of a first battery cell and a negative terminal of a second immediately adjacent battery in a first row (in series) and subsequent interconnection legs offset and aligned with a second row configured to attach to a positive terminal of a first battery cell and a negative terminal of a second immediately adjacent battery in the second row (in series), and so on, connecting rows in parallel to the edge strips. The interconnection legs, or contact fingers, may be configured to be directly connected, e.g., via a welding operation, etc. to the terminals of the battery cells. Among other things, this direct connection provides an all-in-one interconnection system that does not require additional wire bonds, cables, or other assembly/interconnection operations, which can be weak and/or costly. These interconnection busbars may include separate formed connectors to attach specifically to the main battery module busbar. The battery module busbar may be tapered as described herein. The interconnection of the battery cells may be patterned with a single layer of current collectors. This system and arrangement of interconnection allows for a lower profile battery module and reduced overall size and weight as opposed to conventional modules. In addition, as there is no direct overlap between positive and negative interconnections, the proposed system and arrangement removes the need for a dielectric protection layer, which may melt or damage causing an electrical short (conventional system). As can be appreciated, the proposed system provides increased safety and reliability of the battery module. Additionally or alternatively, the present disclosure provides a most direct current path to connect cells in series and the common rail may just be used for balancing currents as well as a back-up connection path in case a battery cell is disconnected from the circuit. Additionally, the present disclosure provides a number of incorporated expansion joints and locating features into the battery cell busbar design to ensure the interconnections land perfectly on every cell and can account for manufacturing tolerances as well as different thermal expansion rates. The additional surface area of the "common rail" portion of the bus bar also provides us with additional thermal mass and surface area for cooling. By having this feature, the present disclosure allows for tuning of the bus-bar thickness to be thinner which is required for laser welding operations but counter to high current operation.

In one embodiment, each of the strips described above may be attached to a dielectric cover, housing, or frame, for example, via a number of heat stakes or other mechanical attachments. The present disclosure builds on the design of the single side battery cell busbar system described above, and herein, providing a busbar strip design that includes special features to allow the for controlled sizing of the strips. In particular, the battery cell busbar may include one or more preformed, or bent, portions (e.g., knees, etc.) disposed between affixing points (e.g., heat stake or location apertures). The preformed portions may serve as a spring configured to control a change in dimension between the location apertures. The preformed portions may control deformation (e.g., thermal expansion/contraction) of the busbar in a planar, or substantially planar, direction. In some embodiments, the "knee" may be shaped as a flexure (e.g., holding hands), a reduced cross-sectional contact, etc., including a controlled flex area. In one embodiment, as the installed battery module may be subjected to heat (e.g., through normal operation, environmental exposure, etc.), the busbar may expand or contract at a different rate than the battery cover. In this instance, the preformed portion may move along the planar surface of the busbar to control movement along the portion. In other words, the busbar may include a portion or shape disposed between fixed points that are configured to bend in a controlled manner in response to temperature changes. Additionally or alternatively, the performed or bent portions may also act as a spring and/or as a tolerance compensator during assembly operations providing a substantially flexible busbar system.

It is an aspect of the present disclosure that the interconnection from the battery cell busbars, or connections, to each high voltage busbar on the battery module may be configured as strip having a series of connection tabs attached thereto, in the form of a "comb." The comb may comprise a continuous strip of conductive material extending along a length of the high voltage busbar and having a number of legs extending (e.g., orthogonally, or at some other angle, etc.) from the continuous strip. Each leg may represent a connection point for a row of battery cells (e.g., connected in series) in the battery module, and each pair of legs may include a void disposed therebetween. For instance, each leg may be spaced apart a distance from an adjacent leg. In one embodiment, the legs may be bent at approximately 90 degrees from the continuous strip. Among other things, the present disclosure describes a busbar comb and flat weld contact zone for interconnecting a battery cell busbar connections to a high voltage busbar. In some embodiments, the battery cell busbar connections may be disposed on a first side of a battery module and the high voltage busbar may be disposed on a second (e.g., orthogonal) side of the battery module. In this case, the alignment between the battery cell busbars and the high voltage busbar for electrical interconnection is critical. In some embodiments, the individual contact legs extending from the continuous strip provides separate, flexible, moveable, and/or manipulatable contact pads for laser welding or attaching the comb (and the interconnected battery cells) to the high voltage busbar. In some cases, a number of weld spots (e.g., four spots per pad, 1 mm in diameter in a grid, similar to the arrangement of identification dots etched or printed on the face of playing dice) may be used to attach each pad. Conventional busbar interconnections do not, among other things, include a busbar comb comprising a continuous strip of material that is in contact with battery cell interconnections on a first surface of a battery module and includes a plurality of bent tabs that are independently flexible to one another providing a number of attachment points to a high voltage busbar on a second orthogonal surface of the battery module, as described in the present disclosure.

The present disclosure provides a battery cell cover comprising a frame for supporting a planar busbar system and maintaining a separation between connected positive and negative terminals in a single side cell busbar system. The single side cell busbar system may include all positive and negative connections on one end of the battery cells in a battery module. Each interconnection includes an integrated contact finger configured to weld, or otherwise directly attach, to the battery cell. In some embodiments, the present disclosure provides a dielectric battery cell cover, or frame, that may include a cutout, recess, and/or other receptacle, configured to receive the positive or negative terminal interconnection and mechanically isolate the terminal from another part of the battery cell (e.g., other terminal) or other interconnection (e.g., opposite busbar) via a mechanical separation, bridge, or other portion of dielectric material. As the single side cell busbar system includes substantially planar and flexible metal parts, each contact finger (e.g., terminal strip) may be bent, or formed, to fit inside the receiving areas of the cover. A protrusion, or pin, feature may maintain a distance between battery cells and/or prevent shifting of the battery cells during assembly, installation, and/or use. In one embodiment, each of the contact fingers may be isolated from one another, positively located to an appropriate terminal of each battery cell in the battery module, and protected from damage and/or incidental contact between adjacent opposite polarity terminals. On the ground side, the dielectric cover double grounds the two cells next to one another.

Among other things, the present disclosure provides a dielectric battery cell cover, or frame, including a number of protrusions, or raised location features, configured to insert into respective location apertures of the substantially planar single side cell busbar system. The protrusions may serve to positively locate the single side cell busbar system and be configured to deform (e.g., under ultrasonic, heat staking, etc., and/or other melting assembly operation) permanently attaching the busbar system to the cover. A number of heat stake features may be incorporated in the cover, to positively locate a group of busbar system contact fingers relative to a clearance receptacle in the cover. This positive location may eliminate tolerance stack-up in the attachment of a substantially planar busbar system and contact fingers to spaced battery cells. Further, the heat-staking of metal pieces onto a plastic carrier also helps add structure to the battery module assembly providing a "skin on bones" reinforcement. In some embodiments, the dielectric battery cell cover may be manufactured from a nylon glass filled material. Using nylon glass fill may allow the features to be ultrasonically welded, or deformed, such that a head or button is formed from the location feature having a diameter greater than the location aperture of the busbar, retaining the busbar in place, via a non-brittle connection point. Moreover, the arrangement of the location features may provide poka-yoke features to ensure the connections are lined up properly and to allow for quick and easy assembly and installation. Additionally or alternatively, the location features eliminate the need for separate fasteners.

In one embodiment, the battery module cover may include a number of protrusions, or features, that extend from the cover into a space between adjacent battery cells in the battery module (when assembled). These protrusions may provide an internal attachment between the cover and the base of a battery module housing when contacting an inserted structural material or adhesive. For example, upon filling the spaces between the battery cells of an assembled battery module with structural material (e.g., structural foam, epoxy, etc.), the structural material may flow between the battery cells and make contact with the protrusions. Once the structural material cures, the cured material may adhere to the protrusions and the cover may be retained, or held, in place. In one embodiment, the structural material may adhere to the base, the protrusions, and one or more battery cells in the battery module. In some embodiments, the protrusions may include a number of holes, ribs, webs, or other features configured to better adhere to a portion of the structural material inserted into the battery module. Among other things, this approach can reduce the number of components needed to complete the module, provide a simplified assembly (e.g., requiring no additional fasteners, etc.), increase strength of the battery module while providing a lighter weight module, and provide a seamless appearance to the module.

The present disclosure provides a multiple-zone thermocouple battery module temperature monitoring system. As can be appreciated, monitoring the temperature of an electric vehicle battery (e.g., battery modules and battery cells, etc.) is critical to preventing failure and maintaining operability of the electric vehicle. Among other things, the temperature of the battery may be used to determine expected performance, predict failures, and provide thermal fault warnings. Drastic temperature differences between a first end of a battery cell and a second opposite end of the battery cell can cause premature failure and reduced operational life of the battery cell, battery module, and/or the battery. As described herein, the battery module may be arranged to include a number of internal spaces to receive one or more thermocouples and/or temperature probes. The spaces may be disposed between multiple adjacent battery cells in the battery module. In some cases, these thermocouples may be configured to determine a plurality of temperatures along a depth of the battery module (e.g., measuring the temperature of various strata in the battery module, etc.). The measurements taken by the thermocouples, or thermistors, may be used to determine a complete temperature gradient or map of the battery module. In some embodiments, this temperature map may be used to predict failure, determine the area of failure, and/or identify consequential damage in the vehicle as a result of high temperatures observed in a particular region of the battery module. In one embodiment, for example, when a battery module includes a single side cooling system/plate (e.g., cooling the battery cells at only a first end or side of the battery cell) the temperature variation between the top and bottom of the battery cell may be greater than a recommended operable threshold difference. When a battery cell is maintained at inconsistent temperatures, the life of the battery cell can be significantly shortened. Among other things, the present disclosure provides a temperature sensor including a first measuring sensor disposed at a first depth of the battery cell (e.g., at the base of the battery cell) and a second measuring sensor disposed at a second depth of the battery cell (e.g., at the top or upper portion of the battery cell). The present disclosure, using upper and lower temperature sensors in a specific region of the battery module, can detect and record a temperature gradient of the cells at one or more points in the battery module. In some embodiments, when a temperature gradient measured provides a temperature difference between the upper and lower battery cell portions over the operable threshold difference, the cooling and/or battery thermal management may be adjusted to return the battery cell to limits within the operable threshold. In one embodiment, a target differential of approximately 5 degrees Celsius can be maintained, such that improper cooling and/or thermal management (e.g., rapid cooling of only one side of the battery cells, etc.) can be prevented. For instance, in response to determining the target differential has been exceeded, the thermal management system may cease cooling/heating or begin cooling/heating the battery module to maintain a desired differential and temperature of the battery cell from one end to another. The multi-zone temperature sensor can also assist in monitoring hot spots at various locations of the battery module (e.g., at or near bolt holes or other thermal management restrictions). Additionally, these sensors may be interconnected with the battery and/or thermal management system to achieve the most efficient allocation of heating and cooling to ensure the battery cells are maintained at optimal temperatures.

Referring to FIG. 1, a schematic perspective view of an electrical energy storage system, or battery 104 comprising a number of electrical energy storage devices, or battery modules, 108 is shown in accordance with embodiments of the present disclosure. In one embodiment, the battery 104 may be configured to provide the electromotive force needed for the electrical drive system of a vehicle 100 to operate. Although the present disclosure recites batteries 104, battery modules 108, and/or battery cells as examples of electrical energy storage units, embodiments of the disclosure should not be so limited. For example, the battery cells 108, and/or any other energy storage device disclosed herein, may be any electrical energy storage cell including, but in no way limited to, battery cells, capacitors, ultracapacitors, supercapacitors, etc., and/or combinations thereof.

In some embodiments, the battery modules 108 may be electrically interconnected via at least one battery busbar including high voltage positive and negative terminals connected to an electrical system of the vehicle 100. The battery 104 may be configured as any number of battery modules 108 that are capable of being electrically connected together.

Figure 2B:
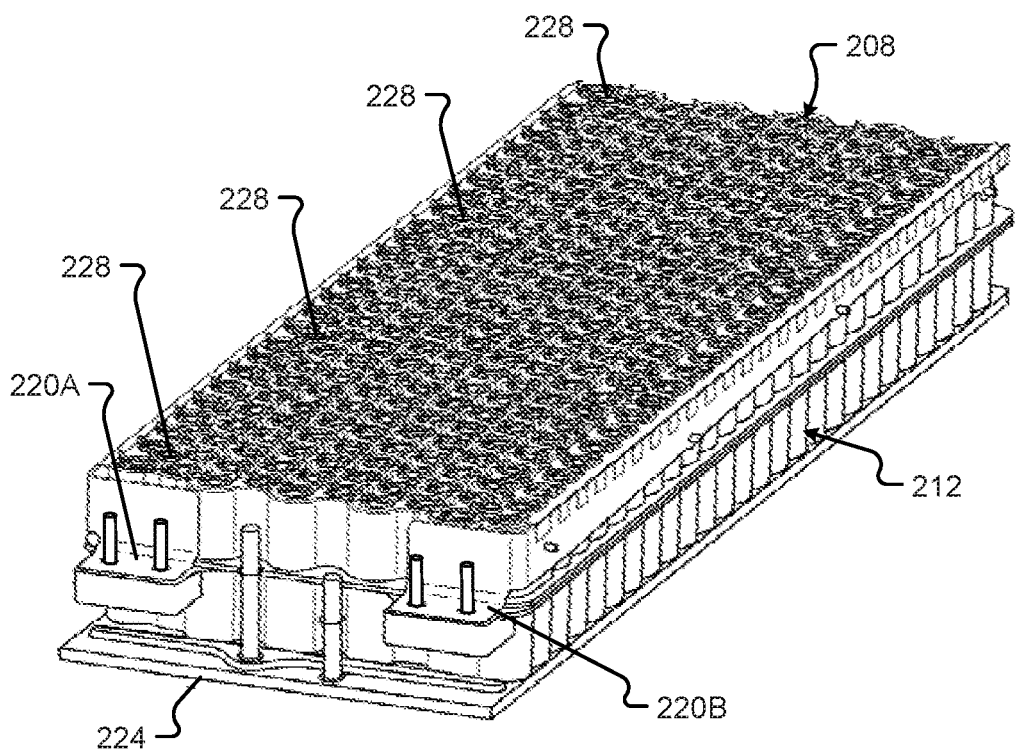
FIG. 2B shows a perspective view of the battery module of FIG. 2A with an upper shield removed.
Figure 2C:
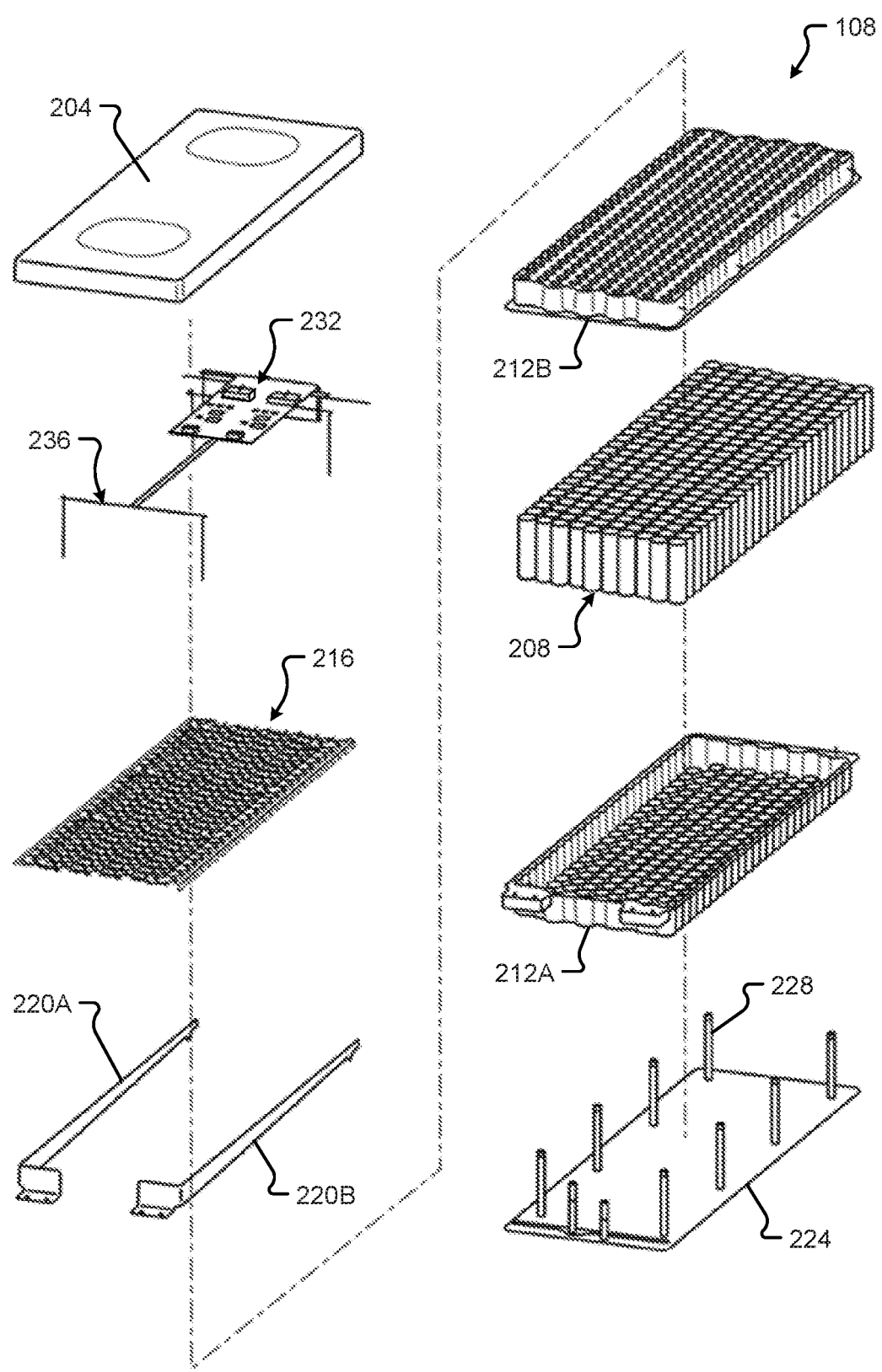
FIG. 2C shows a perspective exploded view of the battery module of FIG. 2A.

FIGS. 2A-2C show various perspective views of a battery module 108 in accordance with embodiments of the present disclosure. The battery module 108 may comprise an upper shield 204, a plurality of battery cells 208, a housing or carrier 212 configured to contain the battery cells 208, battery cell interconnects 216, first and second battery module busbars 220A, 220B, a cooling plate 224, and one or more mount sleeves 228. In some embodiments, the battery module 108 may include a battery management system 232 and sensing system 236.

FIG. 2A shows a perspective view of a battery module 108 in accordance with embodiments of the present disclosure. The battery module 108 shown in FIG. 2A includes an upper shield 204 configured to substantially cover the battery cell interconnects 216, battery cells 208, and other electrical connections (e.g., first and second battery module busbars 220A, 220B, etc.). In some embodiments, the upper shield 204 may correspond to a drip shield. In any event, the upper shield 204 may be made from molded, formed, or otherwise shaped plastic, dielectric, or nonconductive material. In one embodiment, the battery management system (BMS) 232 electronics (e.g., printed circuit board, chips, etc.) may be mounted to an exterior or interior surface of the upper shield 204. As shown in FIG. 2A, the BMS 232 and corresponding electronics are mounted to an exterior surface (e.g., a surface separate and spaced apart from the battery cells 208 and battery cell interconnects 216, etc.).

FIG. 2B shows a perspective view of the battery module 108 of FIG. 2A with the upper shield 204, BMS 232, and other electronics removed for the sake of clarity. As shown in FIG. 2B, the first and second battery module busbars 220A, 220B extend from a high voltage connection end, including two connection standoffs per busbar 220A, 220B, along the length of the battery module 108 to the opposite end of the battery module 108.

In FIG. 2C, the housing 212 is shown having a lower housing 212A and an upper housing, or cover, 212B. In some embodiments, the lower housing 212A and cover 212B may be interconnected with one another to form the complete housing 212. As shown in FIG. 2C, the lower housing 212A and/or the cover 212B may be configured to at least partially contain a number of battery cells 208. For instance, both the lower housing 212A and the cover 212B include a number of surfaces and walls defining battery cell 208 containment cavities including volumes for receiving the battery cells 208. Both the lower housing 212A and cover 212B may include a number of receptacles sized to receive and arrange each of the battery cells 208 relative to one another. In one embodiment, the lower housing 212A and cover 212B may include receptacles, or apertures, configured to receive one or more fasteners and mount sleeves 228.

Figure 3:
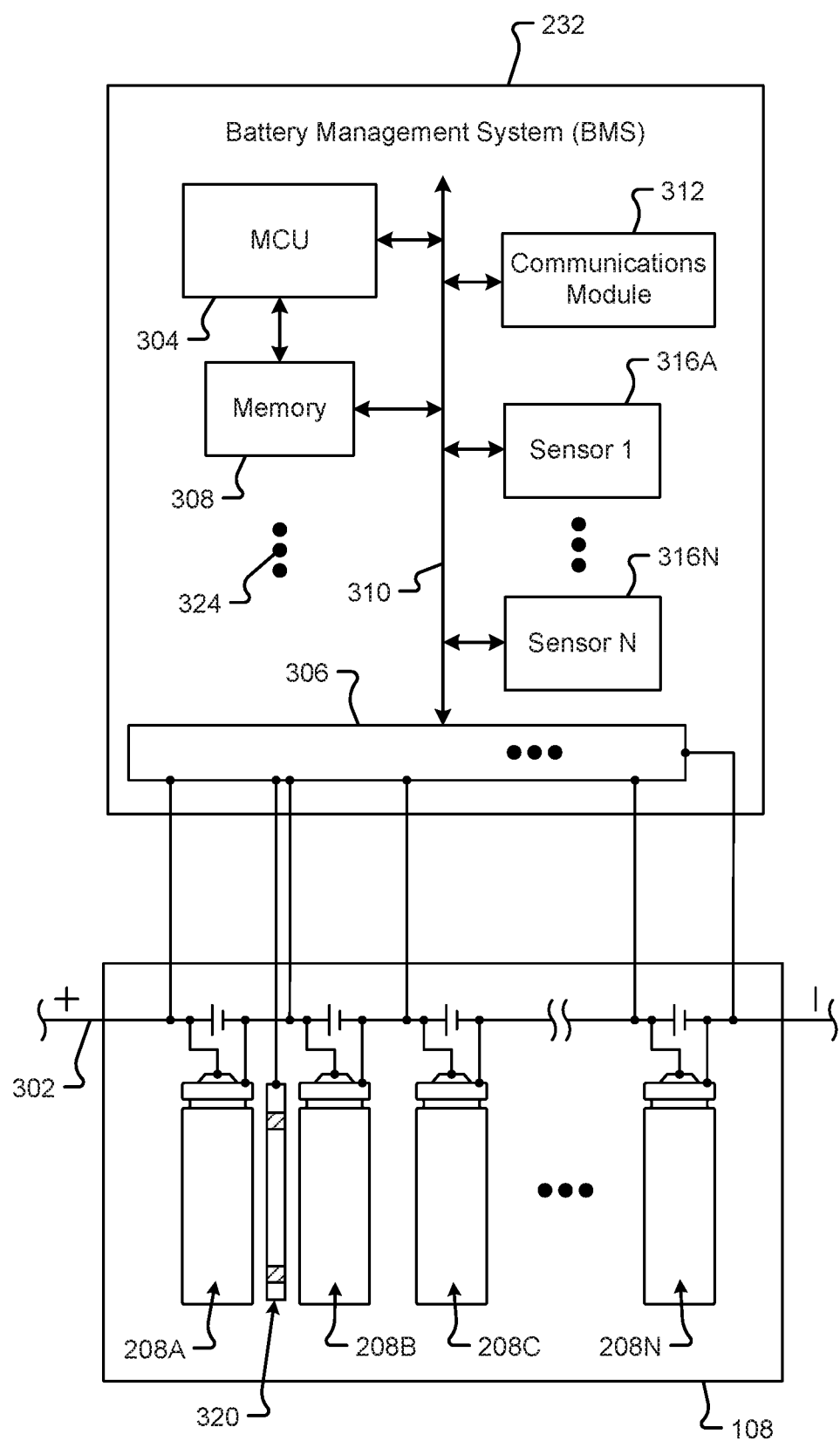
FIG. 3 shows a schematic block diagram of the battery management system in accordance with embodiments of the present disclosure.

FIG. 3 shows a schematic block diagram of the BMS 232 interconnected with the battery module 108 in accordance with embodiments of the present disclosure. In some embodiments, each battery module 108 of a battery 104 may include a corresponding unique BMS 232. In other embodiments, the multi-module battery 104 comprising a number of battery modules 108 may be monitored and/or controlled by a single multi-module BMS.

The BMS 232 may include a bus 306 including a number of terminals configured to interconnect with electrical lines 302 interconnected with the battery cells 208 of the battery module 108. In some embodiments, the interconnection between the battery module 108 and the BMS 232 may be via a physical electrical connector disposed on the battery module 108, the BMS 232, and/or both the battery module 108 and the BMS 232. The BMS 232 may be configured to monitor and/or control a state of charge associated with each battery cell 208A-N in the battery module 108. In some embodiments, the BMS 232 may include a microcontroller unit (MCU) 304, including one or more processors, interconnected with a memory 308 via at least one connection, or communications bus 310. The memory 308 may be one or more disk drives, optical storage devices, solid-state storage devices such as a random access memory (RAM) and/or a read-only memory (ROM), which can be programmable, flash-updateable and/or the like. Additionally or alternatively, the BMS 232 may include a communications module 312, one or more sensors 316A-N, and/or other components 324 interconnected with the communication bus 310, charger (not shown), and/or other systems in an electric power distribution system (not shown). The communications module 312 may include a modem, a network card (wireless or wired), an infra-red communication device, etc. and may permit data to be exchanged with a network and/or any other charger or processor in the electric power distribution system as described.

In any event, pairs of electrical interconnections may provide voltages from the battery module 108 to the MCU 304 of the BMS 232 and these voltages may be used to determine a state (e.g., voltage, current, state of charge, etc.) associated with a particular battery cell 208A-N in the battery module 108.

Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

In one embodiment, the sensors 316A-N may include one or more temperature sensors, thermocouples, pressure sensors, etc. The sensors 316A-N may be disposed between, adjacent to, spaced apart from, and/or in contact with, one or more of the battery cells 208A-N. As shown in FIG. 3, a multiple-zone thermocouple 320 is disposed between adjacent battery cells 208A, 208B in the battery module 108. The multiple-zone thermocouple 320 may include a housing having a first temperature sensing region disposed adjacent to a lower portion (e.g., bottom) of the battery cells 208 and a second temperature sensing region disposed adjacent to an upper portion (e.g., top) of the battery cells 208. The first temperature sensing region of the multiple-zone thermocouple 320 may correspond to a junction where two dissimilar metals of the thermocouple 320 are joined together and the other ends of the two dissimilar metals are attached to the BMS 232, and more specifically, the sensor (e.g., sensors 316A-N) configured to measure a voltage change at the junction when temperature changes. Similarly, the second temperature sensing region of the multiple-zone thermocouple 320 may correspond to a junction where a different set of two dissimilar metals of the thermocouple 320 are joined together and the other ends of the different set of two dissimilar metals are attached to the BMS 232, and more specifically, the sensor (e.g., sensors 316A-N) configured to measure a voltage change at the junction when temperature changes. This multiple-zone thermocouple 320 may allow the BMS 232 to determine, via the corresponding one or more sensors 316A-N, a temperature at the bottom and the top of groups of battery cells 208 using a single thermocouple housing or inserted device.

Figure 4A:
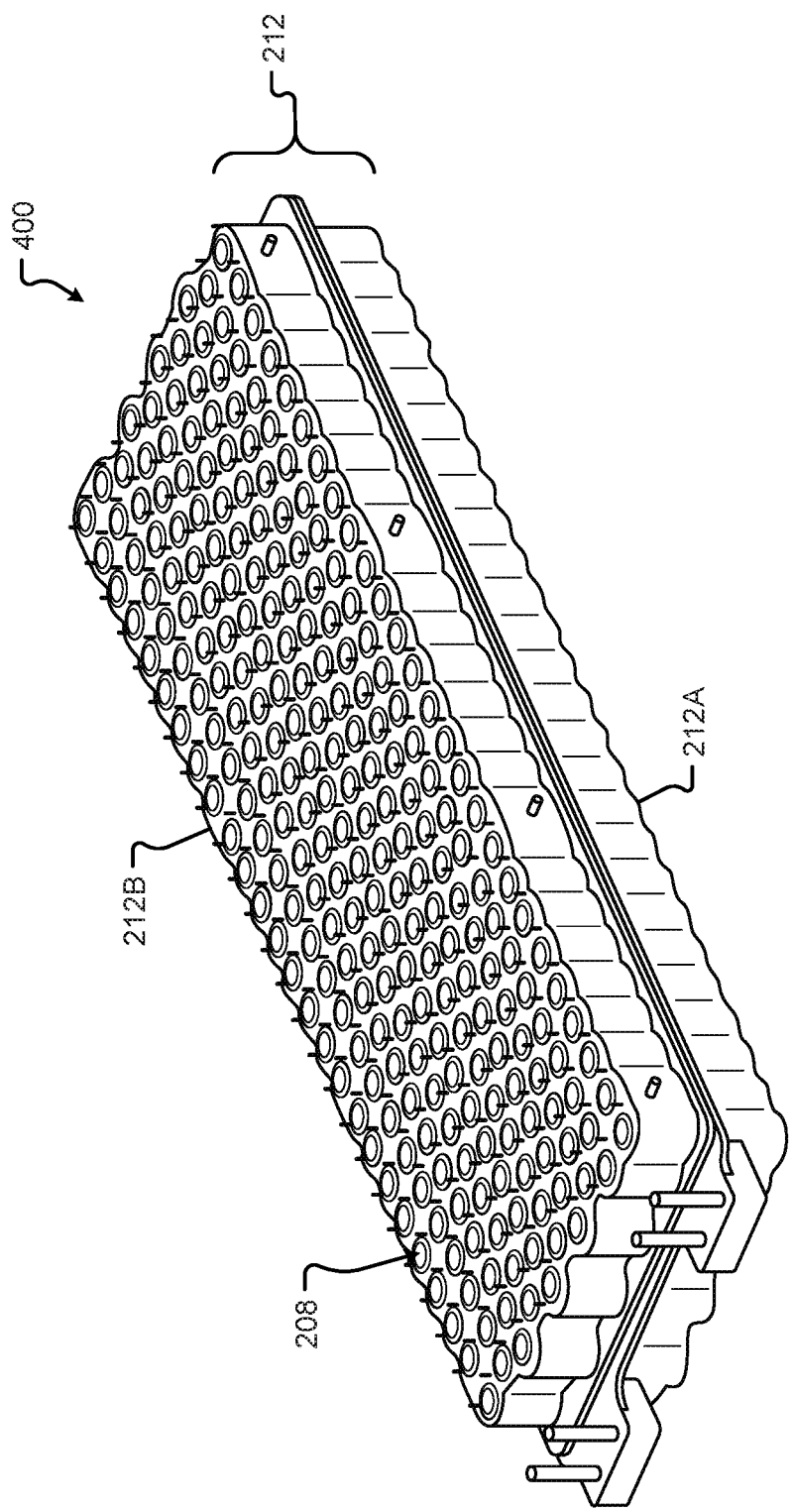
FIG. 4A shows a perspective view of the joined housing and cells forming the integrated battery cell structural support for the battery module in accordance with embodiments of the present disclosure.
Figure 4B:
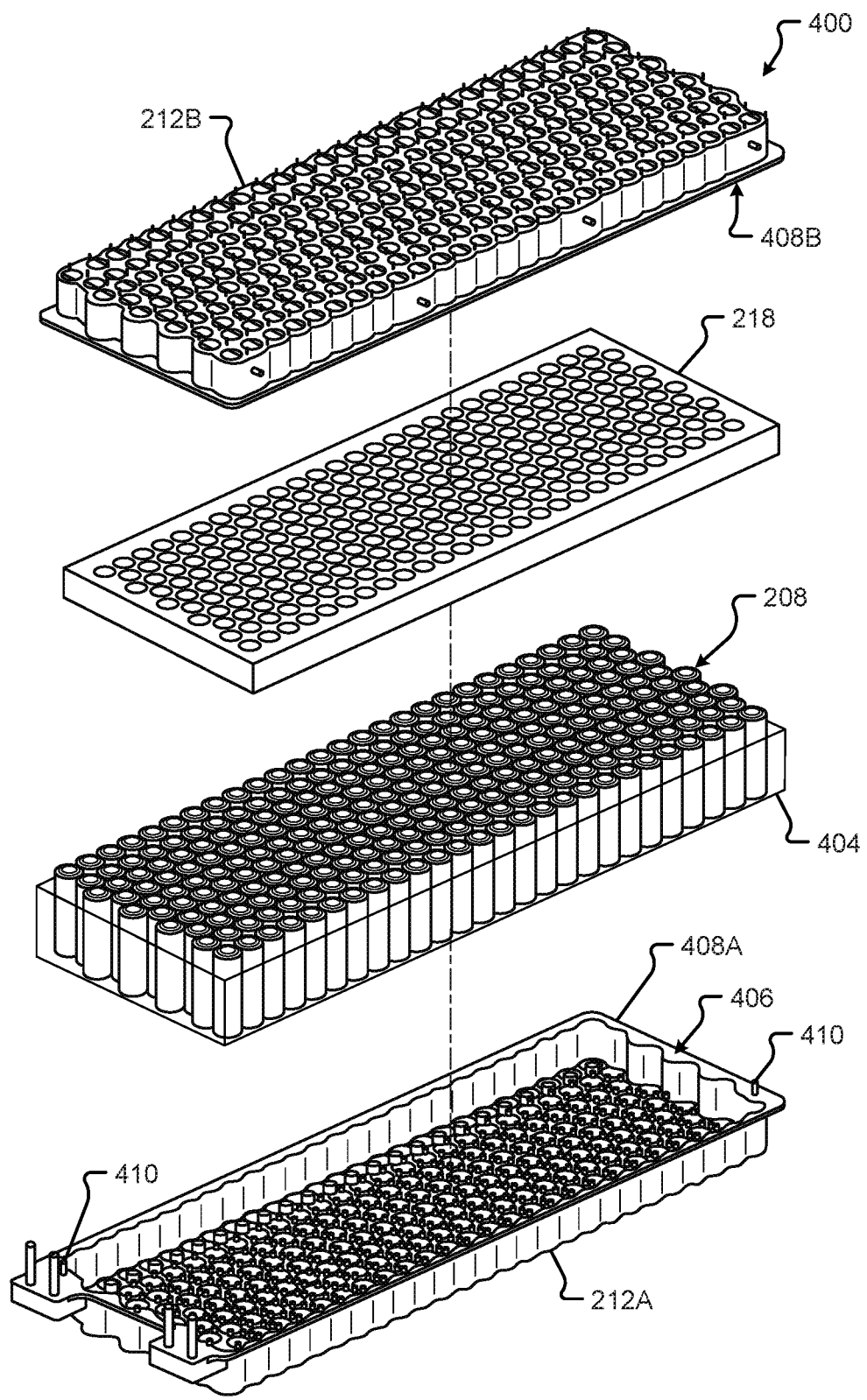
FIG. 4B shows an exploded perspective view of the battery module integrated battery cell structural support of FIG. 4A.

FIGS. 4A and 4B show various perspective views of the integrated battery cell structural support 400 for the battery module 108. The integrated battery cell structural support 400 may at least comprise the lower housing 212A, the battery cells 208, the cover 212, and a structural adhesive 404 disposed between adjacent battery cells 208 as well as between the battery cells 208 and the lower housing 212A and cover 212B. During assembly, the structural adhesive 404 may be configured to flow into the spaces between spaced-apart adjacent battery cells 208 and other areas around the battery cells 208 and inside the housing 212. Once cured, or hardened, the structural adhesive 404 may adhere to and connect the battery cells 208 forming a unified structure configured to resist forces and absorb impact or shock through a network of connected nodes in the battery module 108. Additionally or alternatively, the structural adhesive 404 may adhere to and connect the battery cells 208 to the various portions of the housing 212 (e.g., lower housing 212A, cover 212B, etc.) and/or other components of the battery module 108 (e.g., the one or more mount sleeves 228, battery cell retaining form, and/or gasket, 218, etc.). The structural adhesive 404 may correspond to the structural foam that acts as a structural adhesive, thermal insulator, and even a dielectric barrier within the battery module 108.

In some embodiments, the integrated battery cell structural support 400 may include a battery cell retaining form 218. The battery cell retaining form 218 may be configured as a die cut or formed block of material (e.g., foam, lightweight plastic, etc.) including a number of receptacles formed therethrough. These receptacles may be sized to receive at least a portion of the array of battery cells 208 and the form 218 may be configured to act as a gasket (e.g., preventing the structural adhesive 404 from expanding through the array of receptacles as the structural adhesive cures in the housing 212).

Referring to FIG. 4A, a perspective view of the joined housing 212 and battery cells 208 forming the integrated battery cell structural support 400 for the battery module 108 is shown in accordance with embodiments of the present disclosure. When joined together, the housing 212, the battery cells 208, and the structural adhesive 404 form a unified structural force distribution system allowing the entire system of interconnected elements to move upon receiving a force or impact.

FIG. 4B shows an exploded perspective view of the battery module integrated battery cell structural support 400 of FIG. 4A. As shown in FIG. 4B, the battery cell retaining form 218 may be disposed at, or adjacent to, an upper portion of the battery cells 208. Among other things, this arrangement of the battery cell retaining form 218 provides a seal, or gasket, between the structural adhesive 404 and the battery cell electrical interconnections 216 (e.g., shown in FIGS. 2B and 2C), preventing uncured and/or cured structural adhesive 404 from reaching these sensitive electrical areas. Although shown in FIG. 4B as an element surrounding the battery cells 208, it should be appreciated that the structural adhesive 404 may be inserted into the spaces surrounding the battery cells 208 while inside the housing 212 in an assembled, or connected, state. The structural adhesive 404 may be inserted or deposited into these spaces while in a fluid, or semi-fluid state, and when cured, the structural adhesive 404 may mechanically connect the elements that are in contact with the structural adhesive 404 (e.g., the battery cells 208, lower housing 212A, the cover 212B, and any other elements, e.g., optionally the battery cell retaining form 218, etc.).

In some embodiments, the lower housing 212A and the cover 212B may be attached together, at least temporarily, via a flanged connection 408A, 408B. For instance, the lower housing 212A may include a flange, or flanged surface, 408A that mates with a mating flanged surface of the cover 212B (e.g., via an adhesive, fastener, connection, tab-and-slot, clip, or other connective interface, etc.). The flanged surface 408A may follow at least a portion of the periphery of the lower housing 212A. The flanged surface 408A may be offset from and substantially parallel to a base, or planar surface, of the lower housing 212A. In one embodiment, the flanged surface 408A may extend outwardly from the walls of the lower housing 212A. The cover 212B may include a similar mating flange, or mating flanged surface, 408B that follows at least a portion of the periphery of the cover 212B and/or the lower housing 212A. The mating flanged surface 408B of the cover 212B may be offset from and substantially parallel to a planar surface, of the cover 212B. In one embodiment, the mating flanged surface 408B may extend outwardly from the walls of the cover 212B.

It is an aspect of the present disclosure that the flanged surface 408A and/or the mating flanged surface 408B may include an adhesive layer 406 deposited thereon. The adhesive layer 406 may correspond to an adhesive material, double-sided adhesive tape, and/or the like. In any event, the adhesive layer 406 may attach the lower housing 212A to the cover 212B, and more specifically, connect the flanged surface 408A to the mating flanged surface 408B. In one embodiment, the flanged surface 408A and/or the mating flanged surface 408B may include at least one connecting element 410 (e.g., fastener, standoff, post, tab-and-slot, clip, or other connective interface, etc.) that is configured to mate, or interconnect, with a corresponding feature on the other of the flanged surface 408A and/or the mating flanged surface 408B.

FIG. 4C shows a detail broken section plan view of the battery cells 208 and structural adhesive 404 of the battery module 108 shown in FIG. 4B. In some embodiments, the section view of FIG. 4C may be taken through an approximate planar center of the array of battery cells 208 in the battery module 108. As shown in FIG. 4C, the battery cells 208 are arranged in a number of rows and columns forming a two-dimensional cell distribution pattern. The rows are disposed along the Y-axis, referenced by the coordinate system 402 shown, where each row includes a linear array of battery cells 208 extending along the X-axis in the battery module 108. In some embodiments, the battery cells 208 may include a periphery, casing diameter, or outer surface that is at least partially surrounded by the structural adhesive 404, such that no two battery cells 208 are in contact with one another at their peripheries (e.g., separated and/or insulated by the structural adhesive 404). This spacing and arrangement of the cells 208 in the cell distribution pattern is described and shown in greater detail in conjunction with FIGS. 4D and 9A.

In some embodiments, the cell distribution pattern may include combinations of battery cell 208 arrangements, or arrays, which form the entire array of battery cells 208 in the battery module 108. By way of example, the battery module 108 may include edge arrays 412, comprising pairs of inline battery cells 208 running along the X-axis, and an internal or center array 416 that includes a plurality of adjacent staggered rows of battery cells 208. In some embodiments, the edge arrays 412 may be disposed at opposing edges of the battery module 108. The edge arrays 412 may provide an arrangement of battery cells 208 in a pattern where the battery cells 208 of the first row are spaced apart from one another along the X-axis, and where the battery cells 208 of the second row are similarly, if not identically, spaced apart from one another along the X-axis. In one embodiment, the battery cells 208 in the edge array 412 may be equispaced along the X-axis. Each of the battery cells 208 in the first row may be arranged offset and inline, along the Y-axis, with each of the battery cells 208 in the second row of the edge array 412. Among other things, this orthogonal arrangement of battery cells 208 in the edge array 412 can provide an open volume between sets of four immediately adjacent cells 208. The open volume may be capable of receiving a fastener, a fastening sleeve, structural adhesive 404, and/or a standoff internal to the entire array of battery cells 208 of the battery module 108.

The internal array 416 may include a number of staggered rows of battery cells 208 that are disposed between the edge arrays 412 (see, e.g., FIG. 4A). While FIG. 4C shows a representative broken section view of an area of the battery cells 208 and structural adhesive 404, it should be appreciated that the representative cell distribution pattern may be repeated, mirrored, and/or symmetrical about one or more planes of the battery module 108. For example, the battery module 108 may include an edge array 412 disposed at opposing edges of the battery module 108 with the internal array 416 disposed in the center of the battery module 108 (see, e.g., FIG. 4A). In one embodiment, the opposing edges may be associated with terminal edges of the battery module 108. For instance, a first terminal edge may correspond to the positive terminal edge for the battery module 108 and the opposing second terminal edge may correspond to the negative terminal edge for the battery module 108. Each terminal edge may include a respective busbar (e.g., first battery module busbar 220A and second battery module busbar 220B) configured to electrically interconnect with the positive and/or negative terminals of the array of battery cells 208.

FIG. 4D shows a schematic detail broken section plan view of the cell distribution pattern and/or the spacing for the battery cells 208 and structural support 404 shown in FIG. 4C. As described in conjunction with FIG. 4C, the cell distribution pattern includes an edge array 412 and an internal or center array 416. The edge array 412 includes a first row 412A of battery cell positions that are spaced apart from one another by a horizontal distance, XC1, along the X-axis, and a second row 412B of battery cell positions that are spaced apart from one another by the same distance, XC1, along the X-axis. As illustrated in FIG. 4D, the second row 412B of battery cell positions in the edge array 412 are perpendicularly offset from the first row 412A of battery cell positions in the Y-axis by a vertical distance, YC1. The battery cell positions in the edge array 412 may be arranged as orthogonal sets of immediately adjacent battery cell positions. In some embodiments, the X-axis battery cell positions and coordinates for the first row 412A may match the X-axis battery cell positions and coordinates for the second row 412B. This pattern provides an area 420, or open volume, between immediately adjacent sets of battery cell positions in the first and second rows 412A, 412B (e.g., battery cell positions 1, 2, 3, and 4). As provided above, the area 420 may be sized to receive a fastener, a fastening sleeve, structural adhesive 404, and/or a standoff internal to the entire array of battery cell positions making up the cell distribution pattern.

In some embodiments, the cell distribution pattern may include an internal array 416 comprising a number of rows 416A-C of battery cell positions that are staggered relative to one another. In one embodiment, the first staggered row 416A of the internal array 416 may be offset from the second row 412B of the edge array 412 by a vertical distance, YC2 (e.g., along the Y-axis, measured from the center of each position). As shown in FIG. 4D, the vertical distance, YC2, dimension between staggered rows 416A-C and the second row 412B immediately adjacent to the first staggered row 416A, is less than the vertical distance, YC1, dimension between battery cell positions in the edge arrays 412. Additionally, the battery cell positions of the first staggered row 416A may be offset in the X-axis from the battery cell positions in the edge array 412. In some embodiments, and as shown in FIG. 4D, battery cell position 5 (e.g., the first battery cell position in the first staggered row 416A of the internal array 416) may be offset from battery cell position 3 (e.g., the first battery cell position in the second row 412B of the edge array 412) by a horizontal distance, XC2 (e.g., along the X-axis, measured from the center of each position). In one embodiment, the horizontal distance, XC2, may correspond to half of the horizontal distance, XC1 (e.g., XC1 divided by two). The battery cell positions in each row 412A, 412B, 416A-C may be separated by the center-to-center horizontal distance, XC1. For instance, the distance between battery cell positions 5 and 6 may be equal to horizontal distance, XC1. As can be appreciated, the distance between battery cell positions 7 and 8, as well as 9 and 10, may also be equal to the horizontal distance, XC1. In any event, the battery cell positions of the second staggered row 416B of the internal array 416 may be offset in the X-axis from the battery cell positions of the first staggered row 416A of the internal array 416. In some embodiments, the battery cell positions of the second staggered row 416B of the internal array 416 may be inline (e.g., along the Y-axis) with at least some of the battery cell positions in the edge array 412. This staggered arrangement of battery cell positions in the internal array 416 provides a densely packed array of battery cells 208 in the battery module, while allowing spaces between the battery cells 208 in the two-dimensional inline edge arrays 412 for mounting hardware, sensors, structural adhesive 404, and/or the like, keeping the overall battery module 108 size to an optimized, condensed, and compact dimension.

As provided above, the vertical distance, YC1, dimension between battery cell positions in the first and second rows 412A, 412B in the edge array 412 may be measured from the center of battery cell position 1 (e.g., the first battery cell in the first row 412A) to the center of battery cell position 2 (e.g., the first battery cell in the second row 412B), along the Y-axis. This dimension, YC1 may correspond to the dimension of the outer periphery of the battery cell 208 plus a non-zero spacing dimension. The non-zero spacing dimension may set the distance between outer portions of immediately adjacent battery cells 208 at their closest position in the battery cell distribution pattern, such that no battery cells 208 are allowed to contact one another at their peripheries. By way of example, where the battery cells 208 have cylindrical casings, the dimension YC1 may be equal to two times the radius of each cylindrical battery cell 208 plus the non-zero spacing dimension (e.g., 0.5 mm to 1.0 mm, 1.0 mm to 2.0 mm, 2.0 mm to 3.0 mm, 3.0 mm to 4.0 mm, 4.0 mm to 7.0 mm, etc., combinations thereof, and/or ranges therebetween). In some embodiments, the horizontal distance, XC1, dimension may be similar, if not identical, to the vertical distance, YC1, dimension, except that the dimension is set along the X-axis.

The vertical distance, YC2, dimension between staggered rows may be less than the dimension of the outer periphery of the battery cell. Continuing the example above, where the battery cells 208 have cylindrical casings, the dimension YC2 may be equal to less than two times the radius of each cylindrical battery cell 208. In some embodiments, the spacing of the battery cell positions in the internal array 416 may provide an area 424, or open volume, between immediately adjacent sets of battery cell positions in the first staggered row 416A and the second row 412B and/or between immediately adjacent sets of battery cell positions in the staggered rows 416A-C. For instance, the area 424 may be disposed between sets of three adjacent battery cell positions in staggered rows (e.g., battery cell positions 3, 5, and 6, and/or battery cell positions 3, 4, and 6, and/or battery cell positions 5, 6, and 7, and/or battery cell positions 6, 7, and 8, etc.). As provided above, the area 424 may be sized to receive structural adhesive 404 and physically separate each battery cell 208 in the array of battery cells 208 for the battery module 108.

Figure 5A:
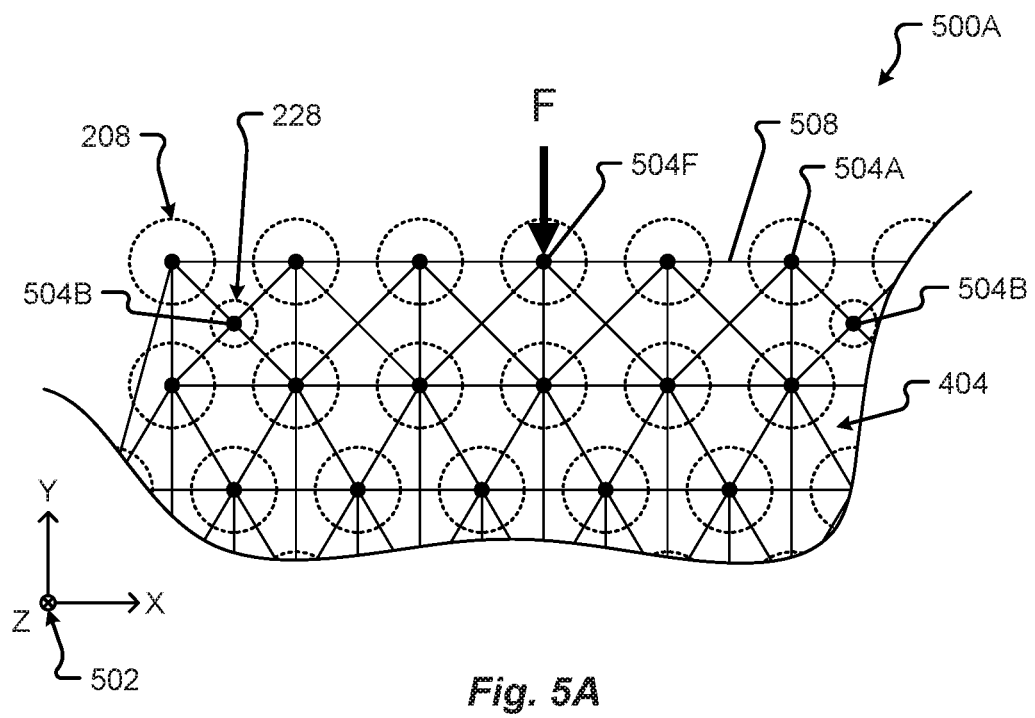
FIG. 5A shows a schematic representation of a force distribution framework of the battery module in a first state in accordance with embodiments of the present disclosure.
Figure 5B:
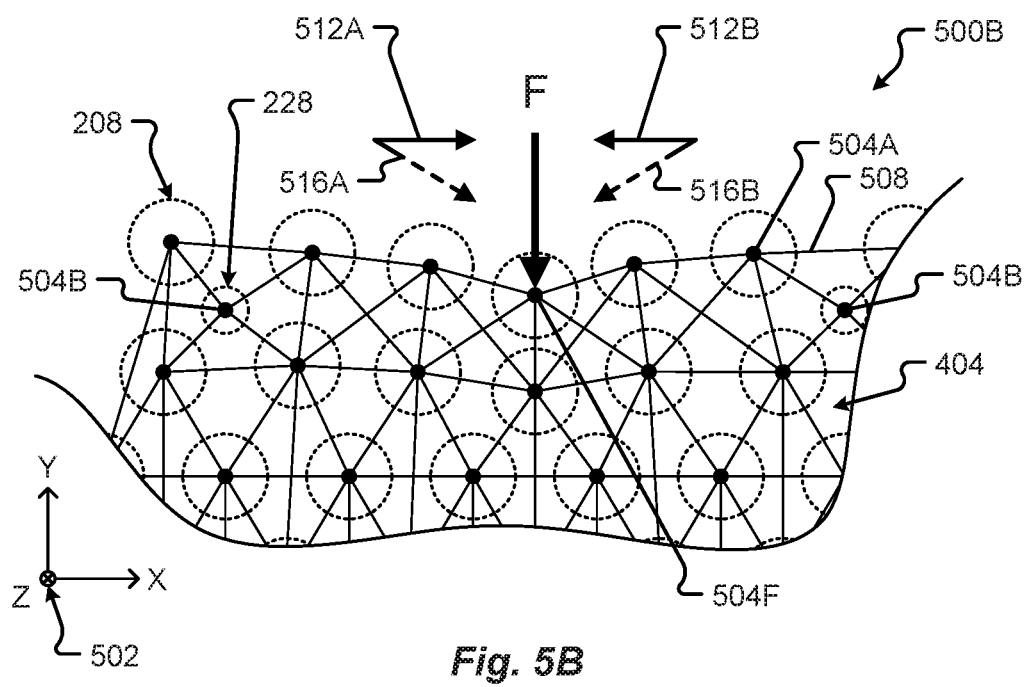
FIG. 5B shows a schematic representation of a force distribution framework of the battery module in a second state in accordance with embodiments of the present disclosure.

FIGS. 5A and 5B show schematic representations of a force distribution framework associated with the unified battery module 108 with integrated battery cell structural support at different impact states 500A, 500B in accordance with embodiments of the present disclosure. The force distribution framework shows a number of nodes 504A, 504B (e.g., representing battery cells 208 and mount sleeves 228, respectively, in the battery module 108, etc.) connected to one another via a number of connectors 508 (e.g., representing the structural adhesive 404). Although represented as a simplified number of nodes 504A, 504B, 504F and connectors 508 in FIGS. 5A and 5B, it should be appreciated that additional nodes may correspond to the edges and surfaces of the housing 212, the battery cell retaining form 218, the cooling plate 224, and/or other components making up the battery module 108. It should further be appreciated that additional connectors may exist between the surfaces of the components making up these additional nodes as well as the nodes 504A, 504B, 504F shown. However, for the sake of clarity in disclosure, the nodes 504A, 504B, 504F and connectors 508 shown have been represented in a simplified and schematic form. In some embodiments, the first nodes 504A may represent battery cells 208 that are held in position (e.g., in the X-Y plane of the representative coordinate system 502) at least via a lower housing 212A and a cover 212B. In one embodiment, it is an aspect of the present disclosure that the first nodes 504A may additionally be held in position (e.g., in the X-Y plane) via a battery cell retaining form 218.

FIG. 5A shows a schematic representation of a force distribution framework associated with the unified battery module 108 with integrated battery cell structural support at a pre-impact state 500A. As shown, in FIG. 5A a force, F, is about to act on a node 504F in the force distribution framework. This force, F, may represent an impact (e.g., from a collision, component shift, or other mechanical failure, etc.) in the form of a vector having a first magnitude and acting in the negative Y-direction (e.g., according to the representative coordinate system 502 shown). At this pre-impact state 500A, the nodes 504A, 504B, 504F of the framework are all maintained at relative distances to one another by the components of the battery module 108 and the structural adhesive 404 disposed therebetween.

As the force, F, contacts the node 504F in the force distribution framework, FIG. 5B shows the force, F, displacing the node 504F a specific distance in the negative Y-direction (e.g., pushing the node 504F closer to the next adjacent node 504A along the Y-axis, etc.) and the framework of nodes 504A, 504B, 504F and connectors 508 working in concert to resist the displacement imparted by the force, F. In particular, as the node 504F is displaced, the structural adhesive 404 under the node 504F acts in compression, while portions of the structural adhesive 404 between immediately adjacent nodes 504A along the X-axis to the Y-axis displacing node 504F may act in tension. For example, the immediately adjacent nodes 504A along the X-axis are brought closer to the Y-axis displacing node 504F in directions 512A, 512B (e.g., via a tension in the structural adhesive 404 between the immediately adjacent nodes 504A along the X-axis and the displacing node 504F). This tension may move the immediately adjacent nodes 504A in a resultant direction 516A, 516B (e.g., based on the X-axis directions 512A, 512B and the Y-axis displacement direction). In some embodiments, the force, F, may additionally cause the structural adhesive 404 to act in compression forcing the next adjacent nodes 504A along the Y-axis into a Y-axis displaced state. In any event, the structural adhesive 404 may be configured to provide a variable resistance as it is compressed and/or drawn out (e.g., stretched under tension). In some embodiments, all of the nodes and connectors in the battery module 108 force distribution framework may experience some movement (e.g., displacement) and/or absorb at least some of the force from the force, F. Distributing the impact force, F, among a large number, if not all, of the nodes 504A, 504B, 504F in the framework allows the battery module 108 to decrease a force observed at a point of contact (e.g., node 504F) while continuing to remain flexible in the X-Y plane.

FIG. 6 shows a perspective view of the battery cell retaining form 218 with several battery cells 208 disposed therein in accordance with embodiments of the present disclosure. In some embodiments, the battery cell retaining form 218 may comprise substantially planar first surface 608 offset, a height, H, from a substantially planar second surface 612. The battery cell retaining form 218 may include a number of sides 616A-D (sides 616C and 616D not shown), or sidewalls, disposed around a periphery of the form 218. The battery cell retaining form 218 may include an array of receptacles 604 formed through the first and second surfaces. In one embodiment, the array of receptacles 604 may be arranged, or formed, in the battery cell retaining form 218 in a battery cell distribution pattern. In some embodiments, the array of receptacles 604 formed in the battery cell retaining form 218 are sized to prevent uncured and/or cured structural adhesive 404 from expanding through the array of receptacles (e.g., as the structural adhesive cures in the housing 212), the structural adhesive 404 further mechanically joining the battery cell retaining form 218 as part of the unified and integral structure of the battery module 108.

Although shown as a substantially rectangular solid material, it should be appreciated that the battery cell retaining form 218 may be of any solid shape substantially conforming to an arrangement of the battery cells 208 in the housing 212 of the battery module 108. In any event, the battery cell retaining form 218 may include a length, L, extending from a first side 616A, along a second side 616B, to a third side 616C (not shown) (e.g., in the positive X-axis direction according to the representative coordinate system 602 shown) and a width, W, extending from the second side 616B along the first side 616A, to a fourth side 616D (not shown) (e.g., in the positive Y-axis direction according to the representative coordinate system 602 shown). In some embodiments, the height, H, may correspond to a distance measured between the first surface 608 and the opposing second surface 612 in the Z-axis direction. In one embodiment, the length, L, width, W, and height, H, may define a volume of the battery cell retaining form 218. The volume of the battery cell retaining form 218 may be sized to fit within at least one containment cavity of the housing 212 (e.g., lower housing 212A, cover 212B, and/or combinations thereof).

In some embodiments, the battery cell retaining form 218 may be made from a foam, plastic, or other lightweight dielectric material (e.g., low-density rigid foam, closed-cell foam, open-cell foam, molded plastic, composites, etc.). The receptacles 604 may be die cut, wire electrical discharge machined (EDM) cut, machined, molded, or otherwise formed through the battery cell retaining form 218. It is an aspect of the present disclosure that the number of receptacles 604, or battery receiving features, in the battery cell retaining form 218 match the number of battery cells 208 in the battery module 108.

Figure 7A:
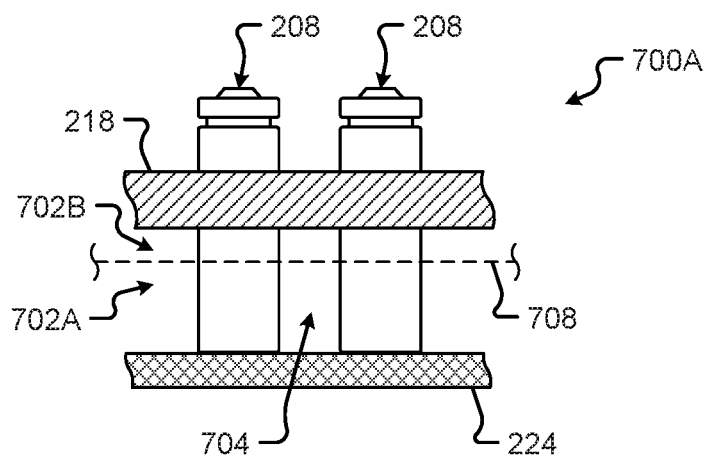
FIG. 7A shows a battery cell retaining form and/or gasket in a first assembly state in accordance with embodiments of the present disclosure.
Figure 7B:
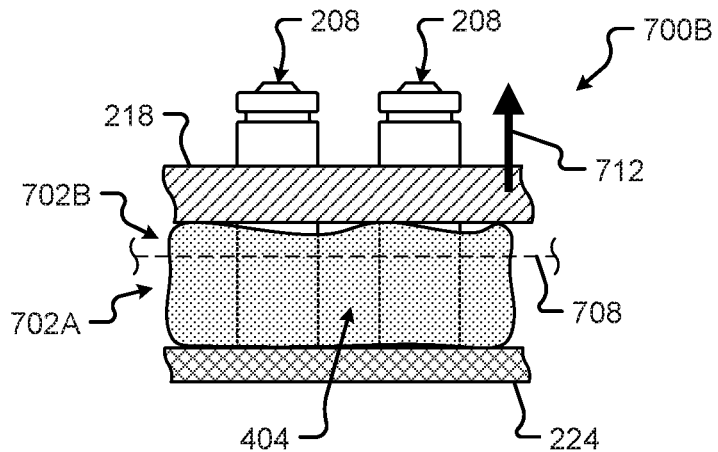
FIG. 7B shows a battery cell retaining form and/or gasket in a second assembly state in accordance with embodiments of the present disclosure.
Figure 7C:
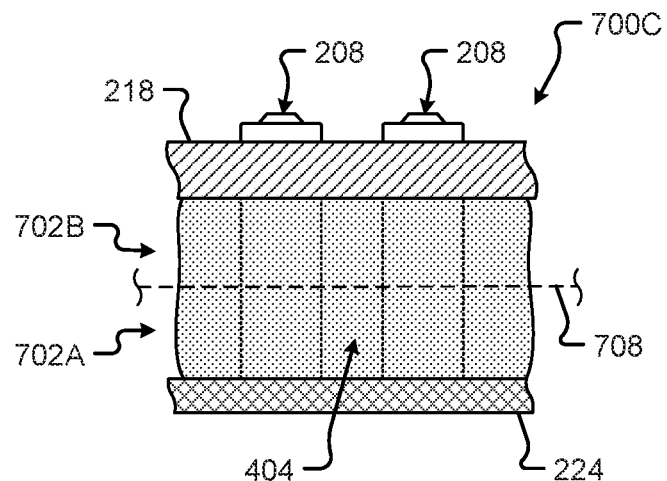
FIG. 7C shows a battery cell retaining form and/or gasket in a third assembly state in accordance with embodiments of the present disclosure.

Referring now to FIGS. 7A-7C, a detail broken section view of adjacent battery cells 208 held in the receptacles 604 of a battery cell retaining form 218 disposed inside a battery module 108 is shown at various stages 700A-C of assembly in accordance with embodiments of the present disclosure. The battery cells 208 are shown held in place, at least partially, via the battery cell retaining form 218. In some embodiments, a surface of each battery cell 208 (e.g., the bottom) may be placed into contact with a cooling plate 224. The cooling plate 224 may be configured to convey a coolant or other fluid therethrough, thereby cooling at least one surface of the cooling plate and objects (e.g., battery cells 208, etc.) in contact with the at least one surface. In one embodiment, the battery cells 208 may be mechanically adhered to the cooling plate 224 via a thermally conductive adhesive material. In some embodiments, the thermally conductive adhesive material may include mechanical separation elements embedded therein (e.g., beads, etc.), configured to separate the lowest surface of the battery cells 208 from the cooling plate 224 surface a known distance. Among other things, this separation may provide a predictable thermal conductive path between the cooling plate 224 and the battery cells 208 via the thermally conductive adhesive material. As described above, the base of the module 108, the carrier 212, and/or one or more battery cells 208 may be bonded to the cooling plate 224 using a structural adhesive that provides a thermal conductor (e.g., thermal interface material), and a di-electric barrier between the various elements and the cooling plate 224.

The detail broken section view shows a split line 708 representing the lines where a lower housing 212A may meet, or otherwise interconnect, with a cover 212B. As can be appreciated, the split line 708 delineates between the first containment cavity space 702A (e.g., of the lower housing 212A) and the second containment cavity space 702B (e.g., of the cover 212B) of the housing 212. A filling space, or volume, 704 disposed between adjacent battery cells 208 is shown in FIG. 7A. In some embodiments, the structural adhesive 404 may be deposited (e.g., in a fluid, or semi-fluid state) into this filling volume 704 such that the structural adhesive 404 may evenly distribute and disperse between all of the battery cells 208 in the battery module 108.

FIG. 7A shows a battery cell retaining form 218 in a first assembly state 700A (e.g., the pre-fill stage) in accordance with embodiments of the present disclosure. In FIG. 7A, the battery cell retaining form 218 has been disposed toward an upper portion (e.g., the positive terminal end) of the battery cells 208. In some embodiments, the battery cell retaining form 218 may be contained inside the first containment cavity space 702A prior to filling with structural adhesive 404. In one embodiment, the battery cell retaining form 218 may be biased to be adjacent to the split line 708 of the housing 212 prior to filling the battery module 108 and the filling volume 704 with structural adhesive 404.

In some embodiments, the structural adhesive 404 may be inserted into the filling volume 704 in a volume at least partially enclosed by an attached lower housing 212A and cover 212B. The lower housing 212A and the cover 212B may be attached via an adhesive connection, or adhesive layer 406, disposed on the flanged surface 408A and/or the mating flanged surface 408B. In some cases, this structural adhesive 404 may remain in place after the filling volume 704 is filled mechanically connecting the lower housing 212A to the cover 212B.

FIG. 7B shows the battery cell retaining form 218 in a second assembly state 700B (e.g., the initial fill stage) in accordance with embodiments of the present disclosure. As the structural adhesive 404 is inserted, pumped, or otherwise deposited into the filling volume 704 between the battery cells 208, the hydraulic force of the material filling and/or expanding in the first containment cavity space 702A may force the battery cell retaining form 218 in an upward direction 712 toward the upper portion of the battery cells 208.

FIG. 7C shows the battery cell retaining form 218 in a third assembly state 700C (e.g., the fill-cured stage) in accordance with embodiments of the present disclosure. Once the appropriate amount of structural adhesive 404 is inserted into the filling volume 704 (e.g., based on a volumetric dispense, mass dispense, etc., and/or combinations thereof, the battery cell retaining form 218 will cease to displace, or move, in the upward direction 712. In some embodiments, the battery cell retaining form 218 may provide a space between the uppermost surface of the form 218 and the upper end, or top, of the battery cell 208. This space may provide working area for making electrical interconnections, inserting other materials, and/or the like. In some embodiments, the battery cell retaining form 218 may compress between the cured structural adhesive 404 and the inside planar surface of the cover 212B. In this example, the substantially planar first surface 608 of the form 218 may contact the inside upper surface of the cover 212B, while the substantially planar second surface 612 of the form 218 may contact the structural adhesive 404. This compression of the form 218 may allow for a tolerance in expansion of the structural adhesive 404 when curing. For instance, if the structural adhesive 404 has an estimated expansion volume of 20% greater than the original amount of fluid +/−5%, the battery cell retaining form 218 may be configured to compress an amount to accommodate the +5% expansion, +10% expansion, and/or more. In any event, once the structural adhesive 404 cures, and hardens into a solid or semi-solid state, the battery cells 208, the cold plate 224, and the battery cell retaining form 218 are joined together by the structural adhesive 404, forming an integral and unified battery module 108 assembly.

Figure 8A:
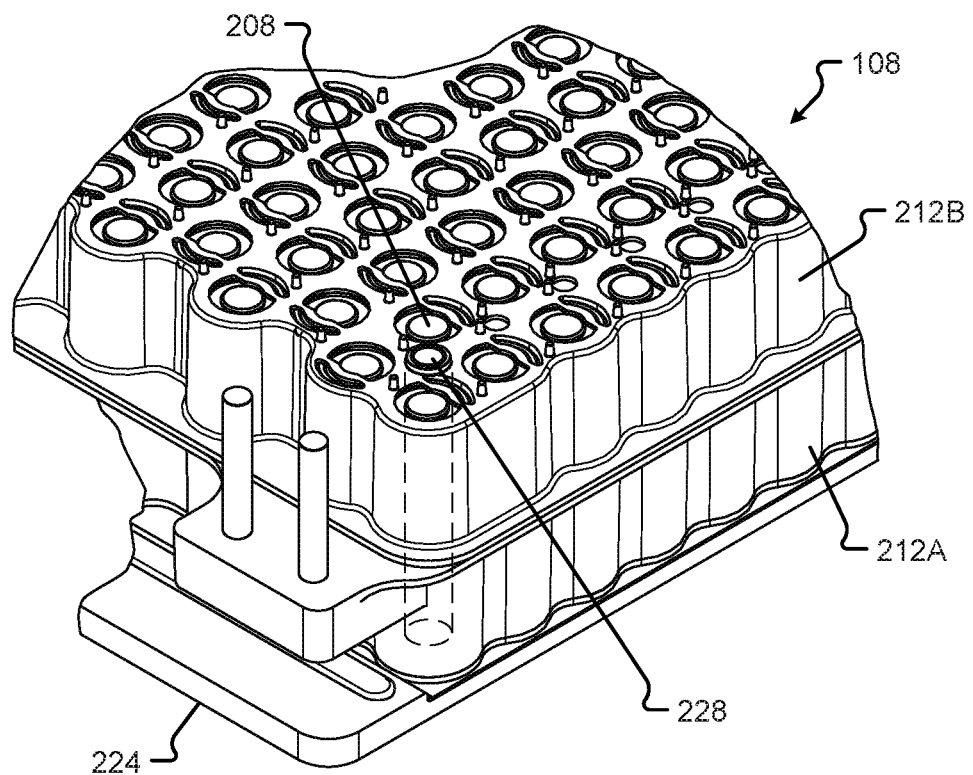
FIG. 8A shows a perspective view of a dielectric mount sleeve disposed between battery cells in a battery module in accordance with embodiments of the present disclosure.

FIG. 8A shows a perspective view of a dielectric mount sleeve 228 disposed between adjacent battery cells 208 in a battery module 108 in accordance with embodiments of the present disclosure. As shown in FIG. 8A, the upper shield 204, fastener 804, and other components have been removed for clarity. In some embodiments, the dielectric mount sleeve 228 may fasten the battery module 108 together and/or attach the battery module 108 to a vehicle mount base (see, e.g., mount base 812 of FIG. 8B). The dielectric mount sleeve 228 may be made from Garolite G10, fiberglass, ceramic coated materials, fiberglass-epoxy laminates, etc. As shown in FIG. 8A, the dielectric mount sleeves 228 may be disposed internal to a periphery of the battery module 108 and between battery cells 208. Among other things, this arrangement may allow for a more compact battery module 108 and one that does not require external clamping and/or fastening features.

Figure 8B:
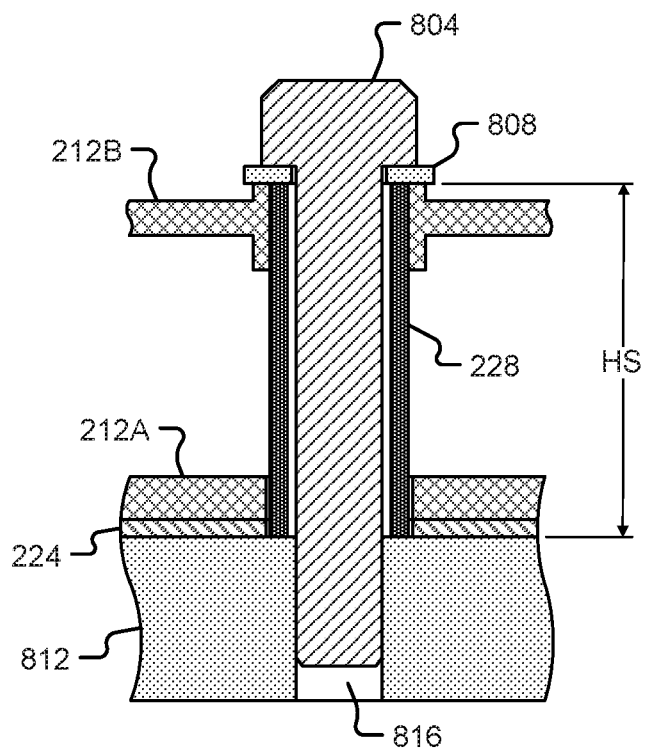
FIG. 8B shows a detail elevation section view of the dielectric mount sleeve of FIG. 8A.

FIG. 8B shows a detail elevation section view of the dielectric mount sleeve 228 of FIG. 8A. The dielectric mount sleeve 228 may be configured as a hollow shaft, having a total height, HS. The height, HS, of the dielectric mount sleeve 228 may define the maximum height from the cover 212B to the bottom of the cooling plate 224 and may even define the height of the battery module 108. In some cases, a fastener 804 may be inserted into the hollow shaft of the dielectric mount sleeve 228 and into a receiving feature 816 in, or associated with, the mount base 812. In some embodiments, this receiving feature 816 may be a nut, threaded hole, and/or some other mating interconnection between the mount base 812 and the fastener 804. In one embodiment, the fastener may be used to hold the upper shield 204 and other battery module 108 components together. Although shown as a washer 808, or other load distributing member, in contact with the cover 212B in FIG. 8B, it should be appreciated that the washer 808, or even the head of the fastener 804, may apply a compressive, or clamping, force to the upper shield 204 holding the housing 212 components (e.g., lower housing 212A, cover 212B, etc.) together between the cooling plate 224 and the upper shield 204.

As illustrated in FIG. 8B, as a force is applied to the fastener 804, providing a clamping load for the battery module 108, the load transmits to the dielectric mount sleeve 228 rather than the housing 212 and other battery module 108 components alone. In some embodiments, the load or compressive force imparted by overtightening the assembly fastener 804 may be resisted by the dielectric fastening sleeve 228 such that the lower housing 212A and cover 212B of the battery module 108 do not, and cannot, substantially deform, crack, or bend.

Figure 9A:
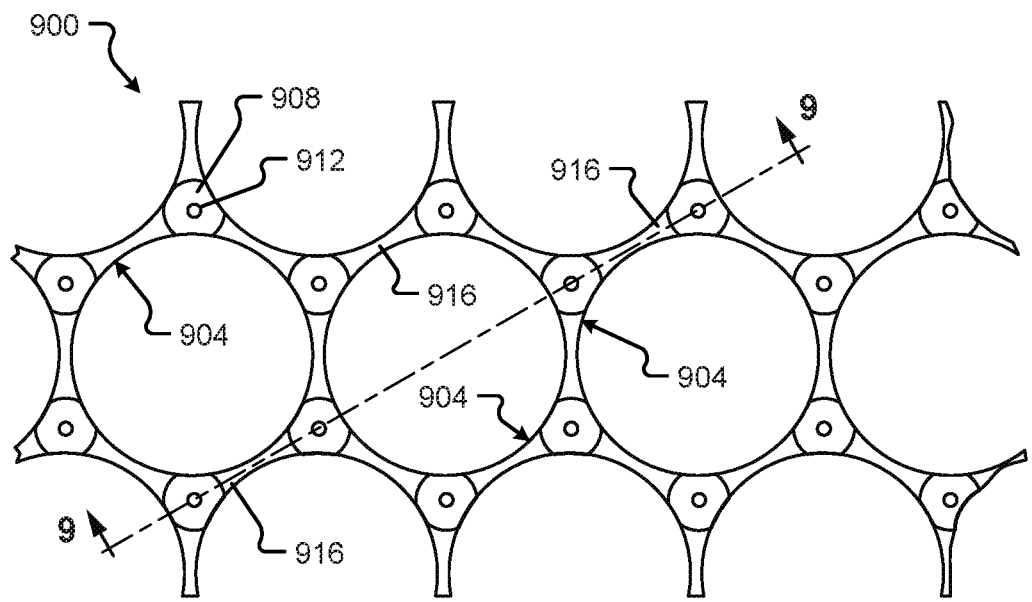
FIG. 9A shows a detail broken plan view of the battery cell location frame in accordance with embodiments of the present disclosure.

FIG. 9A shows a detail broken plan view of a battery cell location frame 900 in accordance with embodiments of the present disclosure. In some embodiments, the battery cell location frame 900 may be configured as a mechanical frame to maintain the battery cells 208 of the battery module 108 in the cell distribution pattern as described in conjunction with FIGS. 4C and 4D. For example, the receptacles 904 formed in the battery cell location frame 900 may be arranged in accordance with the cell distribution pattern configured to space apart and/or align the battery cells 208 in the battery module 108. The battery cell location frame 900 may be a part of the battery module 108 and/or integrally formed in a portion of the housing 212. For instance, and as shown in FIG. 4B, the battery cell location frame 900 may be formed in the lower housing 212A. Additionally or alternatively, the battery cell location frame 900 may be integrally formed in the cover 212B.

The battery cell location frame 900 may comprise a substantially planar substrate, through which, an array of receptacles 904 are formed. The receptacles 904 may be configured as a through-hole, or aperture, passing completely through a thickness of the substantially planar substrate. These receptacles 904 may each be sized to receive, and/or position, a battery cell 208 in the array of battery cells 208 in the battery module 108. In some embodiments, each of the receptacles 904 may be sized to receive a battery cell 208 with a slip fit. For example, the receptacles 904 may be sized at a dimension to accommodate the outer peripheral dimension of a battery cell 208 plus a tolerance (e.g., the battery cell periphery dimension plus +0.05 mm to +0.50 mm, etc.) allowing for a noninterference fit between the battery cell 208 and the receptacle 904. In some embodiments, the slip fit tolerance may be sized, set, or increased (e.g., the battery cell periphery dimension plus +0.50 mm to +1.50 mm, etc.) to include space for receiving structural adhesive 404, contact adhesive, or other material.

At the periphery of each receptacle 904, one or more protrusions 908 may extend a distance from the substantially planar substrate. This distance can provide an offset from a contacting plate or surface of the battery module 108 and may even provide one or more areas for structural adhesive 404 or other material to collect and/or adhere. The protrusions 908 may include a recess 912 configured as a receptacle, hole, blind hole, or through-hole. In any event, the recess 912 may be configured to receive structural adhesive 404, contact adhesive, two-part epoxy, time-cured adhesive, or other material providing an enhanced surface area contact between the battery cell location frame 900 and the mating materials. Once the receptacles 904 are formed in the battery cell location frame 900, the battery cell location frame 900 may comprise a number of bridges 916 between the protrusions 908 extending from the substantially planar substrate.

Figure 9B:
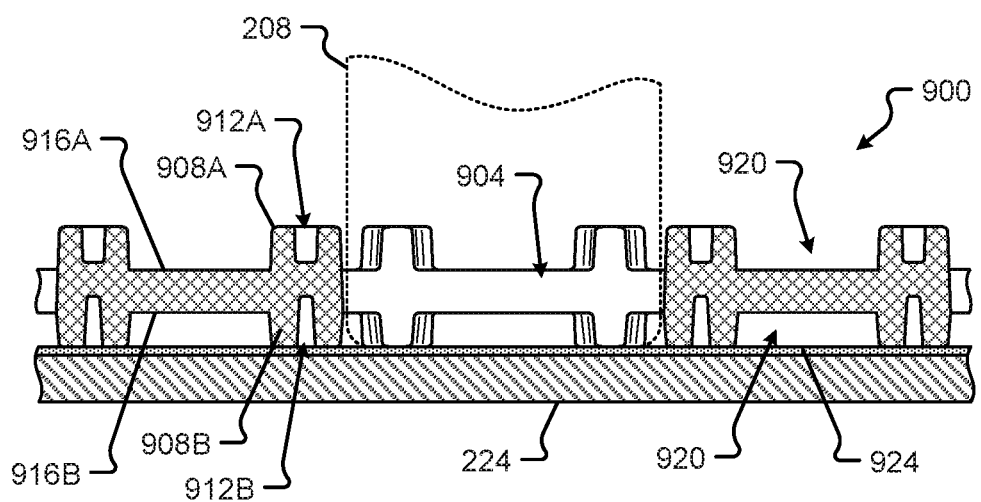
FIG. 9B shows a detail broken section elevation view of the battery cell location frame of FIG. 9A.

FIG. 9B shows a detail broken section elevation view of the battery cell location frame 900 of FIG. 9A. In particular, the section shown in FIG. 4B may be taken through line 9-9 shown in FIG. 9A. As shown in FIG. 9B, the battery cell location frame 900 may include a number of receptacles 904 configured to receive and/or position a battery cell 208. The battery cell location frame 900 in FIG. 9B is shown in contact with an adhesive layer 924 and a cooling plate 224. In some embodiments, the adhesive layer 924 may be a thermally conductive adhesive layer disposed between the battery cell location frame 900 and the cooling plate 224. The battery cell location frame 900 may include a substantially planar substrate having a first planar surface 916A and a second planar surface 916B offset from the first planar surface 916A by a thickness of the substantially planar substrate. As provided above, the receptacles 904 may be formed through the substantially planar substrate shown in FIG. 9B.

Shown at the peripheries of the receptacles 904, the protrusions 908 may be disposed on the first and/or second planar surfaces 916A, 916B between sets, or at the geometric center, of immediately adjacent receptacles 904 representing immediately adjacent battery cell positions in the battery cell distribution pattern. As shown in FIGS. 9A and 9B, the protrusions 908 may be disposed between sets, or at the geometric center, of three immediately adjacent receptacles 904 in staggered rows of the cell distribution pattern. The protrusions 908 shown in FIG. 9B, include a first protrusion 908A extending from the battery cell location frame 900 and offset a first distance from the first planar surface 916A in a direction opposite the second planar surface 916B, wherein the first protrusion 908A is disposed at a periphery of at least one of the plurality of receptacles 904. Additionally or alternatively, the protrusions 908 may include a second protrusion 908B extending from the battery cell location frame 900 and offset a distance from the second planar surface 916B in a direction opposite the first planar surface 916A, wherein the second protrusion 908B is disposed at a periphery of at least one of the plurality of receptacles 904.

In one embodiment, the first protrusion 908A may include a first recess 912A configured as a hole extending from an exterior surface of the first protrusion 908A a depth toward the first planar surface 916A of the substantially planar substrate. Additionally or alternatively, the second protrusion 908B may include a second recess 912B configured as a hole extending from an exterior surface of the second protrusion 908B a depth toward the second planar surface 916B of the substantially planar substrate. In some embodiments, the first and/or second recesses 912A, 912B may be configured as a through-hole extending completely through the first and/or second protrusions 908A, 908B. Providing a through-hole recess 912 extending through the protrusions 912 can allow for material (e.g., structural adhesive, contact or other adhesive, etc., and/or some other material) to enter the recess 912 with little resistance and easy displacement of air during assembly of the battery cell location frame 900 with other components of the battery module 108.

The first and/or second protrusions 908A, 908B may provide one or more adhesive areas 920 configured to receive structural adhesive 404. These adhesive areas 920 may provide enhanced surface contact areas between the structural adhesive 404, the battery cell location frame 900, and the battery cells 208 positioned therein. For instance, the adhesive areas 920 disposed between the battery cell location frame 900 and the adhesive layer 924/cooling plate 224 (e.g., on the second protrusion 908B side of the frame 900) provides an enhanced adhesive contact between the components in the battery module 108. Moreover, the adhesive areas 920 disposed under each bridge 916 allows the structural adhesive 404 to flow between these spaces and interconnect to each battery cell 208 therein forming the interconnected framework of adhered battery cells 208. In some embodiments, the clearance, or adhesive areas 920, under each bridge in the battery cell location frame 900 create a material flow path through which material (e.g., adhesive, etc.) may spread and disperse during assembly. Without these adhesive areas 920 (e.g., if the second protrusions 908B did not exist), the structural adhesive 404 would be unable to flow between battery cells 208 in the battery cell location frame 900 and the battery cells 208 would not be connected in the framework at the lowermost portion of each battery cell 208. As provided above, the battery cell location frame 900 may be integrated into (e.g., integrally formed in, etc.) a base portion of the lower housing 212A, an upper portion of the cover 212B, and/or be maintained as a separate component that fits within the housing 212. In any event, the battery cell location frame 900 may be made from plastic, composite, or other electrically nonconductive or insulative material, etc.

Figure 10A:
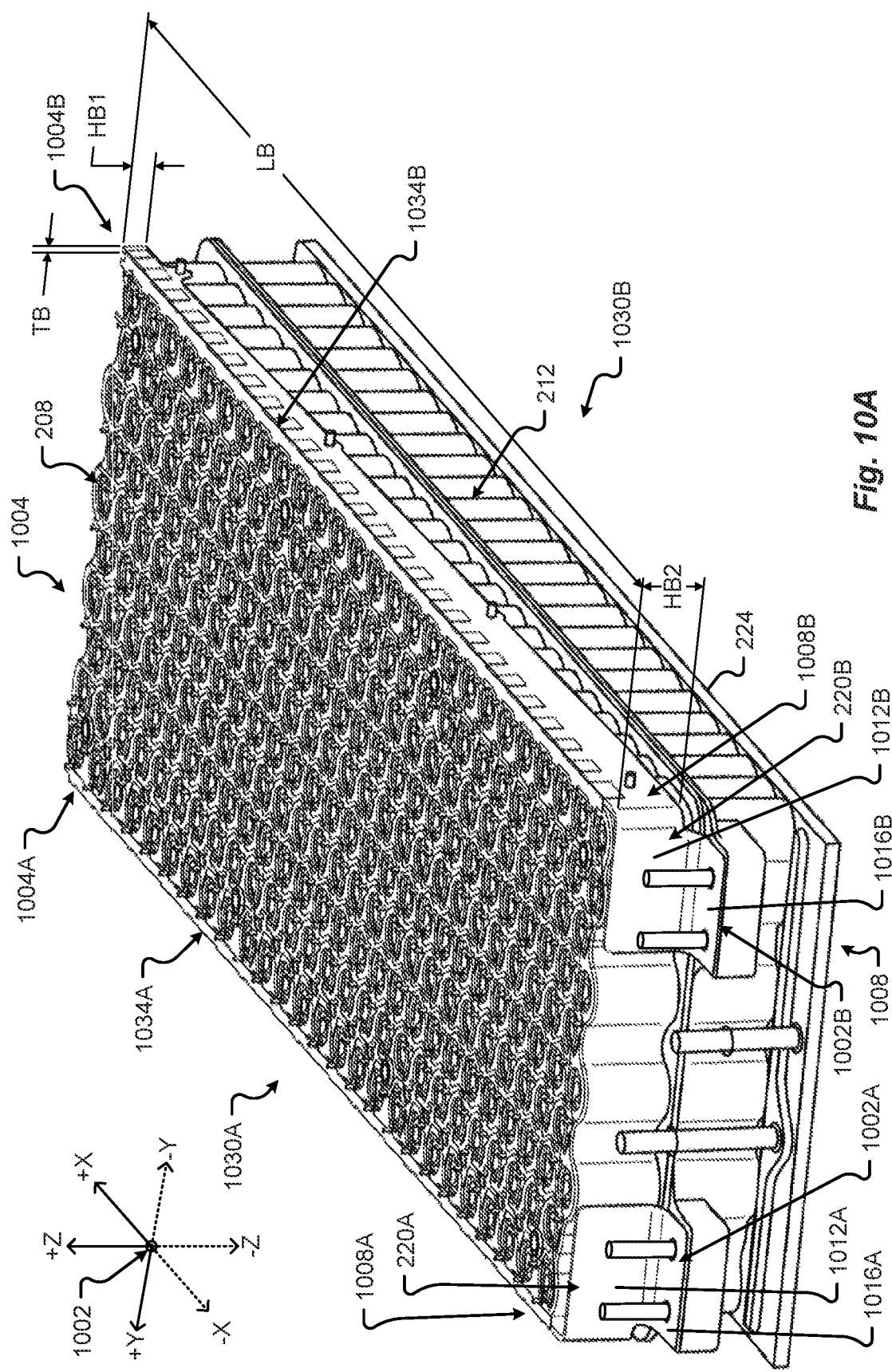
FIG. 10A shows a perspective view of a battery module and high voltage busbars in accordance with embodiments of the present disclosure.
Figure 10B:
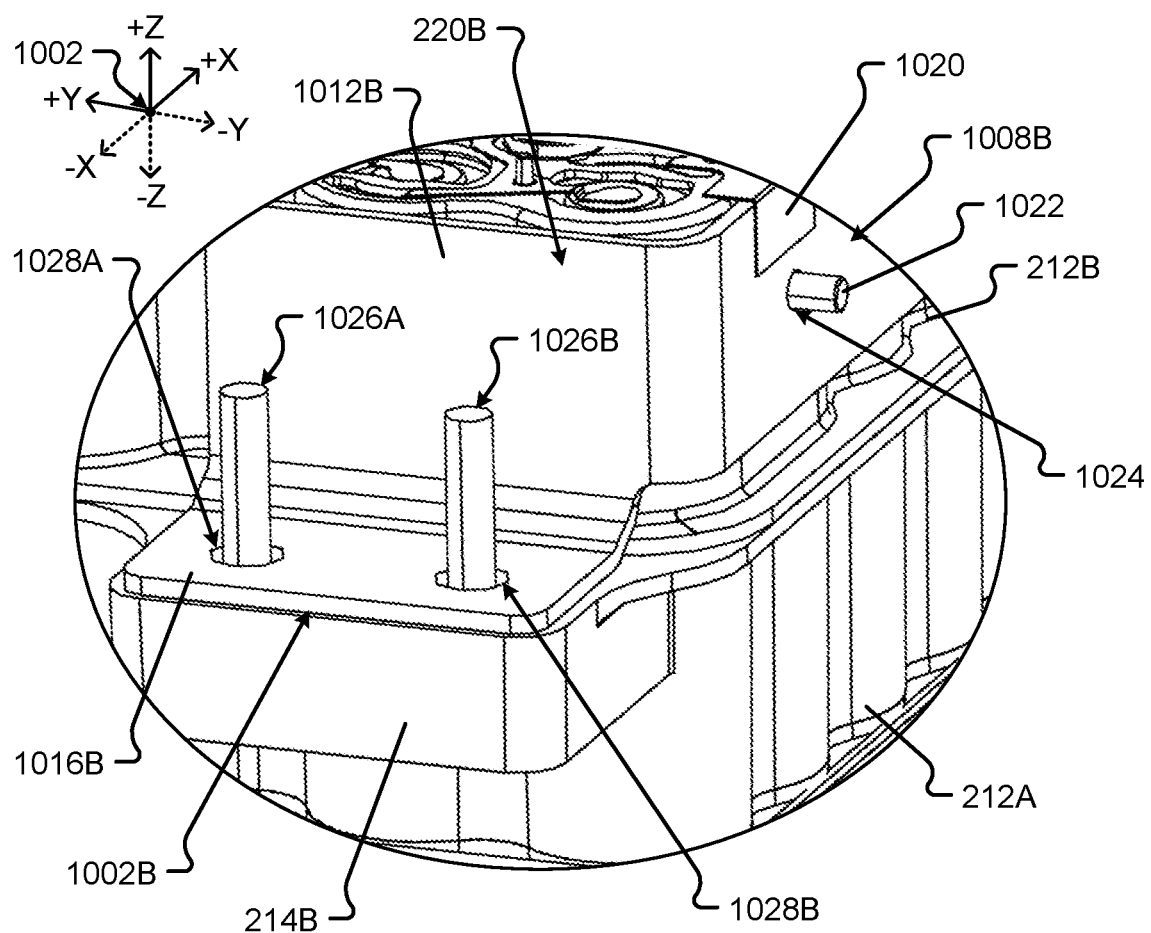
FIG. 10B shows a detail perspective view of the battery module and high voltage tapered busbars of FIG. 10A.

FIGS. 10A and 10B show various perspective views of the battery module 108 and high voltage tapered busbars 220A, 220B in accordance with embodiments of the present disclosure. Each tapered busbar 220A, 220B runs from a first end 1004A, 1004B of the battery module 108 to a second end 1008A, 1008B of the battery module 108. In one embodiment, the first tapered busbar 220A may correspond to the busbar for a positive terminal of the array of battery cells and the second tapered busbar 220B may correspond to the busbar for a negative terminal of the array of battery cells. In some embodiments, the tapered busbars 220A, 220B may include one or more holes configured, or sized, to engage with one or more terminal connectors, or terminal studs, 1026A, 1026B captured in the housing 212 of the battery module 108 (e.g., captured in the lower portion 212A of the housing 212, etc.).

As previously described, the battery module 108 may comprise a plurality of battery cells 208 arranged in a two-dimensional pattern, or array, inside the housing 212. The positive and negative terminals of the battery cells 208 may be electrically connected to the first and second tapered busbars 220A, 220B via one or more battery cell interconnects 216. For example, the battery cells 208 may be arranged in electrically parallel rows of series-connected battery cells 208. In this example, each row (e.g., each line of battery cells 208 extending from a first terminal side 1030A of the battery module 108 to a second terminal side 1030B of the battery module 108 along the Y-axis direction as illustrated by the coordinate system 1002) may include a number of battery cells 208 connected in series to one another via the battery cell interconnects 216 and row interconnections 1034A, 1034B. The row interconnections 1034A, 1034B may correspond to positive and negative battery cell row busbars that electrically connect each row of series-connected battery cells 208 in the battery module 108 to the tapered busbars 220A, 220B, respectively.

Each row of series-connected battery cells in the array of battery cells 208 may be spaced apart along the X-axis direction such that an array of spaced apart electrical interconnection points 1020 are disposed along the length, LB. In some embodiments, the length, LB may correspond to a length of the tapered busbars 220A, 220B, the array of battery cells 208, and/or the battery module 108. Adjacent rows in the battery module 108 (e.g., rows running substantially along the Y-axis direction and distributed along the X-axis direction, etc.) may be physically and electrically parallel to one another. As successive rows of battery cells 208 are added (e.g., electrically interconnected to the tapered busbars 220A, 220B) from the first end 1004A, 1004B toward the second end 1008A, 1008B, the overall amount of electrical current provided to the busbars 220A, 220B from the interconnected battery cells 208 increases. For instance, the first row of series-connected battery cells 208 may be disposed adjacent to the first end 1004 of the battery module 108, and the current provided to the tapered busbars 220A, 220B interconnection at the first end 1004A, 1004B of the tapered busbars 220A, 220B may equal the amount of current for a single row of battery cells 208. As can be appreciated, the greatest amount of current provided to the busbars 220A, 220B may be at the second end 1008A, 1008B of the tapered busbars 220A, 220B of the battery module 108. It is an aspect of the present disclosure to provide an increasing cross-sectional area of the tapered busbars 220A, 220B along the length, LB, to provide uniform current density (e.g., the measurement of electric current per unit area of busbar cross-section, for example, in amperes per square meter) measured at any point along the length, LB.

It should be appreciated that the rows of series-connected battery cells 208 described herein may refer to electrically-connected cells 208 (e.g., battery cells 208 connected in series, etc.) disposed substantially along a path running in the Y-axis direction of the battery module 108. These rows may be arranged in a substantially linear, staggered, spaced apart, and/or other path or combination of paths running from one terminal side 1030A of the battery module 108 to the other terminal side 1030B of the battery module 108.

As shown in FIG. 10A, the first and second tapered busbars 220A, 220B are disposed on a first terminal side 1030A and a second terminal side 1030B of the battery module 108. The first tapered busbar 220A may be substantially similar, if not identical, to the second tapered busbar 220B. In some embodiments, the first tapered busbar 220A may be arranged as a mirror image of the second tapered busbar 220B, and/or vice versa (e.g., mirrored about the XZ-plane). As each busbar 220A, 220B is substantially similar in construction, the details and features described in conjunction with one busbar 220A/220B may correspond to the other busbar 220B/220A. However, the first tapered busbar 220A may be associated with the first terminal row interconnection busbar 1034A and the second tapered busbar 220B may be associated with the second terminal row interconnection busbar 1034B. For the sake of clarity in disclosure, the details, features, and interconnections of the second tapered busbar 220B, which also may apply to the first tapered busbar 220A, will be described in conjunction with FIGS. 10A-11.

The tapered busbar 220B may be made from an electrically-conductive material (e.g., metal, copper, aluminum, steel, graphene, etc., and/or combinations thereof) forming an electrically-conductive and substantially planar member at least extending along length, LB. The tapered busbar 220B may be of substantially uniform thickness, TB along length, LB. For instance, the tapered busbar 220B may include a substantially planar portion made from strip of sheet material (e.g., sheet metal, copper, aluminum, steel, etc.) including one or more bent, formed, and/or otherwise shaped features. This substantially planar member may include a first height, HB1, at the first end 1004B of the tapered busbar 220B (and first end 1004 of the battery module 108) and a second greater height, HB2, at the second end 1008B of the tapered busbar 220B (and second end 1008 of the battery module 108). In some embodiments, the substantially planar member of the tapered busbar 220B may gradually taper, and increase in height from the first end 1004B to the second end 1008B (e.g., between the first and second heights HB1, HB2).

As the height changes over the length, LB, the cross-sectional area of the substantially planar member of the tapered busbar 220B may increase. For example, the thickness, TB, may remain substantially uniform along the length, LB, while the gradual change in height changes the cross-sectional area for the tapered busbar 220B (e.g., where the cross-sectional area (CSA) for the tapered busbar may be defined by the equation CSA=TB×HB*, where HB* is the height of the substantially planar member at any given point along the length, LB, of the tapered busbar 220B). It is an aspect of the present disclosure that the gradually increasing cross-sectional area of the tapered busbar 220B may provide a uniform current density at any point along the tapered busbar length, LB.

In some embodiments, the shape of the tapered busbar 220B (e.g., the size of the cross-sectional area at any given point along the length, LB) may be tuned, or custom generated, to provide a uniform current density for the battery cells 208 connected at any given point along the length, LB. By way of example, tuning the cross-sectional area may include determining the amount of current provided by a single row of connected battery cells 208 (e.g., the first row disposed at the first end 1004 of the battery module 108) and determining the cross-sectional area of the tapered busbar 220B at the point of connection for the single row (e.g., the first end 1004B of the tapered busbar 220B), this amount of current divided by the cross-sectional area may correspond to the first current density measurement. Next, the shape tuning may include determining the current provided by all of the rows of battery cells 208 connected to the tapered busbar 220B at a different point along the length, LB, of the tapered busbar 220B. Using this subsequent current value and the first current density determined for the single row, the height for the tapered busbar 220B (and corresponding cross-sectional area for the tapered busbar 220B) may be determined for the different point of connection. Continuing this example, and based on the assumption that the thickness, TB, of the tapered busbar 220B is substantially constant, or uniform, along the length LB, of the tapered busbar 220B, the height of the tapered busbar 220B at the different point of connection may be calculated by selecting a height such that the ratio of the first current density (e.g., $A/m^2$) matches the ratio of the second current density ($A/m^2$). Using this tuning method, for example, if the first current density provides a first ratio of 4 $A/m^2$ (e.g., the first CSA defined as CSA=TB×HB1), and if the subsequent current value is determined to be 8 A, then the subsequent cross-sectional area must be two times the first cross-sectional area, such that the first ratio matches, or substantially matches, the second ratio (e.g., 8 A/2 $m^2$=4 $A/m^2$). In this example, the height of the tapered busbar 220B at the different point of connection may be determined based on the following equation: 2CSA=TB×HBN, where HBN is the height at the different point of connection. Solving for the height at the different point of connection, HBN, provides the following equation: HBN=(2CSA)/TB.

The tapered busbar 220B may include a terminal connection tab 1012B disposed at the second end 1008B of the tapered busbar 220B. In some embodiments, the terminal connection tab 1012B may be integrally formed from the substantially planar member of the tapered busbar 220B. For instance, the terminal connection tab 1012B may be a bent end of the sheet material making up the tapered busbar 220B. In one embodiment, the terminal connection tab 1012B may be bent, or formed, such that the terminal connection tab 1012 extends substantially orthogonal to the substantially planar member of the tapered busbar 220B. This bent, or formed, terminal connection tab 1012B may provide additional strength for the battery module 108, where the tapered busbar 220B is connected to the housing 212 of the battery module 108 along the terminal edge (e.g., the edge running along the X-axis direction and extending along the length, LB) and connected to a portion of the housing 212 (e.g., the lower housing 212A, via one or more terminal connectors 1026A, 1026B captured in the lower housing 212A). Among other things, this attachment of the rigid tapered busbar 220B to the housing 212 of the battery module 108 may provide a resistance to bending of the battery module 108 about the X-axis, Y-axis, and/or the Z-axis. As shown in FIG. 10B, the tapered busbar 220B may include a plurality of holes disposed along the substantially planar member of the tapered busbar 220B. The holes may pass completely through the thickness, TB, of the tapered busbar 220B and engage with a housing fastening feature 1022. In one embodiment, the housing fastening feature 1022 may be a protrusion, fastener, stud, captured stud, standoff, etc. In some embodiments, the housing fastening feature 1022 may be a heat stake feature (e.g., a plastic material capable of being deformed via heat, changing the shape of the feature to dome the housing fastening feature 1022 over the hole 1024, capturing the tapered busbar 220B in place).

The terminal connection tab 1012B of the tapered busbar 220B may include a second bent, or formed portion 1002B from a surface of the terminal connection tab 1012B. In some embodiments, this portion 1002B may be formed substantially orthogonal to the terminal connection tab 1012B. In one embodiment, the portion 1002B may be substantially planar extending in the X-axis direction (e.g., in the negative X-axis direction, running in the XY-plane, parallel to the terminal edge of the battery module 108. The portion 1002B may include one or more holes 1028A, 1028B to receive the one or more terminal connectors 1026A, 1026B. In one embodiment, the tapered busbar 220B may be arranged with two holes 1028A, 1028B sized to receive two terminal connectors 1026A, 1026B. The two terminal connectors 1026A, 1026B may correspond to an electrical connection point to the tapered busbar 220B and a terminal of the array of battery cells (e.g., negative or positive). As illustrated in FIG. 10B, the two terminal connectors 1026A, 1026B provide a connection stud, or fastener, feature that engages with the two holes 1028A, 1028B of the tapered busbar 220B, where each of the two terminal connectors 1026A, 1026B disposed at the second end 1008B have the same polarity (e.g., both positive or both negative). The two terminal connectors 1026A, 1026B may correspond to threaded fasteners, bolts, captured fasteners, threaded rods, and/or other threaded elements configured to receive and/or engage with a high voltage power connector (e.g., for an electric vehicle power system, etc.) and a clamping element (e.g., a nut, threaded nut, hex nut, mount nut, etc.). Examples of the high voltage power connector may include, but are in no way limited to, a ring terminal connector, U-shaped terminal connector, eyelet connector, hook terminal connector, spade terminal connector, lug, and/or some other terminal connector.

The portion 1002B of the tapered busbar 220B is shown in FIG. 10B in contact with a substantially planar surface of a lower housing terminal protrusion 214B. The clamping elements (e.g., nuts) and high voltage power connectors are not shown in FIGS. 10A and 10B for clarity of description. In any event, each high voltage power connector may engage with a portion of a respective terminal connector 1026A, 1026B and a surface 1016B of the portion 1002B of the tapered busbar 220B, the high voltage power connectors clamped against the substantially planar surface of the housing 212 via the clamping elements and providing an electrical interconnection between the high voltage power connectors and a single terminal (e.g., positive or negative terminal) of the array of battery cells 208. In some embodiments, each high voltage power connector may be configured to handle the current provided by the tapered busbar 220B and the array of battery cells 208. As can be appreciated, providing two terminal connectors 1026A, 1026B allows the battery module 108 to have two high voltage interconnections that can, among other things, provide a fail-safe redundant design in the event that a single interconnection at the busbar end 1008B fails. Additionally or alternatively, the two terminal connectors 1026A, 1026B can serve as keying features to locate the tapered busbar 220B to the housing 212 of the battery module 108, and may even serve as poka-yoke features to correctly mount the appropriate tapered busbar 220A, 220B to the appropriate terminal side 1030A, 1030B of the battery module 108, respectively.

Figure 11:
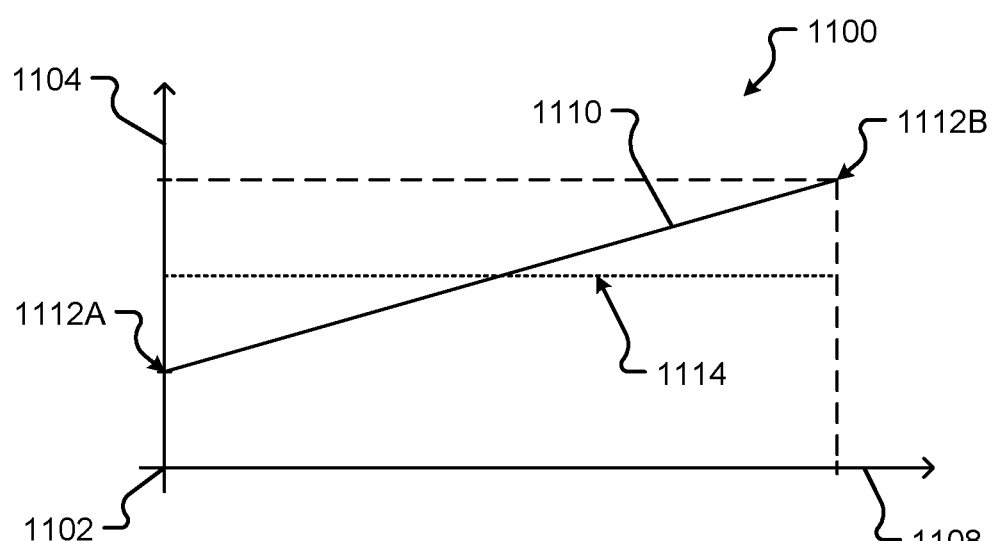
FIG. 11 shows a graphical representation of a uniform current density for a tapered busbar of a battery module superimposed on a graph measuring the gradually increasing cross-sectional area for the tapered busbar along a length of the tapered busbar in accordance with embodiments of the present disclosure.

FIG. 11 shows a graphical representation of a uniform current density 1114 for a tapered busbar 220B superimposed on a graph 1100 measuring the gradually increasing cross-sectional area for the tapered busbar 220B along the length, LB, of the tapered busbar 220B in accordance with embodiments of the present disclosure. The graphical representation includes a vertical axis 1104 representing the cross-sectional area of the tapered busbar 220B, which ranges from zero square meters at the origin 1102 to increasing non-zero cross-sectional area values moving up the vertical axis 1104 (e.g., in a direction away from the origin 1102). In addition, the graphical representation includes a horizontal axis 1108 representing the length, LB, along the tapered busbar 220B, ranging from the first end 1004B of the tapered busbar 220B (at the origin 1102) to the second end 1008B of the tapered busbar 220B (at the measured point furthest from the origin on the horizontal axis 1108).

As illustrated in FIG. 11, the gradually increasing cross-sectional area of the tapered busbar 220B is represented by line 1110. Line 1110 extends from a first cross-sectional area 1112A, measured at the first end 1004B of the tapered busbar 220B, to a greater second cross-sectional area 1112B, measured at the second end 1008B of the tapered busbar 220B. The current density 1114 is shown superimposed on the graph 1100 as being substantially uniform, and/or constant, along the length, LB, of the tapered busbar 220B. Although shown as a substantially linear change in cross-sectional area from the first cross-sectional area 1112A to the second cross-sectional area 1112B, it should be appreciated that the change in cross-sectional area from point to point along the length, LB, of the tapered busbar 220B may be exponential, logarithmic, non-linear, and/or any combination of linear and non-linear function.

Figure 12A:
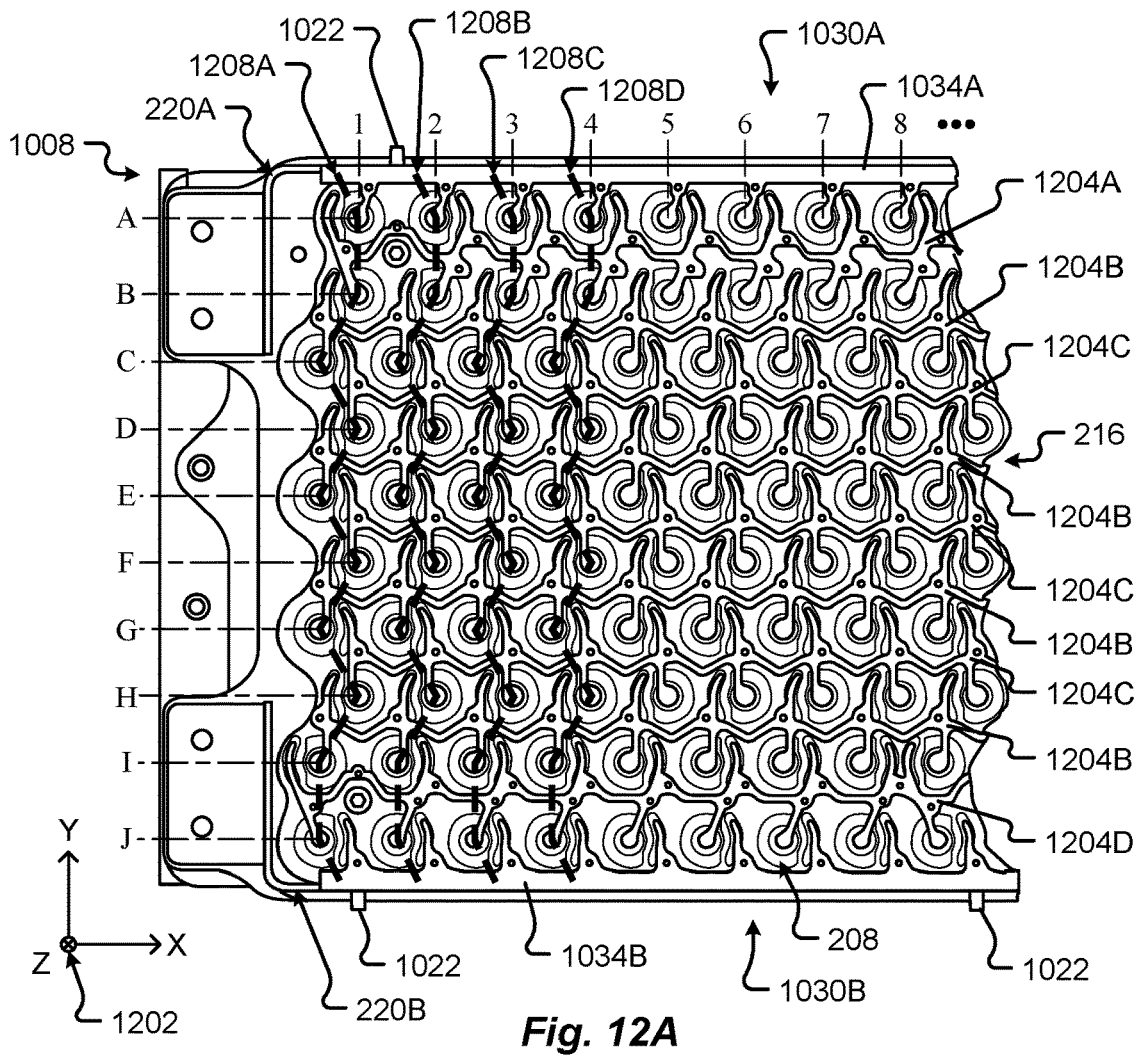
FIG. 12A shows a broken plan view of the battery module and cell-to-cell electrical interconnections in accordance with embodiments of the present disclosure.
Figure 12B:
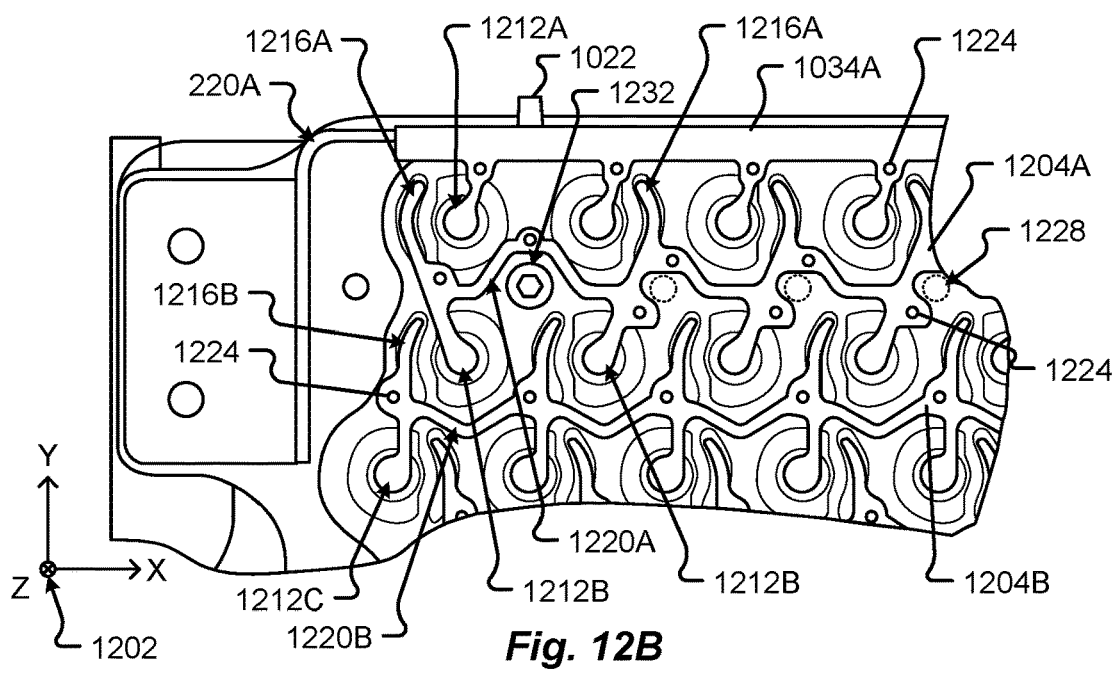
FIG. 12B shows a detail of the broken plan view of the battery module shown in FIG. 12A.

Referring to FIGS. 12A and 12B, various plan views of the battery module 108 and cell-to-cell electrical interconnections 216 are shown in accordance with embodiments of the present disclosure. As described herein, the battery module 108 may comprise an array of battery cells 208 arranged in a matrix, or other, configuration including a number of horizontal rows running along the X-axis direction (e.g., represented by letters A-J in FIG. 12A) and a number of vertical rows running substantially along the Y-axis direction (e.g., represented by numbers 1-8, etc. in FIG. 12A). In some embodiments, the vertical rows of series-connected battery cells 208 may be referred to as "columns" of battery cells 208. As can be appreciated, individual battery cells 208 in the array of battery cells 208 and/or battery module 108 may be referred to herein by their horizontal row position and their vertical row position. For instance, the battery cell shown in the top leftmost position of the battery module 108 illustrated in FIGS. 12A and 12B may be referred to as battery cell A1, while the battery cell shown in the lower leftmost position of the battery module 108 may be referred to as battery cell J1.

As shown in FIG. 12A, a number of battery cells 208 arranged in a vertical row (e.g., numbers 1-8, etc.) may be electrically-connected to one another in series (e.g., connecting the positive terminal of a first battery cell in the vertical row to the negative terminal of an adjacent battery cell in the vertical row, and the positive terminal of the adjacent battery cell in the vertical row to the negative terminal of yet another adjacent battery cell in the vertical row, and so on, etc.) via one or more cell-to-cell electrical interconnections 216. For example, the first vertical row (e.g., row 1) may be electrically interconnected along a electrically-connected path 1208A (shown as a dashed line) from the first battery cell A1 to the last battery cell J1, in the vertical row. In this example, the battery cells 208 are connected in order, A1-B1-C1-D1-E1-F1-G1-H1-I1-J1, from the first terminal side 1030A to the second terminal side 1030B, or vice versa. The second vertical row (e.g., row 2 shown in FIG. 12A) may be electrically interconnected along a connected path 1208B from the first battery cell A2 to the last battery cell J2, in the vertical row. In this example, the battery cells 208 are connected in order, A2-B2-C2-D2-E2-F2-G2-H2-I2-J2, from the first terminal side 1030A to the second terminal side 1030B of the battery module 108, or vice versa. As described above, the electrically connected paths 1208A and 1208B, and rows 1 and 2, are arranged electrically-parallel to one another. While only four electrically connected paths 1208A-D are shown in FIG. 12A (for the sake of clarity), it should be appreciated, that the number of parallel rows (e.g., 1-8, etc.) and electrically connected paths (e.g., 1208A-D, etc.) may extend along the length, LB, of the battery module 108 and/or the tapered busbars 220A, 220B.

In some embodiments, the positive terminals of each vertical row of battery cells 208 (e.g., rows 1-8, etc.) may electrically interconnect to the first battery module busbar 220A at the first terminal side 1030A of the battery module 108 (e.g., via a first edge row interconnection busbar 1034A including one or more legs attached to the first battery module busbar 220A). Additionally or alternatively, the negative terminals of each vertical row of battery cells 208 (e.g., rows 1-8, etc.) may connect to the second battery module busbar 220B at the second terminal side 1030B of the battery module 108 (e.g., via a second edge row interconnection busbar 1034B including one or more legs attached to the second battery module busbar 220B). Although shown in FIG. 12A as including ten horizontal rows of battery cells 208 (e.g., represented by letters A-J) and approximately eight vertical rows of battery cells 208 (e.g., represented by numbers 1-8, etc.) it is an aspect of the present disclosure that the battery module 108 may include more or fewer vertical and/or horizontal rows of battery cells 208 than those illustrated in FIG. 12A.

The cell-to-cell electrical interconnections 216 may comprise a number of separate cell-to-cell interconnections that, when attached to the battery cells 208 in the battery module 108, form a battery cell array electrical interconnection. As provided above, the cell-to-cell electrical interconnections 216 may include a first edge row interconnection busbar 1034A configured to connect a same terminal (e.g., polarity) of each battery cell 208 in the first horizontal row, row A, of the battery module 108 to the first battery module, tapered, busbar 220A. In some embodiments, the first edge row interconnection busbar 1034A may include an electrically-conductive member extending along the first terminal edge of the battery module 108. The electrically-conductive member may include a substantially planar strip disposed in a plane parallel to the first terminals of the battery cells 208 in the battery module 108. The electrically-conductive member may include a plurality of positive terminal contact fingers extending in the parallel plane in a direction away from the substantially planar strip (e.g., from the first busbar 220A toward the first horizontal row of battery cells, row A). In one embodiment, the electrically-conductive member may include a plurality of busbar legs spaced apart from one another and extending in a second plane substantially orthogonal to the plane of the first terminals, and/or parallel to a side of the battery module 108 or busbar 220A. Each of the plurality of busbar legs may be welded, or otherwise affixed, to the first busbar 220A forming an electrically-conductive path between the battery cells 208 and the first busbar 220A.

Additionally or alternatively, the cell-to-cell electrical interconnections 216 may include a second edge row interconnection busbar 1034B configured to connect an opposite same terminal (e.g., opposite polarity) of each battery cell 208 in the last horizontal row, J, of the battery module 108 to the second battery module, tapered, busbar 220B. In some embodiments, the second edge row interconnection busbar 1034B may include an electrically-conductive member extending along the second terminal edge of the battery module 108. One or more portions of the second edge row interconnection busbar 1034B may be configured as a mirror image, or corresponding opposite, of one or more portions of the first edge row interconnection busbar 1034A. For example, the electrically-conductive member of the second edge row interconnection busbar 1034B may similarly include a substantially planar strip disposed in a plane parallel to the first terminals of the battery cells 208 in the battery module 108. This electrically-conductive member may include a plurality of negative terminal contact fingers extending in the parallel plane in a direction away from the substantially planar strip (e.g., from the second busbar 220B toward the last horizontal row of battery cells, row J). In one embodiment, the electrically-conductive member may similarly include a plurality of busbar legs spaced apart from one another and extending in a second plane substantially orthogonal to the plane of the first terminals, and/or parallel to a side of the battery module 108 or second busbar 220B. Each of the plurality of busbar legs may be welded, or otherwise affixed, to the second busbar 220B forming an electrically-conductive path between the battery cells 208 and the second busbar 220B.

In some embodiments, the cell-to-cell electrical interconnections 216 may include a number of internal, or battery cell group interconnection, busbars 1204A-D. While one or more of the internal busbars 1204A-D may be configured in a number of different shapes, it should be appreciated that each of the internal busbars 1204A-D may share a common set of features and/or shapes providing series and parallel interconnections between one or more groups of battery cells 208 in the battery module 108. For instance, each internal busbar 1204A-D may comprise an electrically-conductive strip extending along a length, LB, or an approximate length of the battery module 108 in a first plane (e.g., a plane parallel to a same terminal of all battery cells 208 in the battery module 108, etc.). The electrically-conductive strip may include a plurality of first terminal strips 1212A, 1212B, etc. integrally formed from the electrically-conductive strip and extending in a first direction (e.g., in the Y-axis negative direction) away from the electrically-conductive strip in the first plane (e.g., toward a first terminal for battery cells 208 in a single horizontal row, e.g., B-J, etc.). In one embodiment, each of the first terminal strips 1212B, 1212C, etc. may be spaced apart from one another along the length of the battery module 108 and/or the electrically-conductive strip. Additionally or alternatively, the electrically-conductive strip for each internal busbar 1204A-D may include a plurality of second terminal strips 1216A, 1216B, etc. integrally formed from the electrically-conductive strip and extending in a second direction (e.g., in the Y-axis positive direction) away from the electrically-conductive strip in the first plane (e.g., toward the second terminal for battery cells 208 in another, different, single horizontal row, e.g., A-I, etc.). The plurality of second terminal strips 1216A, 1216B, etc. may be spaced apart from one another along the length, LB, of the battery module 108 and/or the electrically-conductive strip. In any event, the first and second terminal strips 1212B, 1212C, etc., 1216A, 1216B, etc., may be made from an electrically-conductive material forming an electrically-conductive path running from each of the plurality of first terminal strips 1212B, 1212C, etc. through the electrically-conductive strip to each of the plurality of second terminal strips 1216A, 1216B, etc.

As shown in the detail view of FIG. 12B, the first edge row interconnection busbar 1034A may include a number of first terminal strips 1212A disposed along the length of the busbar 1034A. These first terminal strips 1212A may contact the first terminal (e.g., the positive terminal) of each battery cell 208 in the first row, row A, of the battery module 108. Additionally, and as described herein, the first edge row interconnection busbar 1034A may contact the first busbar 220A (e.g., the positive high voltage busbar) forming an electrically-conductive path between the first terminals of the battery cells 208 in the battery module 108 and the first busbar 220A.

Continuing along the Y-axis negative direction, the cell-to-cell electrical interconnections 216 include a first internal busbar 1204 having an electrically-conductive strip extending along the X-axis positive direction. The first internal busbar 1204 may include a first terminal strip 1212B extending from an approximate center of the electrically-conductive strip to the second horizontal row, row B, of battery cells 208 in the battery module 108. These first terminal strips 1212B of the first internal busbar 1204A may contact the first terminal (e.g., the positive terminal) of each battery cell 208 in the second row, row B, of the battery module 108. In addition, the first internal busbar 1204 may include a second terminal strip 1212B extending from an approximate center of the electrically-conductive strip to the first horizontal row, row A, of battery cells 208 in the battery module 108. These second terminal strips 1212B of the first internal busbar 1204A may contact the second terminal (e.g., the negative terminal) of each battery cell 208 in the first row, row A, of the battery module 108. As can be appreciated, a number of electrically-conductive paths are formed from the first busbar 220A through the first edge row interconnection busbar 1034A to the first horizontal row, row A, and the second horizontal row, row B, of battery cells 208 in the battery module. The electrically-conductive paths may continue as additional internal busbars 1204A-D, in various combinations, join additional groups of battery cells 208 together in the battery module 108.

The internal busbars 1204A-D may be disposed in the same plane between the first and second edge row interconnection busbars 1034A, 1034B of the battery module 108. As shown in FIG. 12A, some internal busbars 1204A-D may be the same as others based on an orientation, shape, and/or arrangement of the first and second terminal strips 1212, 1216 along a length of the battery module 108. By way of example, the second internal busbar 1204B, coupling battery cells 208 from a pair of horizontal rows, rows B-C, together, has a substantially similar, if not identical, arrangement of first and second terminal strips 1212, 1216 to those of the second internal busbar 1204B coupling battery cells from other pairs of horizontal rows (e.g., rows D-E, rows F-G, and rows H-I) together, respectively. The same may apply to the third internal busbar 1204C, coupling battery cells 208 from pairs of horizontal rows, rows C-D, rows E-F, rows G-H, together.

At the second terminal side 1030B of the battery module 108, shown in FIG. 12A, the second edge row interconnection busbar 1034B may include a number of second terminal strips 1216 disposed along the length of the second busbar 1034B. These second terminal strips 1216 may contact the second terminal (e.g., the negative terminal) of each battery cell 208 in the last row, row J, of the battery module 108. Additionally, and as described herein, the second edge row interconnection busbar 1034B may contact the second busbar 220B (e.g., the negative high voltage busbar) forming an electrically-conductive path between the second terminals of the battery cells 208 in the battery module 108 and the second busbar 220B.

It is an aspect of the present disclosure that first and second terminal strips 1212, 1216 associated with a first vertical row (e.g., series-connected row) of battery cells 208 (e.g., one of rows 1-8, etc.) may be spaced apart from immediately adjacent first and second terminal strips 1212, 1216 associated with a second vertical row (e.g., series-connected row) of battery cells 208 (e.g., an adjacent row to the one of rows 1-8, etc.) by an electrically-conductive bridge 1220 formed in the electrically-conductive strip of the internal busbar 1204. For instance, first and second terminal strips 1212B, 1216A associated with the first vertical row, row 1, may be spaced apart from the immediately adjacent first and second terminal strips 1212B, 1216A associated with the second vertical row, row 2, by the electrically-conductive bridge 1220A formed in the electrically-conductive strip of the first internal busbar 1204A. In some embodiments, the electrically-conductive bridge 1220 may be arranged along a path to create one or more feature spaces 1228. For example, the electrically-conductive bridge 1220 may divert and/or direct around fasteners 1232 and/or other feature spaces 1228 to provide access and/or electrical insulation between components in the battery module 108. Although arranged to provide the one or more feature spaces 1228 by following a path around an element, or area, it should be appreciated, that the electrically-conductive bridge 1220 remains substantially flat and in the same plane as the electrically-conductive strip and/or portions of the first and second terminal strips 1212, 1216.

In some embodiments, a plurality of battery module mount holes 1224 may be disposed in the one or more cell-to-cell electrical interconnections 216. For example, the mount holes 1224 may be configured as through holes passing through a thickness of the busbars 1034A, 1034B, 1204A-D, etc. and arranged along a length of each busbar 1034A, 1034B, 1204A-D, etc. In some cases, the mount holes 1224 may be spaced according to a spacing of the battery cells 208 in the battery module 108. In one embodiment, the mount holes 1224 may match a fixed spacing of a series of mount features (e.g., protrusions, etc.) disposed in the housing 212 of the battery module 108. In any event, the mount holes 1224 may be configured to align with and/or engage with these mount features to orient the various busbars 1034A, 1034B, 1204A-D, etc. relative to the battery cells 208, the housing 212, and/or one or more other portions of the battery module 108.

Figure 13:
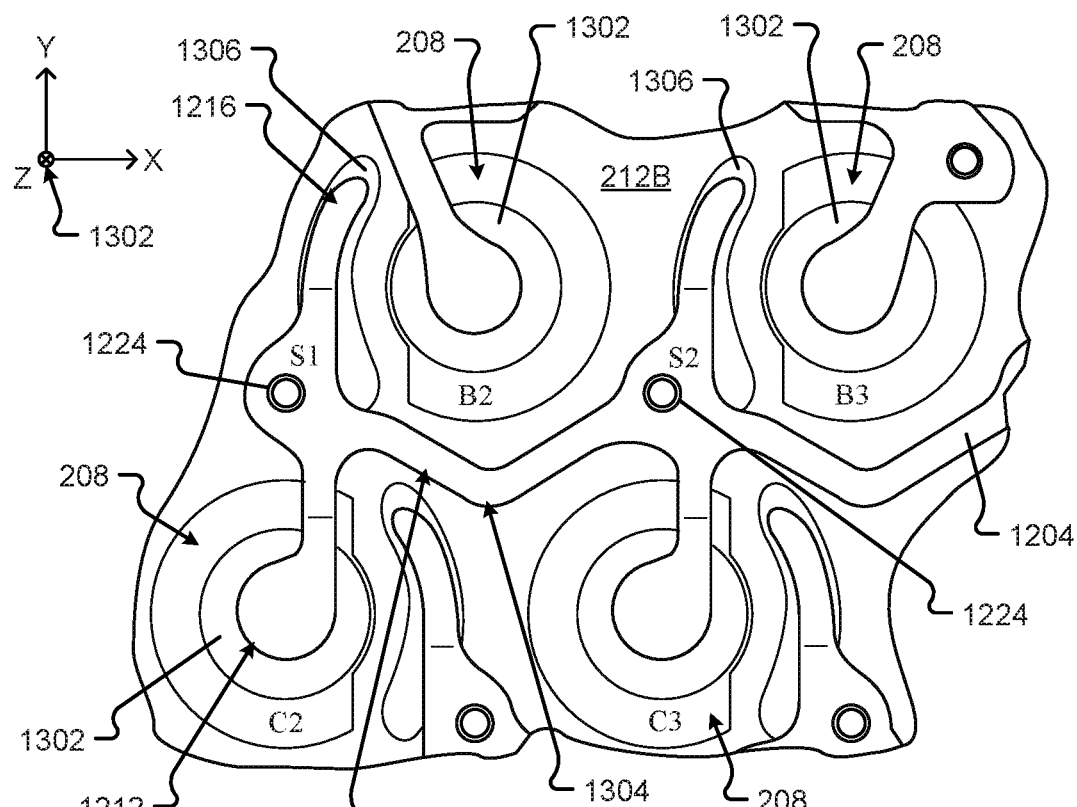
FIG. 13 shows a detail broken plan view of the battery module and cell-to-cell electrical interconnections in accordance with embodiments of the present disclosure.

FIG. 13 shows a detail broken plan view of the battery module 108 and cell-to-cell electrical interconnections 216 in accordance with embodiments of the present disclosure. More specifically, FIG. 13 shows a detail view of an internal busbar 1204 of the cell-to-cell electrical interconnections 216 and a controlled expansion feature 1304 of the electrically-conductive bridge 1220. In some embodiments, the internal busbar 1204 shown in FIG. 13 may correspond to any busbar 1034A, 1034B, 1204A-D, etc. in the cell-to-cell electrical interconnections 216 described herein. In one embodiment, the internal busbar 1204 shown in FIG. 13 may correspond to the second internal busbar 1204B as described above. In any event, FIG. 13 shows a number, or group, of battery cells 208 arranged immediately adjacent to one another in the battery module 108. Each battery cell 208 in the group of battery cells 208 shown in FIG. 13 is labeled with a battery cell identifier (e.g., B2, B3, C2, and C3). Each battery cell 208 may include a first terminal contact substrate 1302, or cap (e.g., corresponding to the positive terminal of the battery cell 208) and a second terminal contact substrate 1306, or casing (e.g., corresponding to the negative terminal of the battery cell 208). All of the battery cells 208 in the battery module 108 are shown having the first terminals (e.g., positive terminals) facing the same direction. The internal busbar 1204 includes a first terminal strip 1212 in contact with, or welded to, the first terminal contact substrate 1302 of battery cell, C2, and a second terminal strip 1216 in contact with, or welded to, the second terminal contact substrate 1306 of battery cell, B2, joining the battery cells B2-C2 in series.

The internal busbar 1204 may be attached to the housing 212, or upper housing 212B, of the battery module 108 via a number of static mount features S1, S2 disposed along a portion of the upper housing 212B. The static mount features S1, S2 may define fixed points and/or protrusions extending a distance from an upper surface of the upper housing 212B (e.g., out of the page, along the Z-axis direction) and along a length of the battery module 108. The mount holes 1224 of the internal busbar 1204 may align and engage with these static mount features S1, S2 and as the internal busbar 1204 is lowered onto the features S1, S2, a substantially planar surface of the electrically-conductive strip of the busbar 1204 may contact the upper surface of the upper housing 212B when in place. As the battery module 108 generates heat, or is subjected to heat, the distance between the fixed static mount features S1, S2 may change at a different rate than the distance between the battery cells 208 and/or the corresponding mount holes 1224 on the internal busbar 1204. This difference in rate of change in dimension may be related to different coefficients of thermal expansion associated with the materials making up the housing 212 and/or the internal busbar 1204. The present disclosure provides a controlled expansion feature 1304 allowing for these differences in coefficients of thermal expansion and/or tolerance issues associated with the position of the static mount features S1, S2.

For example, the controlled expansion feature 1304 may be formed in the in the same plane integrally with the electrically-conductive strip. In some embodiments, the controlled expansion feature 1304 may be disposed between immediately adjacent terminal strips 1212, 1216 in the spaced apart terminal strips 1212, 1216 along the length of the battery module 108. As the dimension between the static mount features S1, S2 shrinks or grows (e.g., due to cold or hot temperatures, respectively) the controlled expansion feature 1304, configured as a knee in the electrically-conductive strip, may move in the same plane (e.g., the XY-plane) of the electrically-conductive strip and along the Y-axis direction compensating for the dimensional change. In one embodiment, the controlled expansion feature 1304 may be substantially V-shaped and/or U-shaped in an area between the static mount features S1, S2. It is an aspect of the present disclosure that the controlled expansion feature 1304 may move in the XY-plane without moving out of the XY-plane. For example, the substantially planar electrically-conductive bridge 1220 and the electrically-conductive strip may remain in contact with the upper surface of the upper housing 212B, even when moving to compensate for differences in coefficients of thermal expansion.

Additionally or alternatively, the controlled expansion feature 1304 of the internal busbar 1204 may provide a tolerance aid when assembling the internal busbar 1204 to the upper housing 212B. For instance, the controlled expansion feature 1304 may act as a substantially planar spring between terminal strips 1212, 1216 and/or mount holes 1224 of the internal busbar 1204. This spring feature built into the controlled expansion feature 1304 may allow the internal busbar 1204 to be stretched, or contracted, along its length during assembly and/or placement.

Figure 14:
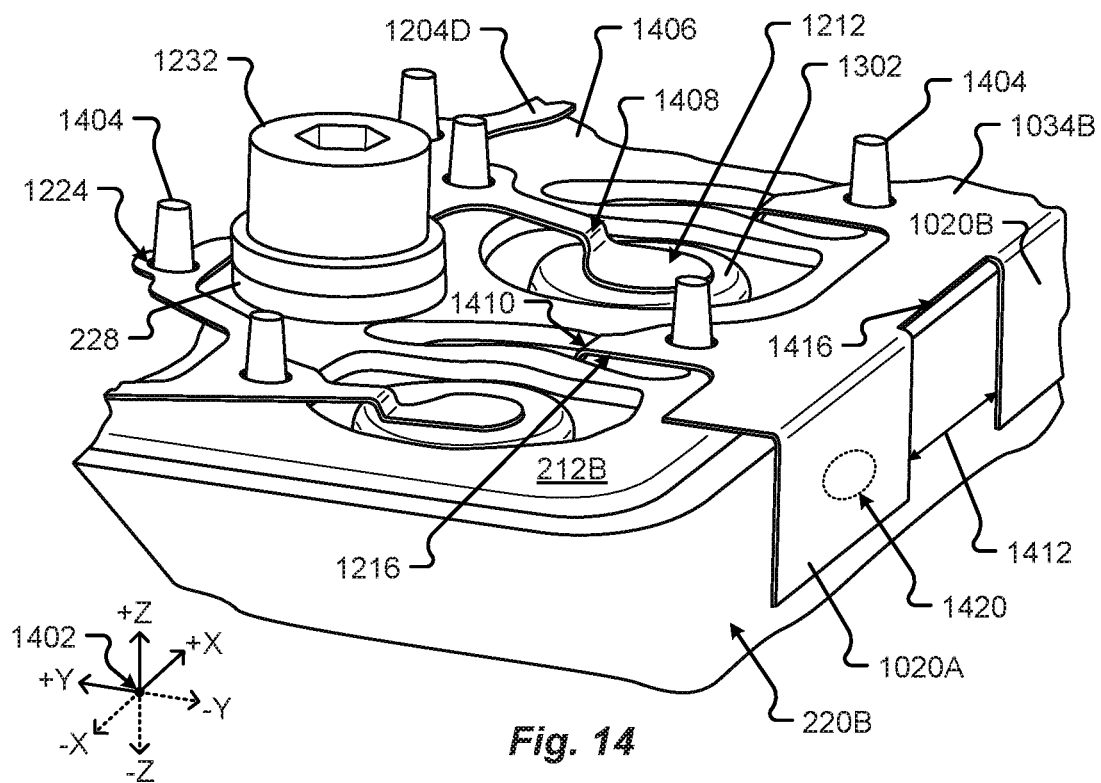
FIG. 14 shows a detail perspective view of the battery module and cell-to-cell electrical interconnections in accordance with embodiments of the present disclosure.

FIG. 14 shows a detail perspective view of the battery module 108 and a portion of the cell-to-cell electrical interconnections 216 in accordance with embodiments of the present disclosure. In particular, the perspective view shows a detail of the bent portions of the first and second terminal strips 1212, 1216 associated with the various busbars 1034A, 1034B, 1204A-D, etc., as described herein. For example, each terminal strip 1212, 1216 may include a bend region 1408, 1410 configured to dispose an end of each terminal strip in a plane offset from and substantially parallel to the upper surface 1406 of the upper housing 212B. In one embodiment, these ends may be bent such that the ends of the terminal strips 1212, 1216 orient a surface of the terminal strip 1212, 1216 in contact with the terminal contact substrate 1302, 1306 of a corresponding battery cell 208, respectively.

As shown in FIG. 14, the mount holes 1224 of the internal busbar 1204D and the second edge row interconnection busbar 1034B are engaged with mount features 1404 of the upper housing 212B. The busbars 1204D, 1034B are shown with a substantially planar surface in contact with the upper surface 1406 of the upper housing 212B. The first terminal strips 1212, associated with the internal busbar 1204D, are shown bent at the first bend region 1408 such that the end of the first terminal strips 1212 are shown extending from the upper surface 1406 of the upper housing 212B toward the first terminal contact substrate 1302 of the battery cells 208 (e.g., disposed under the upper surface 1406 of the upper housing 212B by a distance in the Z-axis negative direction). The end of the first terminal strips 1212 may contact the first terminal contact substrate 1302 of the battery cells 208 (e.g., the positive terminal cap) at a first contact pad area (e.g., positive terminal contact pad area of the busbar 1204D). The second terminal strips 1216, associated with the second edge row interconnection busbar 1034B, are shown bent at the second bend region 1410 such that the end of the second terminal strips 1216 are shown extending from the upper surface 1406 of the upper housing 212B toward the second terminal contact substrate 1306 of the battery cells 208 (e.g., disposed under the upper surface 1406 of the upper housing 212B by a distance in the Z-axis negative direction). The end of the second terminal strips 1216 may contact the second terminal contact substrate 1306 of the battery cells 208 (e.g., the negative terminal cap) at a second contact pad area (e.g., negative terminal contact pad area of the busbar 1204D). In some embodiments, the first and second terminal contact substrates 1302, 1306 may be disposed in parallel and offset planes, both facing the same direction and under the upper surface 1406 of the upper housing 212B.

Although described in conjunction with the first terminal strips 1212 of an internal busbar 1204D and the second terminal strips 1216 of the second edge row interconnection busbar 1034B, it should be appreciated that the same, or substantially similar features, may be associated with the first terminal strips 1212 of the first edge row interconnection busbar 1034A, the second terminal strips 1216 of the internal busbars 1204, and/or any combination thereof. For example, the internal busbars 1204A-D may include first and second terminal strips 1212, 1216 having the same, or substantially similar, first and second bend regions 1408, 1410 as described in conjunction with the first and second bend regions 1408, 1410 of the internal busbar 1204D and the second edge row interconnection busbar 1034B, respectively. Further, the first edge row interconnection busbar 1034A may include first and second terminal strips 1212, 1216 having the same, or substantially similar, first bend region 1408 as described in conjunction with the first bend regions 1408 of the internal busbar 1204D.

Additionally or alternatively, FIG. 14 shows a series of spaced apart electrical interconnection points 1020 associated with the edge row interconnection busbars 1034A, 1034B, structured as a busbar comb. Although illustrated as part of the second edge row interconnection busbar 1034B, it should be appreciated that any description of the spaced apart electrical interconnection points 1020 with respect to the second edge row interconnection busbar 1034B may apply to the first edge row interconnection busbar 1034A. For instance, similar, if not identical, features may be found on each of the edge row interconnection busbars 1034A, 1034B.

In some embodiments, the edge row interconnection busbars 1034A, 1034B may include a plurality of spaced apart electrical interconnection points 1020 formed in the busbars 1034A, 1034B and extending in a plane substantially orthogonal to the upper surface 1406 of the upper housing 212B. The spaced apart electrical interconnection points 1020 may be referred to herein as "busbar legs." The busbar legs 1020 may be formed in a substantially planar sheet of electrically conductive material making up the edge row interconnection busbars 1034A, 1034B. These busbar legs 1020 may be bent substantially orthogonal to a surface (e.g., the upper surface 1406 of the upper housing 212B) of the battery module 108 to connect to a high voltage busbar 220A, 220B disposed along a length and side of the battery module 108. In one embodiment, each of the busbar legs 1020 (e.g., immediately adjacent to one another) may be spaced apart from one another along a length of the edge row interconnection busbars 1034A, 1034B and/or the battery module 108 by a separation distance 1412. In one embodiment, the separation distance 1412 may be defined by a cut in the substantially planar sheet of electrically conductive material making up the edge row interconnection busbars 1034A, 1034B. The cut may include a relief area 1416 disposed at or before the substantially orthogonal bend in the edge row interconnection busbars 1034A, 1034B. This relief area 1416 may allow each of the busbar legs 1020 to extend over a portion of a high voltage busbar 220A, 220B and, until affixed to the high voltage busbar 220A, 220B, remain flexible and independently movable relative to one another. Among other things, this unique arrangement of busbar legs 1020 allows the individual busbar legs 1020 to be attached, welded, or otherwise affixed to a busbar 220A, 220B at a connection area 1420 without building up stress along the length of the edge row interconnection busbars 1034A, 1034B.

Figure 15:
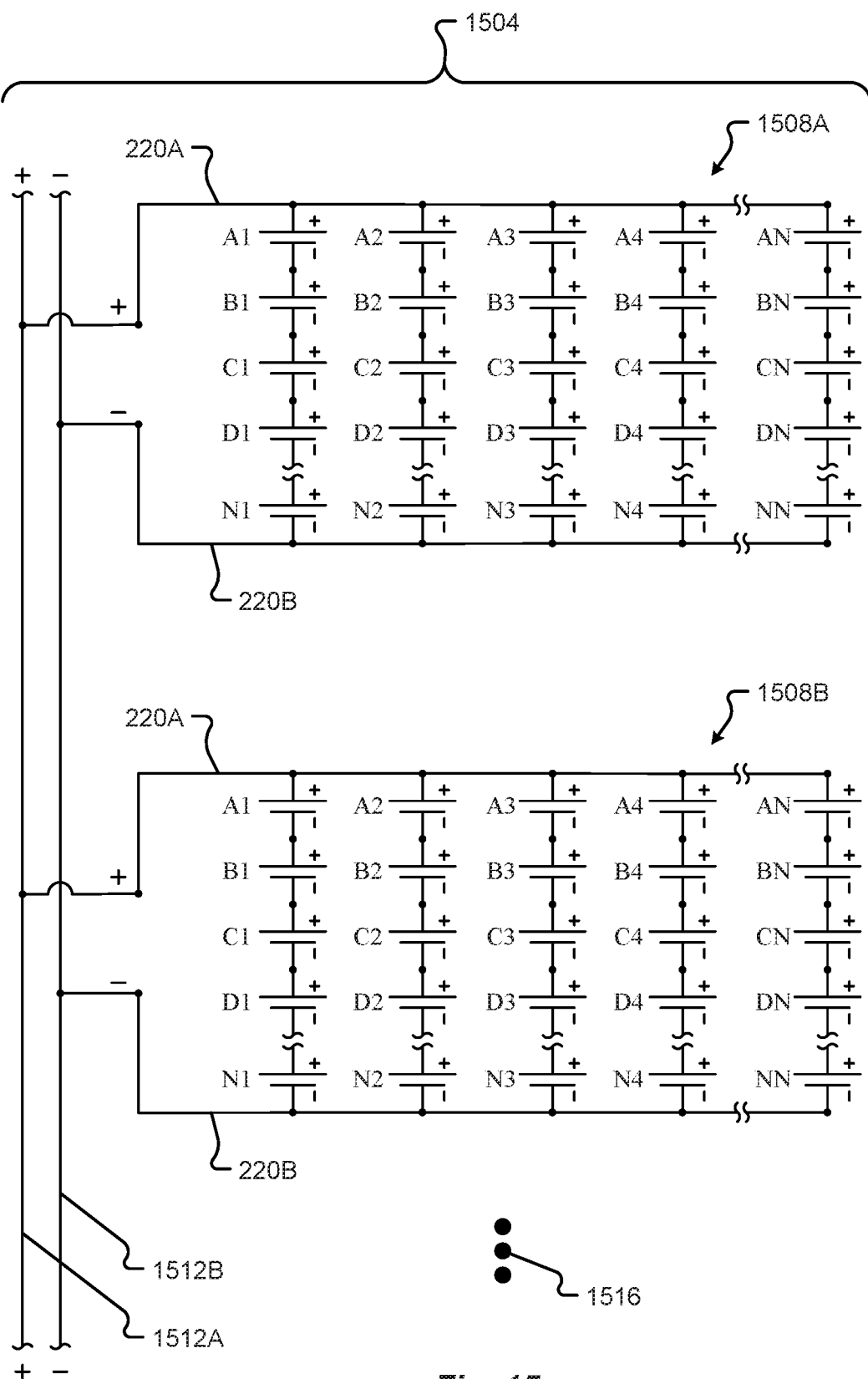
FIG. 15 shows a schematic diagram of a battery in accordance with embodiments of the present disclosure.

Referring now to FIG. 15, a schematic diagram of a battery 1504 is shown in accordance with embodiments of the present disclosure. The battery 1504 and/or the battery modules 1508A-B described in conjunction with FIG. 15 may refer to the battery 104 and/or battery modules 108 as elsewhere described herein. The battery 1504 may comprise a number of battery modules 1508A, 1508B, 1516 electrically interconnected with one another via a first high voltage connection 1512A and a second high voltage interconnection 1512B. The first and second high voltage connections 1512A, 1512B may correspond to the positive and negative high voltage busbars for an electric vehicle battery. As provided above, each battery module 1508, 108 may include a first battery module busbar 220A and a second battery module busbar 220B. In one embodiment the battery modules 1508A, 1508B, 1516, 108 may be interconnected to the first and second high voltage connections 1512A, 1512B via the first and second battery module busbars 220A, 220B, respectively.

As illustrated in the schematic diagram of FIG. 15, each battery module 1508A, 1508B, 1516, 108 may include any number of series-connected battery cells in a number of parallel-connected columns. For example, each battery module 1508A, 1508B shown in FIG. 15 includes rows 1-N and columns A-N, where N includes any non-zero positive rational number. The serial nature of the battery cells shown in each column provides the total voltage (e.g., electrical potential) for the battery module 1508A, 1508B, 1516, 108, the parallel nature of the columns provides increased current for the battery module 1508A, 1508B, 1516, 108, which allows for the calculation of the total power (e.g., wattage) of the battery module 108. Adding the power of the battery modules 1508A, 1508B, 1516 together provides the total power for the battery 1504. The arrangement of the battery cells 208 shown in FIG. 15 may be used in conjunction with FIGS. 10A-11 to further illustrate the benefits of first and second tapered busbars 220A, 220B to provide a uniform current density at any given point along the length of the battery module 1508A, 1508B, 1516, 108.

Figure 16A:
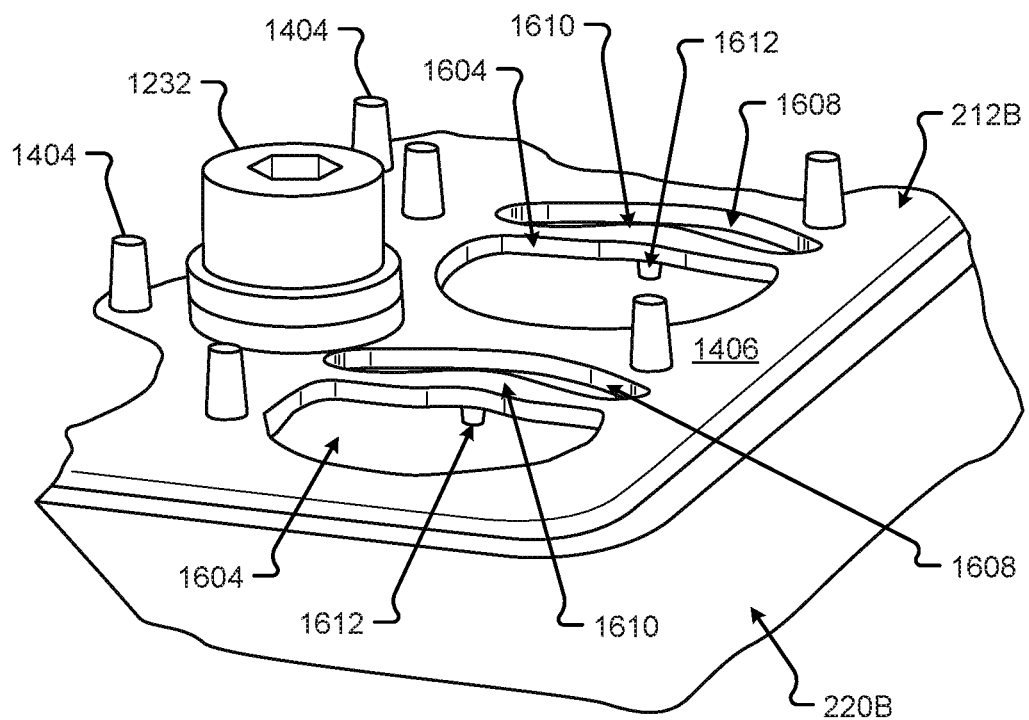
FIG. 16A shows a detail perspective view of a battery module cover terminal access receptacles in accordance with embodiments of the present disclosure.
Figure 16B:
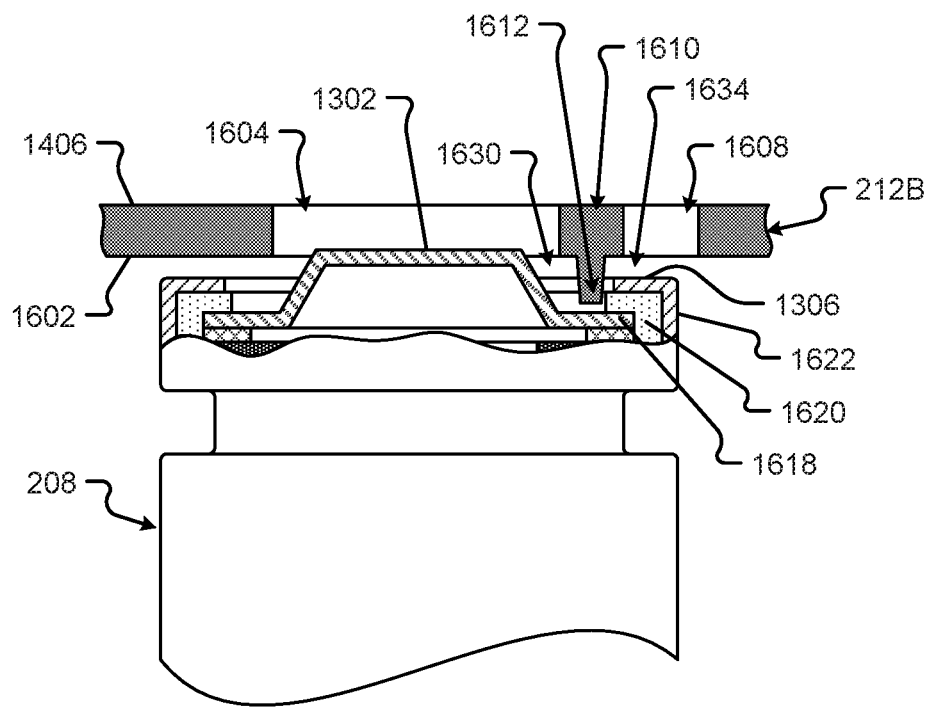
FIG. 16B shows a detail broken section view of a battery cell and portion of the battery module cover including a terminal isolation feature in accordance with embodiments of the present disclosure.

FIGS. 16A and 16B show various views of a battery module upper housing, or cover 212B, having a number of battery cell terminal access apertures or receptacles 1604, 1608 disposed therethrough. The cover 212B may be configured as a substantially planar member extending along the length and width of the battery module 108. The cover 212B may include a first surface 1406 and a substantially parallel second surface 1602 separated a distance by a thickness of the substantially planar member. Each of the terminal access receptacles 1604, 1608 may be associated with a particular battery cell 208 and/or battery cell location in the array of battery cells 208 in the battery module 108. In particular, the terminal access receptacles 1604, 1608 may provide a clear opening in the cover 212B from the first surface 1406 to a corresponding battery cell contact surface 1302, 1306. For instance, the first terminal access receptacle 1604 may provide an unobstructed opening from the first surface 1406, through the cover 212B, to the first terminal contact surface 1302 of the battery cell 208. Continuing this example, the second terminal access receptacle 1608 may provide an unobstructed opening from the first surface 1406, through the cover 212B, to the second terminal contact surface 1306 of the battery cell 208.

The terminal access receptacles 1604, 1608 may be shaped to conform to a portion of the battery cell 208 in the array of battery cells 208 in the battery module 108. As shown in FIG. 16A, the first terminal access receptacle 1604 is configured as a hole or aperture having a substantially D-shaped perimeter, while the second terminal access receptacle 1608 is configured as a hole or aperture having a substantially C-shaped, or arcuate, perimeter. Although shown as having a particular perimeter shape, it should be appreciated that the perimeter of either terminal access receptacle 1604, 1608 may include any shape that provides access for a terminal connection portion of a cell-to-cell interconnection busbar (e.g., busbars 1204, 1034A, 1034B, etc.).

In some embodiments, the first terminal access receptacle 1604 may be disposed adjacent to the second terminal access receptacle 1608 for a single battery cell 208 in the array of battery cells 208 with a bridging portion 1610 of material (e.g., of the cover 212B) disposed between the first and second terminal access receptacles 1604, 1608 for the single battery cell 208. The bridging portion 1610 may serve as a physical separator between terminal connection portions of one or more battery cell busbars 1204, 1034A, 1034B, etc., in the battery module 108. In one embodiment, the bridging portion 1610 may isolate the terminal connection portions of one or more battery cell busbars 1204, 1034A, 1034B, etc. from moving out of position relative to a particular battery cell contact surface 1302, 1306. The bridging portion 1610 may prevent electrical shorting by having a single conductive portion of material associated with a terminal connection portion from simultaneously contacting both positive and negative terminals of the battery cell 208.

The bridging portion 1610 and/or some other portion of the cover 212B may include a terminal isolation feature, or protrusion, 1612 extending from the second surface 1602 of the cover 212B in a direction (e.g., away from the first surface 1406) toward a battery cell 208 in the array of battery cells 208. As shown in FIG. 16B, each battery cell 208 in the array of battery cells 208 may include a casing 1622, a first terminal or cap 1618, and an electrical insulation gasket 1620 disposed between the first terminal 1618 and the casing 1622. In some embodiments, the first terminal 1618 may correspond to the positive terminal of the battery cell 208 and the casing 1622 may correspond to the second, or negative, terminal of the battery cell 208. As described above, each battery cell 208 in the battery module 108 may include a first battery cell contact area or surface 1302 (e.g., the positive contact surface) and a second battery cell contact area or surface 1306 (e.g., the negative contact surface). The first battery cell contact surface 1302 may be configured to contact a first terminal strip 1212 of one or more of the battery cell busbars 1204, 1034A, 1034B, etc. and the second battery cell contact surface 1302 may be configured to contact a second terminal strip 1216 of one or more of the other battery cell busbars 1204, 1034A, 1034B, etc. In some embodiments, the terminal strips 1212, 1216 may be welded to respective battery cell contact surfaces 1302, 1306 (e.g., electrically and mechanically coupling the battery cells 208 to the cell-to-cell busbars 1204, 1034A, 1034B, etc. and even the high voltage busbars 220A, 220B.

It is an aspect of the present disclosure that each of the terminal isolation features 1612 may be aligned in an area 1630 between the first terminal 1618 and the second terminal 1622 of each battery cell 208. In one embodiment, the cover 212B may be placed over an arranged array of battery cells 208 allowing the terminal isolation features 1612 to nest, or positively locate, in the area 1630 of the battery cells 208. Additionally or alternatively, the terminal isolation feature 1612 may block a path (e.g., along which a disconnected terminal strip 1212, 1216 may move, etc.) from an area 1634, at the second battery cell contact surface 1306 (e.g., of the second terminal 1622), to the area 1630 adjacent to the first battery cell contact surface 1302 (e.g., of the first terminal 1618). For example, the terminal isolation feature 1612 may extend from the second surface 1602 of the cover 212B past the second battery cell contact surface 1306 providing a "wall" or a portion (e.g., a pin, protrusion, truncated cone, etc.) of dielectric material disposed between a terminal connector (e.g., terminal strip 1216) attached to the second battery cell contact surface 1306 and the first terminal 1618, and/or the terminal connector (e.g., terminal strip 1212) attached to the first battery cell contact surface 1302.

Figure 17B:
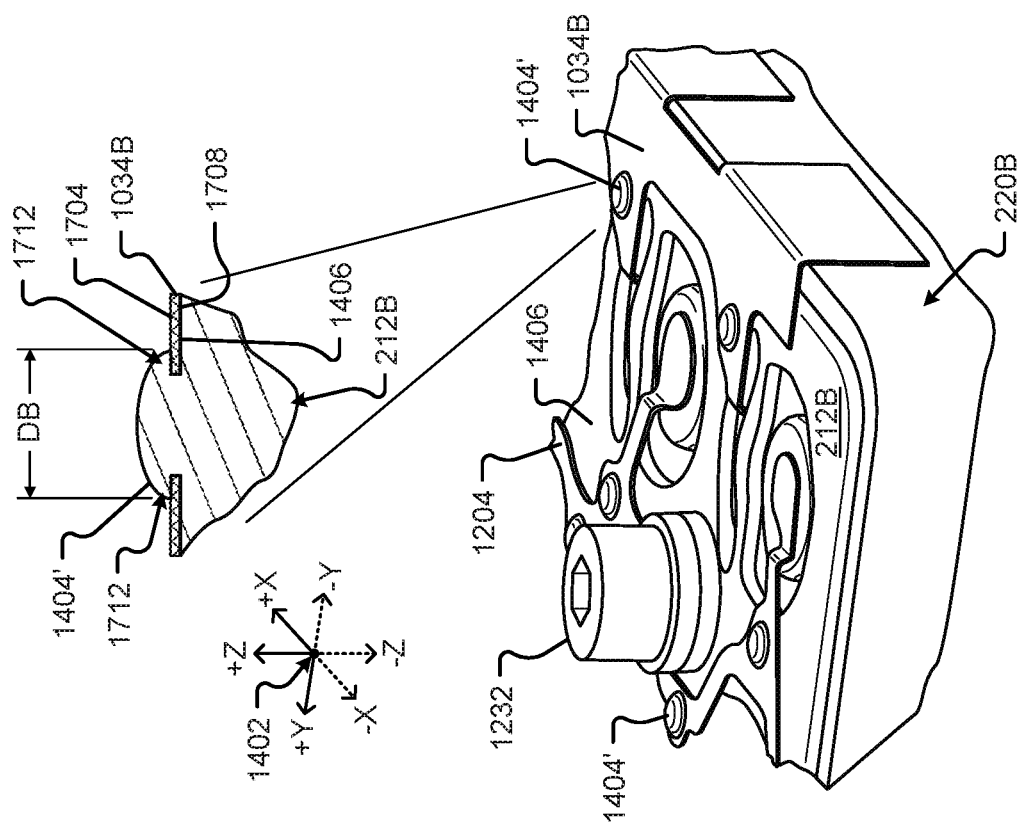
FIG. 17B shows a detail perspective view of the battery module and cell-to-cell electrical interconnection mount posts in a second state in accordance with embodiments of the present disclosure.
Figure 17A:
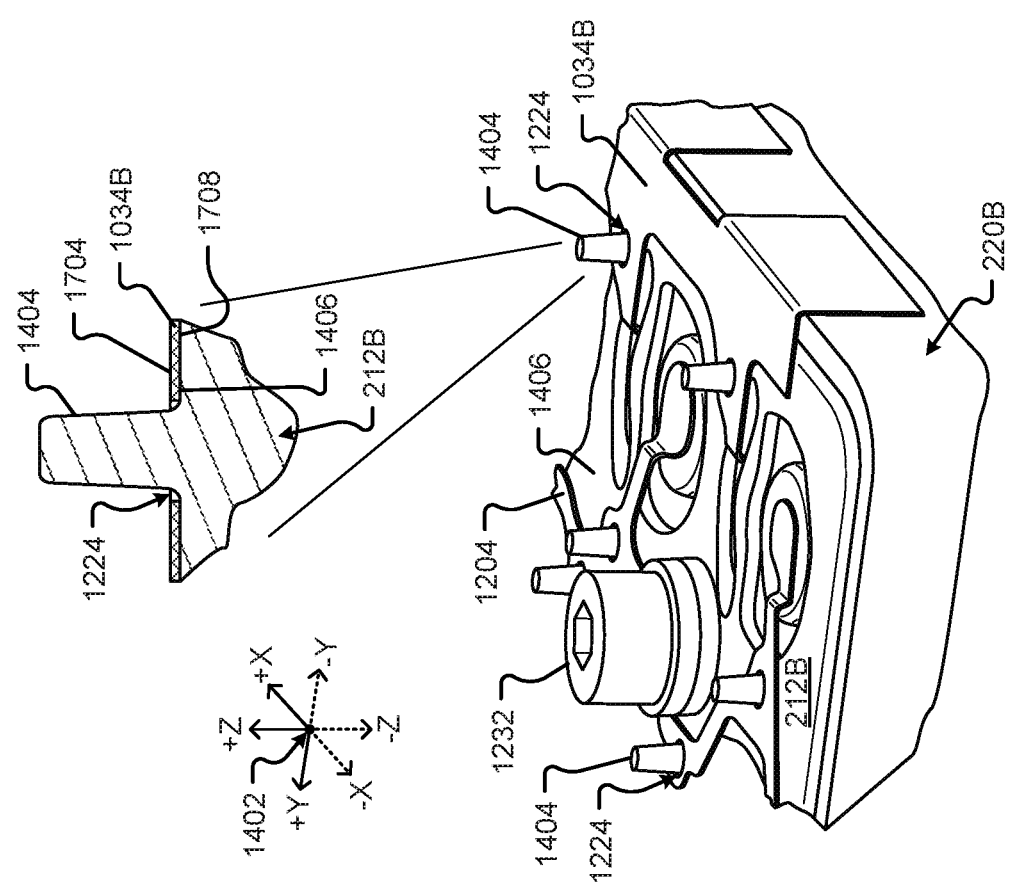
FIG. 17A shows a detail perspective view of the battery module and cell-to-cell electrical interconnection mount posts in a first state in accordance with embodiments of the present disclosure.

FIGS. 17A and 17B show detail perspective views of the battery module 108 and cell-to-cell electrical interconnection mount features, or posts, 1404 in different assembly states in accordance with embodiments of the present disclosure. The mount posts 1404 may be configured as a number of protrusions extending from the first surface 1406 of the cover 212B in a direction away from the second surface 1602. In some embodiments, the mount posts 1404 may be configured as truncated cones, tapered protrusions, and/or integrally formed portions of the cover 212B. In one embodiment, the mount posts 1404 may be tapered in accordance with a draft angle associated with a mold for the cover. In any event, where the mount posts 1404 are tapered, the mount posts may taper from a first diameter at the first surface 1406 of the cover 212B to a smaller second diameter at a distance offset from the first surface in the Z-axis positive direction (e.g., in a direction away from the second surface 1602).

Among other things, the tapered mount posts 1404 may serve as alignment pins to receive, and positively locate or orient, one or more of the cell-to-cell busbars 1204, 1034A, 1034B. For instance, the mount posts 1404 may engage with one or more mount holes 1224 disposed in the cell-to-cell busbars 1204, 1034A, 1034B. Once positioned, a substantially planar resting surface 1708 of the cell-to-cell busbars 1204, 1034A, 1034B may contact, and rest on, the first surface 1406 of the cover 212B. In this "resting" position, each of the terminal strips 1212, 1216 (e.g., the bent contact ends) associated with the oriented cell-to-cell busbars 1204, 1034A, 1034B may be disposed over or at least partially within the appropriate, or corresponding, terminal access receptacles 1604, 1608 of the cover 212B.

As illustrated in FIGS. 17A and 17B, a detail section of a mount post 1404 in the perspective view is shown in different assembly states. It should be appreciated that the detail section of the mount post 1404 may correspond to any and/or all of the mount posts 1404 as described herein. The mount posts 1404 are shown integrally formed from the cover 212B of the battery module 108 and extending in a direction away from the first surface 1406 of the cover 212B. FIG. 17A shows the mount posts 1404 in a first undeformed state. In this state, the undeformed mount post 1404 is shown engaged with a mount hole 1224 of one of the cell-to-cell busbars (e.g., the second edge interconnection busbar 1034B in FIG. 17A). The busbar 1034B has a resting surface 1708 that may contact the first surface 1406 of the cover 212B in a first assembly state where the mount posts 1404 are undeformed. The busbar 1034B, like each other cell-to-cell busbar 1204, 1034A in the battery module 108 includes a clamping surface 1704 disposed opposite the resting surface 1708. In the first assembly state, each of the busbars 1204, 1034A, 1034B may be unrestricted in the Z-axis positive direction.

FIG. 17B shows a second assembly state where each of the mount posts 1404' are deformed, clamping the cell-to-cell busbars 1204, 1034A, 1034B in place. In some embodiments, the mount posts 1404 shown in FIG. 17A may be melted, shaped, or otherwise formed into a set of deformed mount posts 1404'. In some embodiments, the mount posts 1404, and the cover 212B, may be made from a dielectric material (e.g., a nylon glass-filled material, a thermoplastic material, etc.). It is an aspect of the present disclosure that the mount posts 1404 may be deformed via heat staking, ultrasonic welding, cold forming, and/or any other operation configured to alter the shape of the mount post 1404 into a deformed mount posts 1404'. For example, the mount posts 1404 may be structured to deform when subjected to a controlled application of heat and/or ultrasonic vibrations. The deformed mount posts 1404', once shaped, may include a domed, or button-shaped, head having a diameter, DB, greater than the diameter of the mount hole 1224 in the cell-to-cell busbars 1204, 1034A, 1034B. This domed head may maintain, clamp, and/or otherwise restrict movement of the cell-to-cell busbars 1204, 1034A, 1034B. For instance, a portion of the domed head of the deformed mount posts 1404' may contact the clamping surface 1704 of the cell-to-cell busbars 1204, 1034A, 1034B at a contact area 1712. This contact may clamp or hold the resting surface 1708 of the cell-to-cell busbars 1204, 1034A, 1034B against the first surface 1406 of the cover 212B. In the second assembly state, each of the busbars 1204, 1034A, 1034B may be restricted from moving in a direction along the Z-axis.

As described above, the deformed mount posts 1404' may fasten the cell-to-cell busbars 1204, 1034A, 1034B to the cover 212B without requiring any other fasteners or electrical insulation features. This low-profile fastening system eliminates the need for additional components, weight, and/or complexity. Additionally or alternatively, the undeformed mount posts 1404 can serve as an assembly aid by, among other things, providing a system of tapered alignment pins for the cell-to-cell busbars 1204, 1034A, 1034B to orient to and engage with.

Figure 18A:
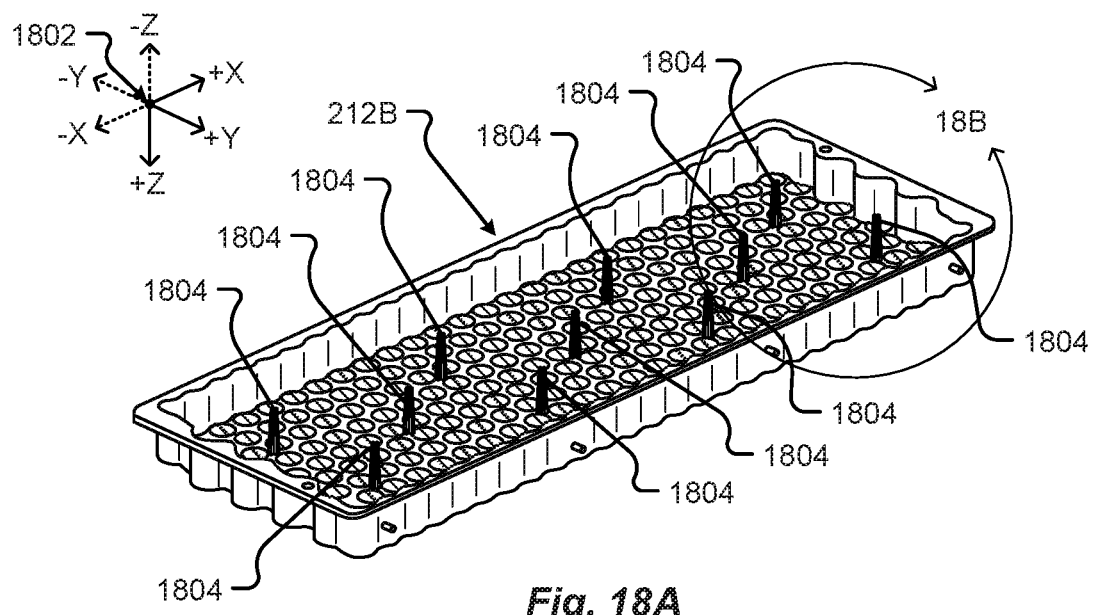
FIG. 18A shows a schematic perspective view of a receiving cavity of a battery module cover including retaining protrusions shows in accordance with embodiments of the present disclosure.
Figure 18B:
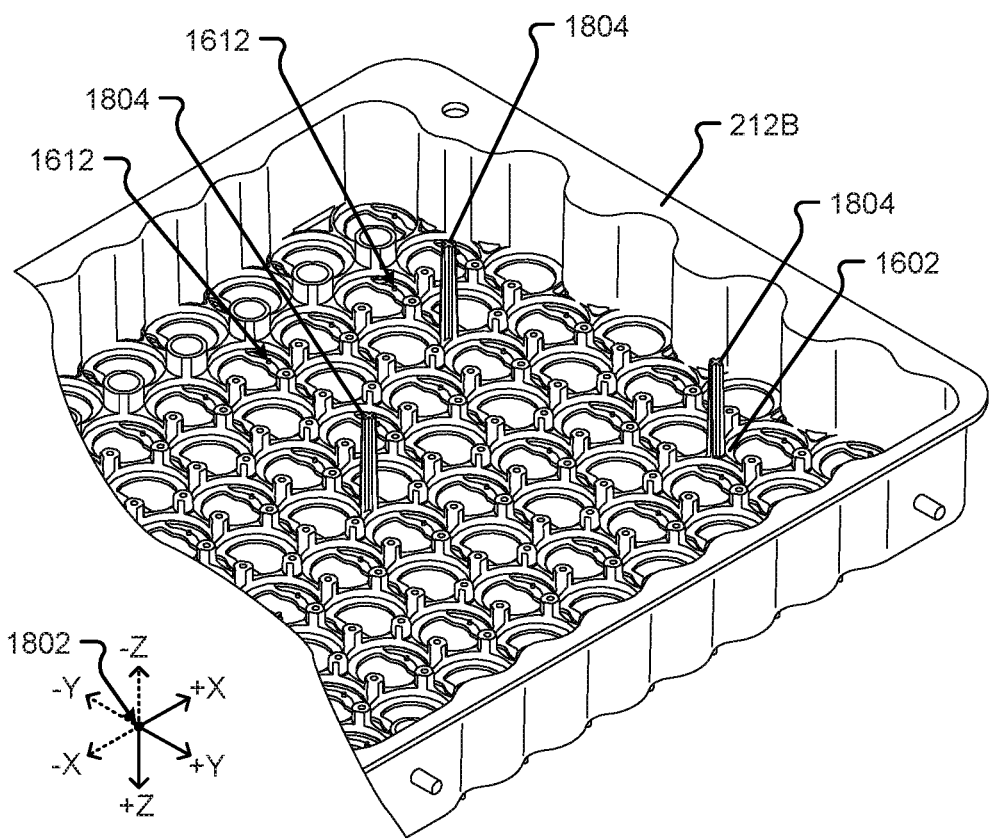
FIG. 18B shows a detail perspective view of a receiving cavity of the battery module cover of FIG. 18A.

Referring to FIGS. 18A and 18B, various perspective view of a receiving cavity of a battery module cover 212B including retaining protrusions 1804 are shown in accordance with embodiments of the present disclosure. The inside, or battery cell containment cavity, of the cover 212B is shown in FIGS. 18A and 18B. In some embodiments, the inside of the cover 212B may include one or more features similar, if not identical, to the battery cell location frame 900 described in conjunction with FIGS. 9A and 9B. In any event, the cover 212B may comprise a substantially planar substrate extending a length, LB, and a width of the battery module 108. The substantially planar substrate may include a number of walls (e.g., sidewalls) disposed at the periphery of the substrate and extending substantially orthogonal to the substantially planar substrate. The sidewalls and substantially planar substrate may define the volume corresponding to the battery cell containment cavity.

In some embodiments, the cover 212B may include a number of retaining protrusions 1804, or features, that extend from a surface (e.g., the second surface 1602) of the substantially planar substrate into a space between adjacent battery cells 208, or battery cell locations, in the battery module 108. The retaining protrusions 1804 may be integrally formed from the cover 212B (e.g., molded or formed together with one or more other features of the cover 212B, etc.). In one embodiment, the retaining protrusions 1804 may extend a distance, or depth, that substantially matches a height of the cover 212B. In some embodiments, the distance, or depth, of the retaining protrusions 1804 may be less than the height of the cover 212B, while still disposed within the battery retaining cavity of the cover 212B. In any event, the retaining protrusions may provide a number of adhesive contact surfaces configured to provide a structural connection between the cover 212B and lower housing 212A of a battery module 108 via an inserted and cured structural material or adhesive 404. For instance, once the battery module 108 is assembled, the unit may be filled with a structural material 404 (e.g., structural foam, epoxy, etc.) configured to flow between each of the battery cells 208 and the cover 212B making contact with the retaining protrusions 1804. Once the structural material 404 cures, the cured structural material 404 may adhere to the retaining protrusions 1804, the internal surfaces of the cover 212B (e.g., the sidewalls, substantially planar substrate, etc.), and the array of battery cells 208, and the cover 212B may be retained, or held, in place. This connection between the structural material 404 and the cover 212B may add a number of nodes 504 to the force distribution framework as described in conjunction with FIGS. 5A and 5B. For example, the structural material 404 may adhere to one or more portions of the cooling plate 224, the retaining protrusions 1804, the lower housing 212A, the cover 212B, the battery cell location frame 900, and battery cells 208 forming a complete structurally interconnected battery module 108.

The retaining protrusions 1804 may include a number of features (e.g., holes, slots, ribs, webs, textures, or other interrupted surfaces, etc.) configured to foster adhesion between a portion of the structural material 404 inserted into the battery module 108 and at least a portion of the retaining features 1804. As shown in FIG. 18B, one or more of the retaining protrusions 1804 may comprise an X-shaped cross-sectional area tapering from a first cross-sectional area at the second surface 1602 to a smaller cross-sectional area at the depth, or length, of the retaining protrusion 1804. The X-shaped cross-section of the retaining protrusion 1804 may provide a greater number of contact surfaces, and increased surface area, for the structural material 404 to contact and/or adhere to. For instance, the X-shaped cross-section may provide approximately twelve contact surfaces that extend the depth, or length, of the retaining protrusion 1804. In some embodiments, the retaining protrusions 1804 may taper in accordance with a draft angle of a mold. For instance, in one embodiment the cover 212B may be manufactured using at least one mold. In this instance, the draft angle for the mold and/or process may correspond to an angle of taper for the retaining protrusions 1804.

Although shown including approximately eleven retaining protrusions 1804, it should be appreciated that the cover 212B may include more or fewer retaining protrusions 1804. The retaining protrusions 1804 may be oriented at battery cell locations of the battery module 108 where immediately adjacent sets of three or more battery cells 208 are disposed. For example, an open space may be disposed between these immediately adjacent sets of battery cells 208 that may be configured to receive one or more of the retaining protrusions 1804. Additionally or alternatively, the retaining protrusions 1804 may be sized to fit within this open space. In any event, the retaining protrusions 1804 may add strength to the battery module 108, reduce the number of components required to assemble the battery module 108, provide a simplified assembly (e.g., requiring no additional fasteners, etc.), providing a lighter weight battery module 108, lower the profile of the battery module 108, and provide a seamless appearance to the battery module 108.

Figure 19A:
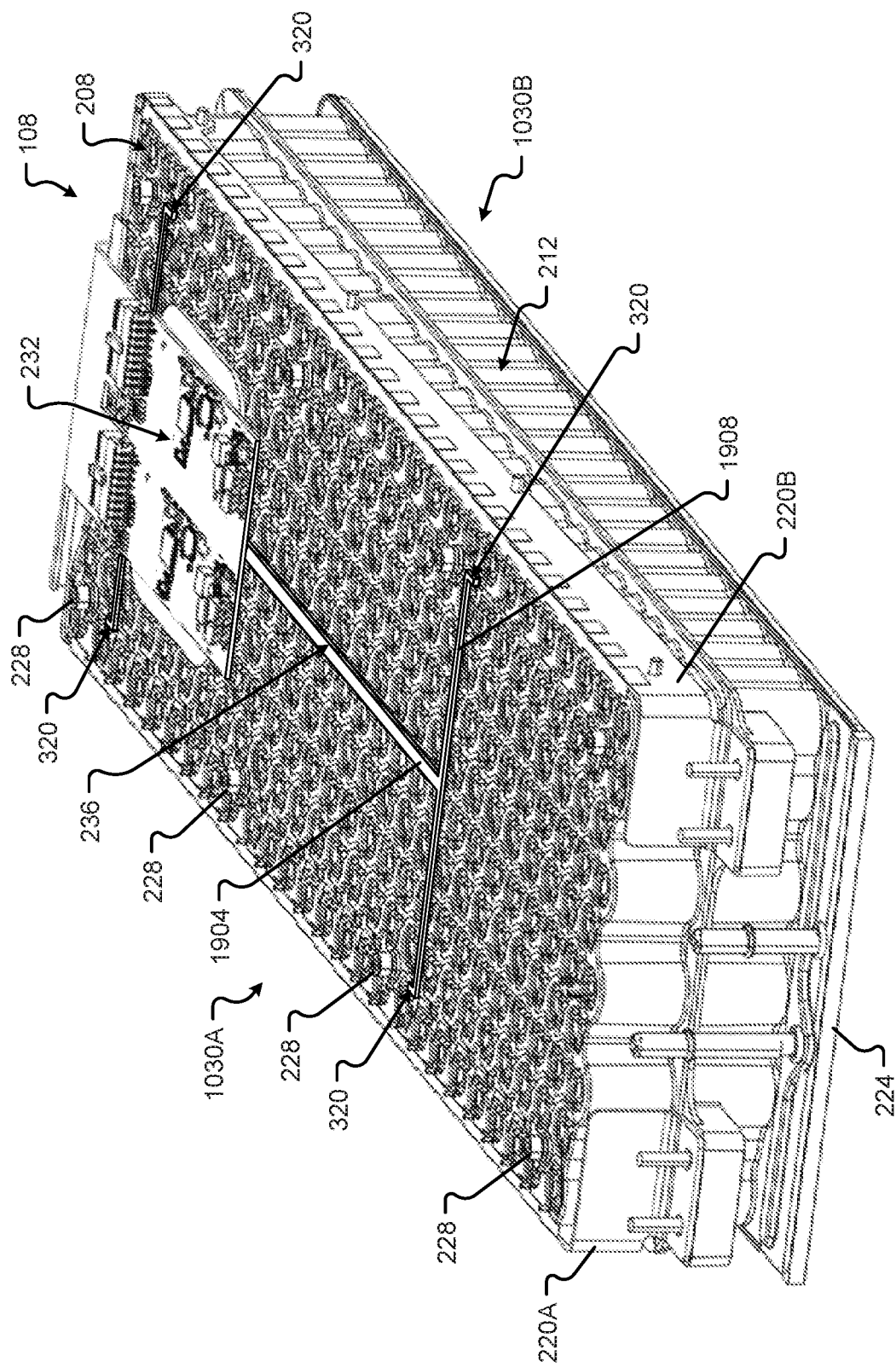
FIG. 19A shows a perspective view of the battery module, battery management system, and sensing system in accordance with embodiments of the present disclosure.

FIG. 19A shows a perspective view of the battery module 108, battery management system 232, and sensing system 236 in accordance with embodiments of the present disclosure. In some embodiments, the sensing system 236 as described herein may correspond to a multiple-zone temperature monitoring system for the battery module 108. As such, the terms "sensing system," "multiple-zone temperature monitoring system," "multiple-zone battery module temperature monitoring system," "multiple-zone thermocouple battery module temperature monitoring system" and/or variations thereof can be used interchangeably herein.

The multiple-zone temperature monitoring system 236 may include one or more temperature probes 320, a first circuit substrate 1904, a second circuit substrate 1908, and one or more connectors (not shown) configured to interconnect with a BMS 232 and/or some other processor/controller. The first and second circuit substrates 1904, 1908 may comprise a number of traces, wires, and/or other conductive elements, electrically connecting each temperature sensing element of the temperature probe 320 to the BMS 232. In one embodiment, the first and second circuit substrates 1904, 1908 may be configured as a printed circuit board (PCB), rigid PCB, flexible PCB, and/or a flexible "flex" circuit. The first and second circuit substrates 1904, 1908 may include a number of traces disposed between two or more dielectric layers made from a dielectric material (e.g., fiberglass, composite, linen, polyimide, polyether ether ketone, polyester, etc., and/or combinations thereof circuit substrates). In some embodiments, one or more of the first and second circuit substrates 1904, 1908 may be a flex circuit comprising a flexible dielectric film including at least one of polyimide, polyether ether ketone, and/or polyester, etc. In any event, the first and second circuit substrates 1904, 1908 may be disposed adjacent to an upper portion of the battery module 108 (e.g., resting on a portion of the cover 212B and/or the one or more battery cell busbars 1204, 1034A, 1034B, etc. of the battery module 108). The first circuit substrate 1904 may extend along the length, LB, of the battery module 108 from the BMS 232 to a sensing region of the battery module 108, where the first circuit substrate 1904 may split into the second circuit substrate 1908 reaching one or more temperature probes 320.

Figure 19B:
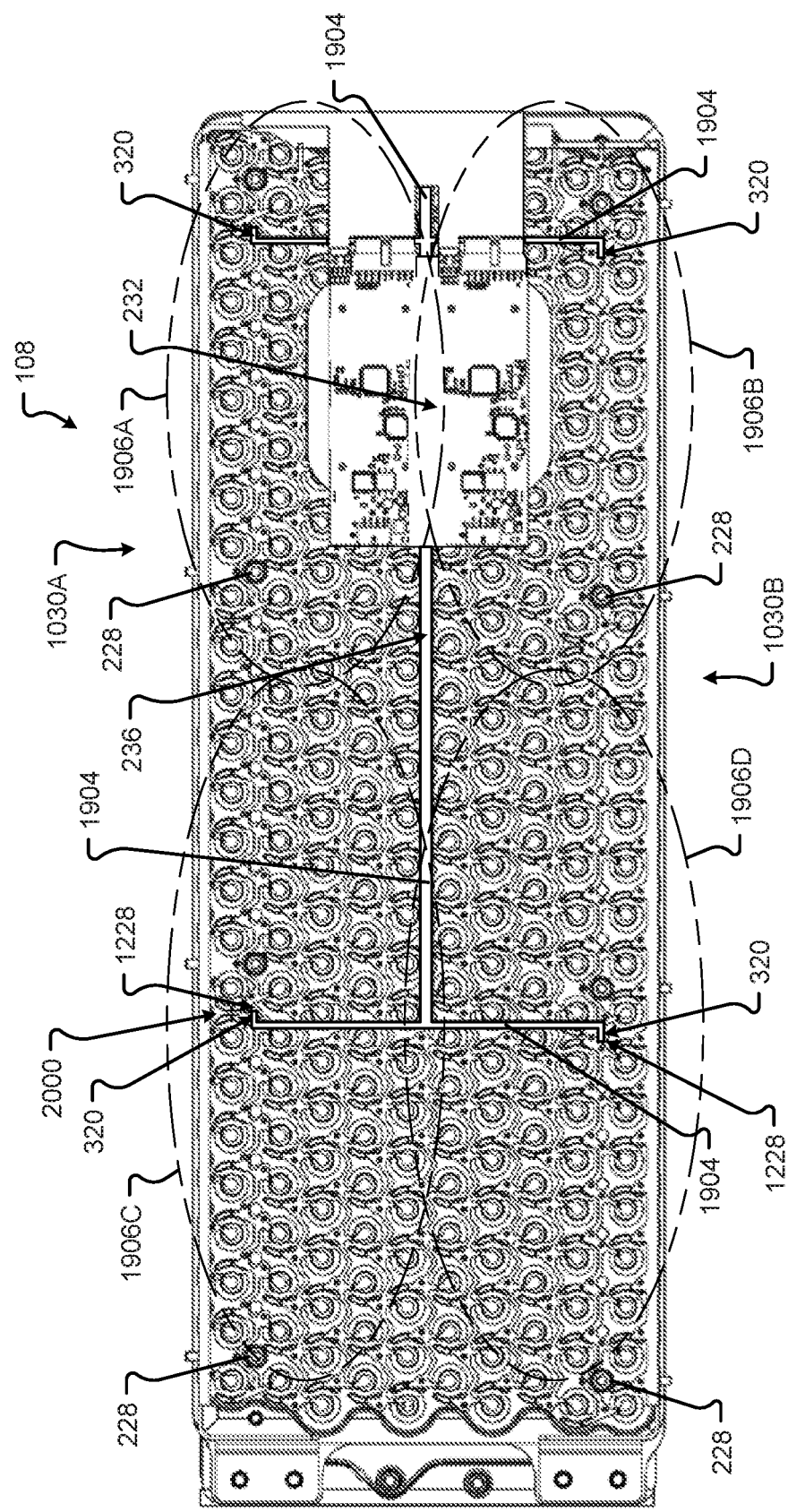
FIG. 19B shows a plan view of the battery module, battery management system, and sensing system in accordance with embodiments of the present disclosure.

As shown in FIGS. 19A and 19B, the second circuit substrate 1908 may be disposed substantially orthogonal to the first circuit substrate 1904 (e.g., the second circuit substrate 1908 extending a width of the battery module 108). Although described as first and second circuit substrates 1904, 1908, it should be appreciated that the first and second circuit substrates 1904, 1908 may be integrally formed (e.g., as a rigid PCB, flex circuit, etc.) and including continuous traces running from the temperature sensing elements of the probes to a connector and/or BMS 232.

In some embodiments, the one or more temperature probes 320 may be disposed between groups of immediately adjacent battery cells 208 (e.g., in an area between three or more immediately adjacent battery cells 208) in the array of battery cells 208 (e.g., in distinct locations). The temperature probes 320 are shown in four distinct, different, locations of the battery module 108 in FIGS. 19A and 19B. As provided above, the temperature probes 320 may be disposed in, or inserted into, areas between immediately adjacent battery cells 208 in the terminal edge rows of the array of battery cells 208. The rows of battery cells 208 in the terminal edges (e.g., the edges closest to the high voltage busbars 220A, 220B, etc.) are arranged such that each battery cell 208 is spaced apart from one another substantially orthogonally in the X-axis and Y-axis directions. This arrangement of battery cells 208 at the terminal edges provides a number of feature spaces 1228 disposed between groups of immediately adjacent battery cells 208 in the terminal edge rows of battery cells 208. As described above, these spaces 1228 may receive fasteners 1232, thermocouples or temperature probes 320, structural adhesive 404, strain gauges, sensors, etc. The terminal edges (e.g., immediately adjacent to the first and second terminal sides 1030A, 1030B) shown in FIGS. 19A and 19B include groups of four immediately adjacent battery cells 208 having feature spaces 1228 disposed therebetween (e.g., in a geometric center of the group of four immediately adjacent battery cells 208, etc.).

As shown in FIGS. 19A and 19B, four temperature probes 320 of the multiple-zone temperature monitoring system 236 are disposed in various zones, or locations, of the battery module 108. In some embodiments, the temperature probes 320 may each extend from a top surface 1406 of the cover 212B a depth into the battery module 108 (e.g., substantially following the height of a battery cell 208 in the battery module 108, etc.). In the plan view of the battery module 108, shown in FIG. 19B, each of the temperature probes 320 may be associated with a particular zone 1906A-D of battery cells 208 in the battery module 108. For instance, the temperature probe 320 disposed in the first zone 1906A of the battery module 108 may monitor temperatures associated with one or more depths (e.g., layers, strata, etc.) of the battery cells in this region 1906A. Additionally or alternatively, the temperature probes 320 disposed in the second, third, and fourth zones 1906B-D of the battery module 108 may monitor temperatures associated with one or more depths (e.g., layers, strata, etc.) of the battery cells in each respective region 1906B-D. In some embodiments, one or more of the monitored zones 1904A-D may overlap with one another, such that an entirety of the battery module 108 can be monitored by the BMS 232 and/or the multiple-zone temperature monitoring system 236 at any point in time (e.g., simultaneously, continuously, periodically, etc., and/or combinations thereof). Although shown including four temperature probes 320 in four different zones 1906A-D, it is an aspect of the present disclosure that more or fewer probes 320 may be employed as required to measure one or more zones 1904A-N of the battery module 108. For instance, a temperature 320 connected to the first and/or second circuit substrate 1904, 1908 may be disposed in any of the open, or unoccupied, feature spaces 1228 in the battery module 108. In larger battery modules 108, for example, where additional immediately adjacent rows of battery cells 208 (e.g., at the center of the battery module 108, etc.) are disposed in a similar, if not identical, arrangement as the terminal edge rows, temperature probes 320 may be disposed in the feature spaces 1228 between immediately adjacent groups of battery cells 208 in the adjacent rows. In any event, an example area 2000 of the battery module 108 including a temperature probe 320 is shown in FIG. 19B, and in greater detail in FIG. 20.

Figure 20:
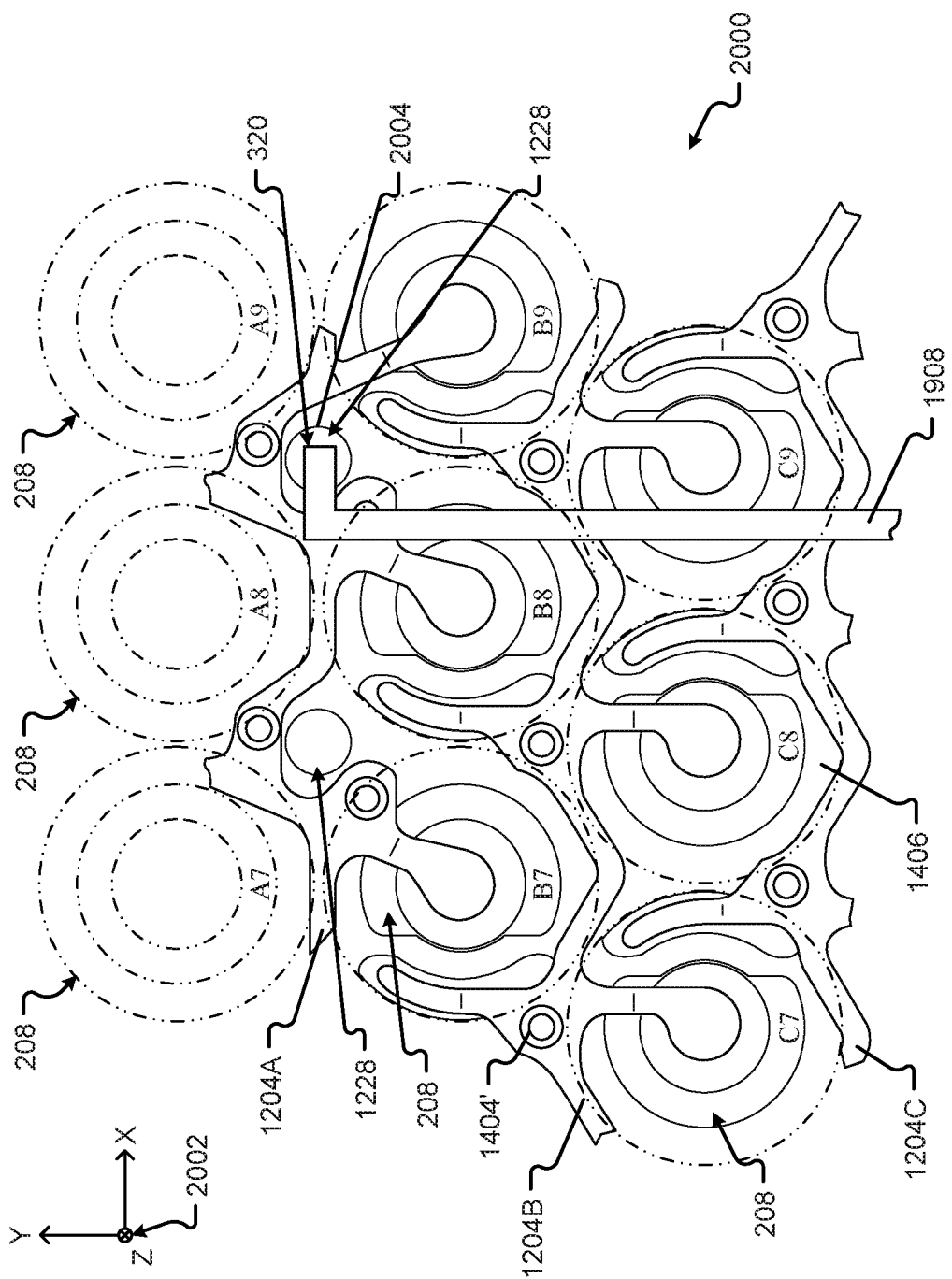
FIG. 20 shows a detail broken plan view of an area of the battery module including a multiple-zone temperature sensor in accordance with embodiments of the present disclosure.

Referring to FIG. 20, a detail broken plan view of an area 2000 of the battery module 108 including a multiple-zone temperature sensor, or temperature probe 320, is shown in accordance with embodiments of the present disclosure. As described above, the areas between immediately adjacent and substantially inline orthogonal battery cells 208 in the terminal edges of battery cells 208 creates a number of feature spaces 1228 therebetween. FIG. 20 shows a number of battery cells 208 arranged in "inline" rows (e.g., battery cells A7-A9 and B7-B9) and a number of battery cells 208 arranged in "staggered" rows (e.g., battery cells C7-C9). It should be appreciated that battery cells A7-A9 are inline with battery cells B7-B9 at the terminal edges of the battery module 108, while battery cells C7-C9 are staggered relative to the battery cell positions of battery cells B7-B9 and/or A7-A9. Each of the battery cells 208 shown in FIGS. 19A-21B may include a battery cell location for each of the battery cells 208 in the array of battery cells 208. As provided above, the battery cell locations may be defined by the battery cell location frame described in conjunction with FIGS. 9A-9B, etc., and/or some other arrangement and/or alignment feature or frame.

The top, or first, row of battery cells 208 in FIG. 20 shows each of the cells A7-A9 (in phantom lines) defining the general geometry and battery cell location of each cell 208 in the first row. The periphery of each of the battery cells 208 shown in FIG. 20 (e.g., cells A7-A9, B7-B9, and C7-C9) is shown (in phantom lines) to highlight the spaces between the battery cells 208 in the first row (e.g., cells A7-A9) relative to the battery cells 208 in the second row (e.g., cells B7-B9) and showing the feature spaces 1228 disposed between these groups, or sets, of battery cells 208 (e.g., first cell set {A7, A8, B7, B8}, and second cell set {A8, A9, B8, B9}). In one embodiment, the temperature probe 320 is disposed, or inserted, into the feature space 1228 between the second cell set {A8, A9, B8, B9}, as shown in FIG. 20. In some embodiments, the multiple-zone temperature monitoring system 236 may be arranged relative to the array of battery cells 208 in the battery module 108, such that the dielectric first and/or second circuit substrate 1904, 1908 is disposed above, or offset from, the cover 212B and the first terminals (e.g., positive terminal ends) of the battery cells 208. The cover 212B may include a hole, or aperture 2004 disposed through a thickness of the cover 212B from a first surface 1406 to a second surface 1602 of the cover. The aperture 2004 may be substantially aligned with one or more of the feature spaces 1228 associated with the battery module 108. For instance, the aperture 2004 may be coaxial with a geometric center of the feature spaces 1228. In any event, through this aperture 2004 in the cover 212B, the temperature probe 320 may be inserted (e.g., during assembly, etc., of the battery module 108. In some embodiments, the temperature probes 320 may be held in place (e.g., inside one or more of the feature spaces 1228 and apertures 2004 of the battery module 108) via an inserted and cured structural material or adhesive 404, as described above.

Figure 21A:
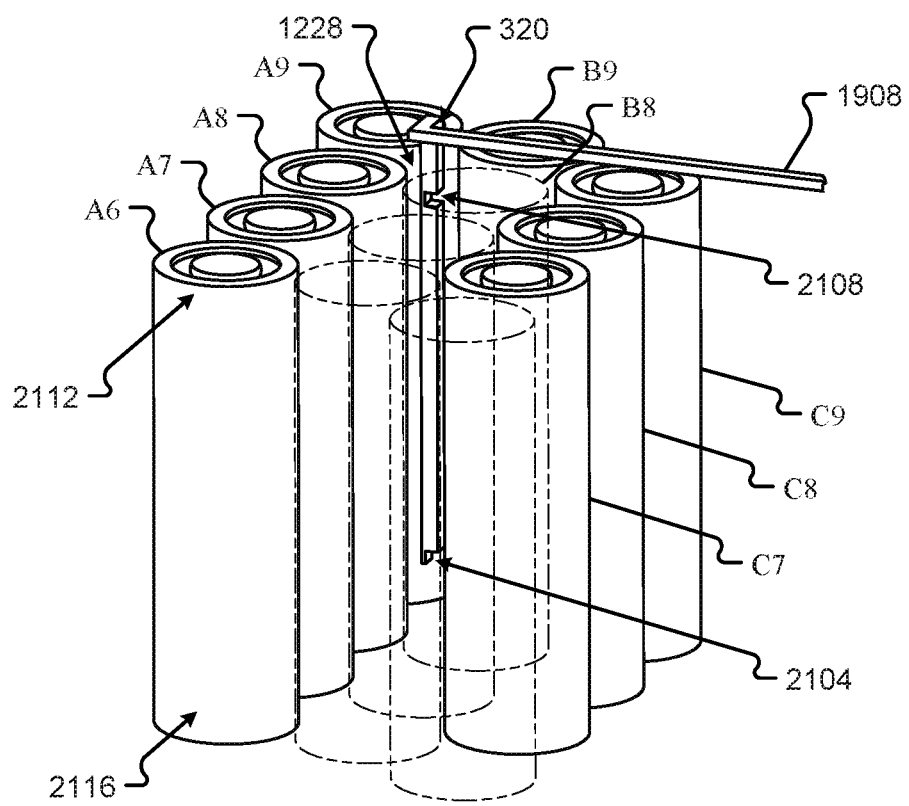
FIG. 21A shows a schematic perspective view of the multiple-zone temperature sensor disposed between battery cells in accordance with embodiments of the present disclosure.
Figure 21B:
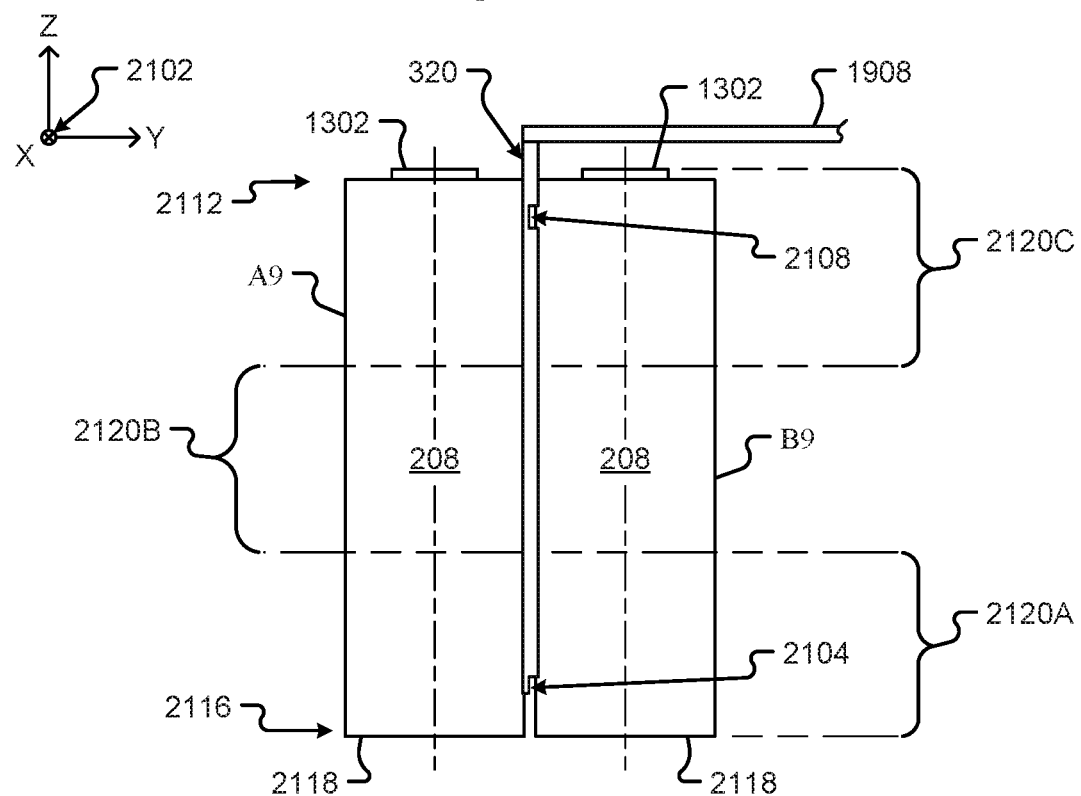
FIG. 21B shows a schematic elevation view of the multiple-zone temperature sensor disposed between battery cells in accordance with embodiments of the present disclosure.

FIGS. 21A and 21B shows a various views of the multiple-zone temperature sensor, or temperature probe 320, disposed a depth in a feature space 1228 between immediately adjacent battery cells 208 in accordance with embodiments of the present disclosure. For sake of clarity, several battery cells 208 and other features associated with the battery module 108 are not shown in FIGS. 21A-B. As shown in FIGS. 21A and 21B, the temperature probe 320 extends a depth of the battery module 108, substantially following a height of the battery cells 208. The height of each battery cell 208 may be defined as a distance extending from an upper portion 2112 (e.g., first terminal area, etc.) of the battery cells 208 to a lower portion 2116 of the battery cells 208. In one embodiment, the overall length of each battery cell 208 may be defined as a distance from the first terminal contact substrate, or contact surface, 1302 of the cell 208 to the base 2118 of the battery cell 208. Although the temperature probe 320 shown in FIGS. 21A and 21B may correspond to any of the temperature probes 320 of the battery module 108, the temperature probe 320 will be described in conjunction with the position shown in the area 2000 illustrated and described in conjunction with FIGS. 19A-20.

As described herein, the temperature probe 320 may include one or more temperature sensors 2104, 2108 disposed along the length, or depth, of the temperature probe 320. In one embodiment, the temperature probe 320 may include a first temperature sensor 2104 disposed at, or adjacent to, a first end of the temperature probe 320 (e.g., adjacent to the lower portion 2116 of the battery cells 208) and a second temperature sensor 2108 disposed at, or adjacent to, an opposite second end of the temperature probe 320 (e.g., adjacent to the upper portion 2112 of the battery cells 208). In some embodiments, the temperature probe 320 may include more or fewer temperature sensors 2104, 2108 than shown in FIGS. 21A-21B. In any event, the temperature sensors 2104, 2108 of the temperature probes 320 may be configured to measure a particular layer, section, or stratum 2120A-C of the battery module 108 at a specific location in the battery module 108.

Referring now to FIG. 21B, a schematic elevation view of the multiple-zone temperature sensor, or temperature probe 320, is shown disposed between battery cells 208 (e.g., cells in the second cell set {A8, A9, B8, B9} in accordance with embodiments of the present disclosure. Battery cells A8 and B8 are not shown in FIG. 21B for sake of clarity in description. In some embodiments, the thermal characteristics of the battery module 108 may be different at one or more locations (e.g., in the XY-plane of the battery module 108) and/or in one or more layers or strata 2120A-C (e.g., in, or along, the Z-axis direction of the battery module 108). For instance, some locations or zones 1906A-D of the battery module 108 may provide, or generate, more heat than other locations or zones 1906A-D of the battery module 108. The differences in heat generated may be caused by cooling characteristics, thermal management limitations, physical construction, location of the battery module 108 relative to heat-producing elements in the vehicle 100, etc., and/or combinations thereof. In some embodiments, the temperature observed at various strata 2120A-C of the battery cells 208 may vary over the height of groups of cells 208. For example, some battery cells 208 under load may become warmer (e.g., generate more heat, etc.) at one end rather than another. This difference in temperature gradient along the height of the cells can cause premature failure and/or a shortened lifecycle for the battery cells 208 and the battery module 108. It is an aspect of the present disclosure, that the first and second temperature sensors 2104, 2108 of each probe disposed in a specific location or zone 1906A-D of the battery module 108, can detect and record a temperature gradient of the cells 208 at the location or zone 1906A-D and provide a gradient map at one or more points in the battery module 108. The temperature gradient measured may illustrate and/or describe the temperature difference between the lower battery cell stratum 2120A and the upper battery cell stratum 2120C and determine whether an operable threshold value has been exceeded by a particular value or amount.

In some embodiments, the value or amount may be used to adjust the cooling plate 224 and/or battery thermal management to return the battery cells 208 and/or battery module 108 to limits within the operable threshold. In one embodiment, the temperature difference between strata 2120A-C is more critical than the overall temperature of the battery cells 208 at a location. For instance, it may be determined that a target differential of approximately 5 degrees Celsius should be maintained to ensure proper operation of the battery cells 208 over time. Maintaining the proper target differential may prevent improper cooling and/or thermal management (e.g., rapid cooling of only one side of the battery cells 208, etc.). As described herein, in response to determining the predetermined target differential has been exceeded, the thermal management system may be instructed (e.g., via the BMS 232 and/or the multiple-zone temperature monitoring system 236, etc.) to cease cooling/heating or begin cooling/heating one or more portions of the battery module 108 to maintain a desired differential and temperature of the battery cells 208 from one to another.

The strata 2120A-C associated with the battery cells 208 in the battery module 108 are shown in the schematic view of FIG. 21B. Although shown divided into three distinct stratum 2120A-C, it should be appreciated that the battery cells 208 may be divided into more or fewer strata 2120A-C. FIG. 21B shows first temperature sensor 2104 of the temperature probe 320 associated with, and configured to measure the temperatures in a region defined at least partially by, the first battery cell stratum 2120A. The first battery cell stratum 2120A may define a region adjacent to the lower portion 2116 of the battery cells 208 in an area or zone 1906A-D. The second temperature sensor 2108 of the temperature probe 320 associated with, and configured to measure the temperatures in a different region defined at least partially by, the third battery cell stratum 2120C. The third battery cell stratum 2120C may define a region adjacent to the upper portion 2112 of the battery cells 208 in an area or zone 1906A-D. In some embodiments, the temperature probe 320 may include a third temperature sensor associated with, and configured to measure the temperatures in a region defined at least partially by, the second battery cell stratum 2120B. In any event, the first temperature sensor 2104 may be spaced apart from the second temperature sensor 2108 such that each sensor 2104, 2108 may be configured to measure the temperatures associated with regions adjacent to respective ends of the battery cells 208 in a location or zone 1906A-D of the battery module 108. Each stratum 2120A-C may extend in the XY-plane of the battery module having a volume defined by a distance in the Z-axis direction. In some embodiment, the strata 2120A-C may overlap with one another.

Figure 22:
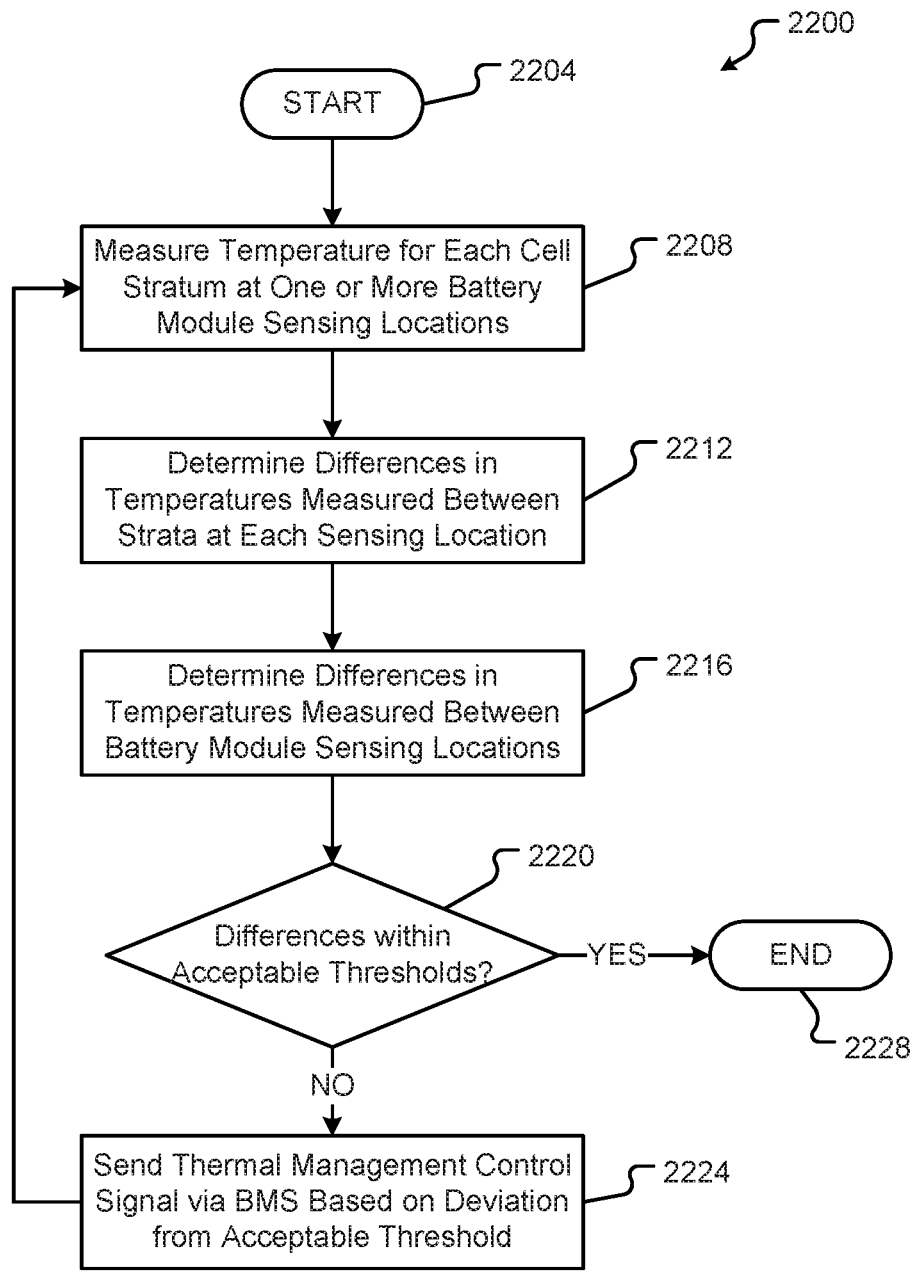
FIG. 22 is a flow diagram of a method for managing a thermal characteristic of the battery module in accordance with embodiments of the present disclosure.

FIG. 22 is a flow diagram of a method 2200 for managing a thermal characteristic of the battery module 108 in accordance with embodiments of the present disclosure. While a general order for the steps of the method 2200 is shown in FIG. 22, the method 2200 can include more or fewer steps or can arrange the order of the steps differently than those shown in FIG. 22. Generally, the method 2200 starts with a start operation 2204 and ends with an end operation 2228. The method 2200 can be executed as a set of computer-executable instructions executed by a computer system (e.g., the BMS 232, MCU 304, etc.) and encoded or stored on a computer readable medium (e.g., memory 308, etc.). Hereinafter, the method 2200 shall be explained with reference to the systems, components, assemblies, devices, environments, etc. described in conjunction with FIGS. 1-21B.

The method 2200 may begin at step 2204 and proceed by measuring the temperature for each battery cell stratum 2120A-C at one or more sensing locations or zones 1906A-D in the battery module 108 (step 2208). These temperatures may be monitored, or measured, via the first and second temperature sensors 2104, 2108 of each temperature probe 320 in the battery module 108. It should be appreciated that the temperatures for each location, made by each temperature probe 320 may be made substantially at the same time, or simultaneously. Additionally or alternatively, it is an aspect of the present disclosure that the measurements may be made continuously, periodically, and/or on-demand (e.g., via the BMS 232, etc.). Among other things, these measurement behaviors may provide a continuous feedback loop and temperature control of the battery module 108 during operation.

Next, the method 2200 continues by determining any differences in temperatures measured between the strata 2120A-C at each sensing location in the battery module 108 (step 2212). For instance, using the temperature measurements made in step 2208, the BMS 232, or other controller, may determine a difference in temperature between the temperature measured by the first temperature sensor 2104 and the temperature measured by the second temperature sensor 2108 at a particular temperature probe 320. This difference may define a currently operating temperature differential for each temperature probe 320, location or zone 1906A-D in the battery module 108.

The method 2200 may proceed by determining any differences in temperatures measured between each sensing location in the battery module 108 (step 2216). In one embodiment, this determination may include determining an average temperature for each location or zone 1906A-D in the battery module 108. The average temperature for each location or zone 1906A-D may be calculated by dividing the sum of the first temperature sensor 2104 measurement and second temperature sensor 2108 measurement, etc., by the number of temperature sensors 2104, 2108 at each temperature probe 320 at a given point in time. In one embodiment, the differences in temperature determined in step 2216 may be based on the differences in temperatures at the same stratum 2120A-C for different locations or zones 1906A-D. For instance, the first temperature sensor 2104 of a first temperature probe at a first location may be compared to the first temperature sensor 2104 of a second temperature probe 320 at a different second location. In any event, the differences determined may define a currently operating temperature differential for each temperature probe 320, location or zone 1906A-D in the battery module 108.

In some embodiments, the temperatures measured at step 2208 and/or the differences between temperatures measured at steps 2212, 2216 may be used to generate a temperature gradient map of the battery module 108 at any location in the module 108. In one embodiment, the temperature map may be generated by the BMS 232 upon receiving the temperature data from each temperature probe 320. The temperature map may be rendered to a display device providing a visual representation of the temperatures at one or more locations in the battery module 108.

At step 2220, the method 2000 may determine whether any of the determined differences (from steps 2212 and/or 2216) are within predetermined acceptable operational thresholds. The predetermined acceptable operational thresholds may be stored in a memory or storage device associated with the BMS 232 and/or some other controller (e.g., local, and/or cloud based, etc.). As provided above, a first predetermined acceptable operational threshold may be associated with the difference in temperatures measured between strata 2120A-C of the battery cells 208. In this instance, an acceptable operational threshold may correspond to a temperature range (e.g., 0-5 degrees Celsius, etc.) determined between the first and second temperature sensors 2104, 2108. The temperature range may correspond to an amount of difference that is acceptable between the upper portion 2112 and lower portion 2116 of the battery cells 208 in the battery module 108. In the event that all of the differences fall within the predetermined acceptable operational thresholds, the method 2200 may end at step 2228 or return to step 2208, providing a continual operational loop.

In the event that one or more of the differences are determined to fall outside of or exceed the predetermined acceptable threshold, the method 2200 may proceed by sending a thermal management control signal configured to control a thermal management system (step 2224). In some embodiments, the thermal management control signal may be sent by a communications module of the BMS 232. The thermal management control signal may include a thermal control command based at least partially on the amount of the difference exceeding the predetermined acceptable threshold determined at step 2220. This thermal management control signal may include instructions that can be interpreted by a thermal management system to control an operating temperature of the cooling plate 224 of the battery module 108. For instance, in the event that a particular location in the battery module exceeds the acceptable operational threshold by 2 degrees Celsius, while other locations are within the acceptable operational threshold, the BMS 232 may send the thermal control signal including information (e.g., command and/or instructions, etc.) to adjust the cooling or heating for the particular location. In some embodiments, the thermal management control command may include instructions configured to control the operating temperature of the cooling plate 224 at an area of the cooling plate 224 adjacent to the particular location differently from an area of the cooling plate adjacent to the other locations (e.g., within the acceptable operational threshold). In one embodiment, the thermal management control command may include instructions configured to only control the operating temperature of the cooling plate 224 at the area of the cooling plate adjacent to the particular location determined to have fallen outside of the acceptable operational threshold.

Once the thermal management control signal is sent, the method 2200 may return to step 2208 and continue to monitor the temperatures at various locations and strata 2120A-C of the battery module 108. Among other things, this approach of monitoring temperatures, sending a thermal management adjustment signal (where necessary), and then continuing to monitor the temperatures of the battery module 108 provides a continual operational and feedback loop.

The exemplary systems and methods of this disclosure have been described in relation to a battery module 108 and a number of battery cells 208 in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a battery module, comprising: a housing comprising a base and sidewalls extending from a periphery of the base, the base and sidewalls defining a first containment cavity having a first volume, wherein the base comprises a plurality of receptacles formed therein, the plurality of receptacles arranged in a battery cell distribution pattern, and wherein each receptacle in the plurality of receptacles is sized to receive a battery cell; an array of battery cells at least partially disposed within the first volume, the array of battery cells comprising base portions disposed in the plurality of receptacles of the housing and arranged in the battery cell distribution pattern providing an open volume surrounding each battery cell in the array of battery cells; and a structural adhesive disposed in the first volume of the housing and around each battery cell in the array of battery cells, the structural adhesive filling the open volume surrounding each battery cell and mechanically coupling each battery cell in the array of battery cells together in a force distribution framework.

Aspects of the above battery module further comprise a cover comprising an upper surface and walls extending from a periphery of the upper surface, the walls and upper surface defining a second containment cavity having a second volume, wherein the cover is attached to the housing along at peripheral contacting surfaces of the walls and sidewalls, wherein upper portions of the array of battery cells are at least partially disposed in the second volume of the cover, wherein the upper portions of the array of battery cells are disposed opposite the base portions of the array of battery cells. Aspects of the above battery module include wherein the cover comprises a plurality of receptacles formed in the upper surface and arranged in the battery cell distribution pattern, wherein each receptacle in the plurality of receptacles formed in the upper surface is sized to receive a battery cell in the array of battery cells. Aspects of the above battery module include wherein the sidewalls of the housing include a flanged surface following at least a portion of the periphery of the base, the flanged surface offset from and substantially parallel to the base, wherein the walls of the cover include a mating flanged surface configured to mate with the flanged surface of the housing. Aspects of the above battery module include wherein the cover is temporarily attached to the housing via an adhesive layer disposed between the flanged surface of the sidewalls and the mating flanged surface of the cover, and wherein each battery cell in the array of battery cells is held in the battery cell distribution pattern via the plurality of receptacles formed in the base of the housing and the upper surface of the cover. Aspects of the above battery module include wherein the structural adhesive contacts surfaces of the sidewalls of the housing and the walls of the cover mechanically joining the housing, cover, and battery cells in the array of battery cells into a unified and integral structure. Aspects of the above battery module further comprise a battery cell retaining form comprising a substantially planar surface including an array of receptacles formed therethrough, the array of receptacles formed in the battery cell distribution pattern and configured to receive at least a portion of the array of battery cells. Aspects of the above battery module further comprise a dielectric fastening sleeve disposed between four adjacent battery cells in the array of battery cells, the dielectric fastening sleeve comprising a hollow shaft extending longitudinally from the upper surface of the cover through the base of the housing to a mount frame, the hollow shaft configured to receive an assembly fastener, wherein the battery module is fastened to a mount frame via the assembly fastener, and wherein a height of the hollow shaft defines a height of the battery module. Aspects of the above battery module include wherein a load or compressive force imparted by overtightening the assembly fastener is resisted by the dielectric fastening sleeve such that the housing and cover of the battery module do not substantially deform.

Embodiments include an energy storage device, comprising: a plurality of energy storage cells arranged in a number of spaced apart linear rows, wherein each energy storage cell in the plurality of storage cells is spaced apart from one another providing an open volume surrounding each energy storage cell; a carrier comprising a plurality of sidewalls and an upper and lower surface, the carrier including an internal void, wherein the plurality of energy storage cells are disposed at least partially within the internal void of the carrier; and a structural adhesive disposed in the internal void of the carrier, the structural adhesive filling the open volume surrounding each energy storage cell and at least a portion of the internal void of the carrier, the structural adhesive mechanically coupling each energy storage cell in the plurality of energy storage cells and the carrier together in a force distribution framework.

Aspects of the above energy storage device further comprise a cover forming the upper surface and a first portion of the plurality of sidewalls, wherein the first portion of the plurality of sidewalls extend from a periphery of the upper surface, the first portion of the plurality of sidewalls and upper surface defining a first volume of the internal void; and a housing forming the lower surface and a second portion of the plurality of sidewalls, wherein the second portion of the plurality of sidewalls extend from a periphery of the lower surface, the second portion of the plurality of sidewalls and upper surface defining a second volume of the internal void, wherein the first portion of the plurality of sidewalls are connected to the second portion of the plurality of sidewalls via mating flanged surfaces following at least a portion of the periphery of the carrier, the flanged surfaces being offset from and substantially parallel to the upper and lower surfaces. Aspects of the above energy storage device further comprising an adhesive layer disposed between and in contact with the mating flanged surfaces of the first and second portions of the plurality of sidewalls. Aspects of the above energy storage device include wherein the structural adhesive contacts surfaces of the plurality of sidewalls in the internal void of the carrier and external surfaces of each energy storage cell in the plurality of energy storage cells mechanically joining the carrier and energy storage cells in the plurality of energy storage cells into a unified and integral structure. Aspects of the above energy storage device include wherein the energy storage devices are one or more of battery cells, capacitors, supercapacitors, and/or ultracapacitors. Aspects of the above energy storage device further comprising: a retaining form gasket comprising a substantially planar surface including receptacles arranged in the number of spaced apart linear rows and formed completely through the retaining form gasket, wherein each receptacle is sized to receive a portion of each energy storage cell in the plurality of energy storage cells in the energy storage device. Aspects of the above energy storage device include wherein the retaining form gasket maintains the plurality of energy storage cells in a position spaced apart from one another, and wherein the retaining form gasket is disposed in the first volume of the internal void. Aspects of the above energy storage device further comprising: a nonconductive standoff disposed between four adjacent energy storage cells in the plurality of energy storage cells, the nonconductive standoff comprising a hollow shaft extending longitudinally from the upper surface of the carrier through the lower surface of the carrier to a surface of a mount frame, the hollow shaft receiving a fastener clamping the carrier and plurality of energy storage cells to the mount frame, wherein a height of the hollow shaft defines a height of the energy storage device, and wherein the structural adhesive contacts a surface of the nonconductive standoff mechanically joining the nonconductive standoff in the unified and integral structure of the energy storage device.

Embodiments include a battery for an electric vehicle, comprising: a plurality of battery modules electrically interconnected with one another, wherein each battery module of the plurality of battery modules comprises: a housing comprising a base and sidewalls extending from a periphery of the base, the sidewalls and base defining a first containment cavity having a first volume, wherein the base comprises a plurality of receptacles formed therein, the plurality of receptacles arranged in a battery cell distribution pattern, and wherein each receptacle in the plurality of receptacles is sized to receive a battery cell; an array of battery cells at least partially disposed within the first volume, the array of battery cells comprising base portions disposed in the plurality of receptacles of the housing and arranged in the battery cell distribution pattern providing an open volume surrounding each battery cell in the array of battery cells; and a structural adhesive disposed in the first volume of the housing and around each battery cell in the array of battery cells, the structural adhesive filling the open volume surrounding each battery cell mechanically coupling each battery cell in the array of battery cells together in a force distribution framework.

Embodiments include a battery module, comprising: an array of battery cells arranged in a battery cell distribution pattern comprising a two-dimensional pattern, the two-dimensional pattern comprising: a first row including a plurality of battery cell positions equispaced substantially in a first spacing along a first linear path extending in a first direction, the first row defining an outermost position for battery cells in the array of battery cells disposed along a first outer edge of the battery module; a second row offset a first distance from the first row in a second direction perpendicular to the first direction, wherein the second row includes a plurality of battery cell positions equispaced substantially in the first spacing along a second linear path extending in the first direction, wherein each of the plurality of battery cell positions in the second row are perpendicularly inline with each of the plurality of battery cell positions in the first row; and a staggered third row offset a second distance from the second row in the second direction, wherein the second distance is less than the first distance, wherein the staggered third row includes a plurality of battery cell positions equispaced substantially in the first spacing along a third linear path extending in the first direction, wherein the plurality of battery cell positions in the staggered third row are offset in the first direction relative to the plurality of battery cell positions in the first and second rows such that the battery cell positions in the staggered third row are not inline with the plurality of battery cell positions in the first and second rows.

Aspects of the above battery module include wherein a first open volume is disposed between adjacent battery cells arranged in the first and second rows, wherein a second open volume is disposed between adjacent battery cells arranged in the second and third rows, and wherein the first open volume is greater than the second open volume. Aspects of the above battery module include wherein the first open volume is configured to receive one or more of a fastener, a fastening sleeve, and/or a standoff of the battery module without contacting any battery cell in the array of battery cells. Aspects of the above battery module include wherein each of the battery cell positions includes a battery cell and wherein each battery cell in the array of battery cells is separated from immediately adjacent battery cells via a spacing open volume. Aspects of the above battery module further comprising: a battery cell location frame, comprising: a substantially planar substrate having a first thickness extending from a first planar surface of the substrate to an opposing second planar surface of the substrate, wherein the substrate comprises a plurality of receptacles formed through the first thickness and arranged in the battery cell distribution pattern, wherein each receptacle in the plurality of receptacles formed through the first thickness is sized to receive a corresponding battery cell of the array of battery cells. Aspects of the above battery module include wherein the battery cell location frame further comprises: a first protrusion extending from the battery cell location frame and offset a first distance from the first planar surface in a direction opposite the second planar surface, wherein the first protrusion is disposed at a periphery of at least one of the plurality of receptacles. Aspects of the above battery module include wherein the battery cell location frame further comprises: a second protrusion extending from the battery cell location frame and offset a second distance from the second planar surface in a direction opposite the first planar surface, wherein the second protrusion is disposed at the periphery of at least one of the plurality of receptacles. Aspects of the above battery module include wherein the first protrusion and/or the second protrusion includes a recess extending from a contact surface of the first and/or second protrusion a depth into the first and/or second protrusion. Aspects of the above battery module further comprising: a housing comprising a cavity having a first volume configured to receive at least a portion of the array of battery cells. Aspects of the above battery module further comprising: a cover comprising a containment cavity having a second volume configured to receive at least a second portion of the array of battery cells, wherein the cover is interconnected to the housing along peripheral contacting surfaces of the housing. Aspects of the above battery module include wherein the battery cell location frame is integrally formed in the housing and/or the cover. Aspects of the above battery module further comprising: a structural adhesive disposed in the first volume of the housing and around each battery cell in the array of battery cells, the structural adhesive filling the spacing open volume and the area surrounding each battery cell mechanically coupling each battery cell in the array of battery cells together in a force distribution framework. Aspects of the above battery module include wherein the structural adhesive is disposed in the recess of the first and/or second protrusion, in an area between the first protrusion and the first planar surface, and/or in an area between the second protrusion and the second planar surface.

Embodiments include an energy storage device, comprising: a plurality of energy storage cells arranged in a cell distribution pattern, the cell distribution pattern comprising: a first terminal array disposed at a first edge of the energy storage device; a second terminal array disposed at a second edge side of the energy storage device, the second edge disposed opposite the first edge; and a center storage cell array disposed between the first and second edges of the energy storage device; wherein the first and second terminal arrays each comprise pairs of energy storage cell positions offset from one another in a first line defining a first direction, the pairs of energy storage cell positions repeating along a linear path running in a second direction perpendicular to the first direction, and wherein the center storage cell array comprises a first row of energy storage cell positions offset in the first and second directions from the pairs of energy storage cell positions in the first and second terminal arrays.

Aspects of the above energy storage device include wherein the center storage cell array comprises a second row of energy storage cell positions offset in the first direction and not offset in the second direction from the pairs of energy storage cell positions in the first and second terminal arrays. Aspects of the above energy storage device include wherein a first open volume is disposed between sets of four immediately adjacent energy storage cells arranged in the first and/or second terminal array, wherein a second open volume is disposed between adjacent energy storage cells arranged in the center storage cell array, and wherein the first open volume is greater than the second open volume. Aspects of the above energy storage device include wherein the first open volume is configured to receive one or more of a fastener, a fastening sleeve, and/or a standoff of the energy storage device without contacting any energy storage cell in the array of energy storage cells. Aspects of the above energy storage device further comprising: an energy storage cell location frame, comprising: a substantially planar substrate having a first thickness extending from a first planar surface of the substrate to an opposing second planar surface of the substrate, wherein the substrate comprises a plurality of receptacles formed through the first thickness and arranged in the cell distribution pattern, wherein each receptacle in the plurality of receptacles formed through the first thickness is sized to receive an energy storage cell of the plurality of energy storage cells. Aspects of the above energy storage device include wherein the energy storage cell location frame further comprises: a first protrusion extending from the energy storage cell location frame and offset a first distance from the first planar surface in a direction opposite the second planar surface, wherein the first protrusion is disposed at a periphery of at least one of the plurality of receptacles; and a second protrusion extending from the energy storage cell location frame and offset a second distance from the second planar surface in a direction opposite the first planar surface, wherein the second protrusion is disposed at the periphery of at least one of the plurality of receptacles, wherein the first protrusion and/or the second protrusion includes a recess extending from a contact surface of the first and/or second protrusion a depth into the first and/or second protrusion.

Embodiments include a battery for an electric vehicle, comprising: a plurality of battery modules electrically interconnected with one another, wherein each battery module of the plurality of battery modules comprises an array of battery cells arranged in a battery cell distribution pattern comprising a two-dimensional pattern comprising: a first row including a plurality of battery cell positions equispaced substantially in a first spacing along a first linear path extending in a first direction, the first row defining an outermost position for battery cells in the array of battery cells disposed along a first outer edge of the battery module; a second row offset a first distance from the first row in a second direction perpendicular to the first direction, wherein the second row includes a plurality of battery cell positions equispaced substantially in the first spacing along a second linear path extending in the first direction, wherein each of the plurality of battery cell positions in the second row are perpendicularly inline with each of the plurality of battery cell positions in the first row; and a staggered third row offset a second distance from the second row in the second direction, wherein the second distance is less than the first distance, wherein the staggered third row includes a plurality of battery cell positions equispaced substantially in the first spacing along a third linear path extending in the first direction, wherein the plurality of battery cell positions in the staggered third row are offset in the first direction relative to the plurality of battery cell positions in the first and second rows such that the battery cell positions in the staggered third row are not inline with the plurality of battery cell positions in the first and second rows.

Embodiments include a tapered busbar, comprising: an electrically-conductive member having a substantially planar portion including a length and a thickness running from a first end of the member to an opposite second end of the member, wherein the member has a first height at the first end and a greater second height the second end; and a terminal connection tab disposed at the second end of the member, wherein the terminal connection tab is integrally formed from the member, wherein the terminal connection tab extends in a direction substantially orthogonal to the substantially planar portion of the member, and wherein the terminal connection tab includes a high voltage interconnection surface that receives at least one terminal connector forming an uninterrupted conductive path running from the first end of the member to the high voltage interconnection surface.

Aspects of the above tapered busbar further comprise: an array of spaced apart electrical interconnection points disposed along the length of the member, wherein each electrical interconnection point is a connection point for a row of series-connected energy storage cells in an energy storage module, and wherein adjacent electrical interconnection points in the array of spaced apart electrical interconnection points correspond to electrically-parallel rows of series-connected energy storage cells in the energy storage module. Aspects of the above tapered busbar include wherein a cross-sectional area of the electrically-conductive member gradually increases in size from a first area at the first end to a larger second area at the second end. Aspects of the above tapered busbar include wherein the first area is sized to provide a current density for a single row of series-connected energy storage cells in the energy storage module, wherein the second area is sized to provide a uniform current density for a plurality of rows of series-connected energy storage cells in the energy storage module, and wherein the uniform current density substantially matches the current density. Aspects of the above tapered busbar include wherein the second height of the member substantially matches a height of the terminal connection tab. Aspects of the above tapered busbar include wherein the high voltage interconnection surface is a substantially planar protrusion extending substantially orthogonal from the terminal connection tab and in a direction following an axis running parallel to the length of the member. Aspects of the above tapered busbar include wherein the substantially planar protrusion includes one or more holes sized to receive the at least one terminal connector. Aspects of the above tapered busbar include wherein the electrically-conductive member includes a plurality of holes running along a portion of the length of the member and through the thickness of the member, and wherein each of the plurality of holes is sized to engage with a fastening feature of a housing associated with the energy storage module.

Embodiments include a battery module, comprising: an array of battery cells arranged in adjacent spaced apart series-connected rows, the rows spaced apart along a length of the battery module running from a first end to an opposite second end of the battery module; and a tapered busbar electrically interconnected to an electrical terminal for the array of battery cells, the tapered busbar comprising: an electrically-conductive member having a substantially planar portion including a length and a thickness running from the first end of the battery module to the second end of the battery module, wherein the member has a first height at the first end and a greater second height the second end, and wherein the length of the member; and a terminal connection tab disposed at the second end of the battery module, wherein the terminal connection tab is integrally formed from the member, wherein the terminal connection tab extends in a direction substantially orthogonal to the substantially planar portion of the member, and wherein the terminal connection tab includes a high voltage interconnection surface that receives at least one terminal connector forming an uninterrupted conductive path running from the electrical interconnection between the tapered busbar and the electrical terminal to the high voltage interconnection surface.

Aspects of the above battery module further comprise: a first battery cell row interconnection busbar in electrical contact with a positive terminal for each row of battery cells in the array of battery cells, wherein the first battery cell row interconnection busbar is disposed along a portion of the length of the battery module on a first terminal side of the battery module; and a second battery cell row interconnection busbar in electrical contact with a negative terminal for each row of battery cells in the array of battery cells, wherein the second battery cell row interconnection busbar is disposed along a portion of the length of the battery module on a second terminal side of the battery module opposite the first terminal side. Aspects of the above battery module include wherein the electrical terminal for the array of battery cells is the first battery cell row interconnection busbar, the first battery cell row interconnection busbar including an array of spaced apart electrical interconnection points disposed along the length of the battery module, wherein each electrical interconnection point is a connection point for a row of battery cells in the spaced apart series-connected rows in the battery module. Aspects of the above battery module wherein adjacent electrical interconnection points in the array of spaced apart electrical interconnection points correspond to electrically-parallel rows of series-connected battery cells in the battery module. Aspects of the above battery module include wherein a cross-sectional area of the electrically-conductive member gradually increases in size from a first area at the first end to a larger second area at the second end. Aspects of the above battery module include wherein the first area is sized to provide a current density for a single row of series-connected energy storage cells in the energy storage module, wherein the second area is sized to provide a uniform current density for a plurality of rows of series-connected energy storage cells in the energy storage module, and wherein the uniform current density substantially matches the current density. Aspects of the above battery module include wherein the second height of the member substantially matches a height of the terminal connection tab, wherein the high voltage interconnection surface is a substantially planar protrusion extending substantially orthogonal from the terminal connection tab and in a direction following an axis running parallel to the length of the battery module. Aspects of the above battery module include wherein the substantially planar protrusion includes one or more holes sized to receive the at least one terminal connector. Aspects of the above battery module further comprise: a battery cell housing including an upper portion disposed adjacent to a first end of each battery cell in the array of battery cells and a lower portion disposed adjacent to an opposite second end of each battery cell in the array of battery cells. Aspects of the above battery module include wherein the electrically-conductive member includes a plurality of holes running along a portion of the length of the member and through the thickness of the member, and wherein each of the plurality of holes is sized to engage with a fastening feature disposed in a side of the upper portion of the battery cell housing. Aspects of the above battery module include wherein the lower portion of the battery cell housing includes two captured terminal connectors for a high voltage positive terminal connection disposed adjacent to the first terminal side and second end of the battery module, wherein the one or more holes in the substantially planar protrusion engage with the two captured terminal connectors, and wherein the two terminal connectors are configured to physically engage with a high voltage power connector for an electric vehicle power system connecting the high voltage power connector to the tapered busbar at two discrete locations.

Embodiments include a battery for an electric vehicle, comprising: a plurality of battery modules electrically interconnected with one another via a high voltage connection, wherein each battery module of the plurality of battery modules comprises: an array of battery cells arranged in adjacent spaced apart series-connected rows, the rows spaced apart along a length of the battery module running from a first end to an opposite second end of the battery module; and a tapered busbar electrically interconnected to an electrical terminal for the array of battery cells, the tapered busbar comprising: an electrically-conductive member having a substantially planar portion including a length and a thickness running from the first end of the battery module to the second end of the battery module, wherein the member has a first height at the first end and a greater second height the second end, and wherein the length of the member; and a terminal connection tab disposed at the second end of the battery module, wherein the terminal connection tab is integrally formed from the member, wherein the terminal connection tab extends in a direction substantially orthogonal to the substantially planar portion of the member, and wherein the terminal connection tab includes a high voltage interconnection surface that receives at least one terminal connector forming an uninterrupted conductive path running from the electrical interconnection between the tapered busbar and the electrical terminal to the high voltage interconnection surface.

Embodiments include a battery cell group interconnection busbar, comprising: an electrically-conductive strip extending a length of a battery module in a first plane, the battery module including a group of battery cells oriented with all positive terminals facing a same direction; a plurality of first terminal strips integrally formed from the electrically-conductive strip and extending in a first direction away from the electrically-conductive strip in the first plane, wherein each of the plurality of first terminal strips are spaced apart from one another along the length of the battery module; and a plurality of second terminal strips integrally formed from the electrically-conductive strip and extending in a second direction away from the electrically-conductive strip in the first plane, wherein each of the plurality of second terminal strips are spaced apart from one another along the length of the battery module, wherein the first and second terminal strips are electrically-conductive forming an electrically-conductive path running from each of the plurality of first terminal strips through the electrically-conductive strip to each of the plurality of second terminal strips.

Aspects of the above battery cell group interconnection busbar further comprising: a first bend region disposed in each of the plurality of first terminal strips, the first bend region disposing a first end of each of the plurality of first terminal strips in a second plane offset from and substantially parallel to the first plane; and a second bend region disposed in each of the plurality of second terminal strips, the second bend region disposing a second end of each of the plurality of second terminal strips in a third plane offset from and substantially parallel to the first plane. Aspects of the above battery cell group interconnection busbar include wherein the second direction away from the electrically-conductive strip is substantially opposite the first direction away from the electrically-conductive strip. Aspects of the above battery cell group interconnection busbar include wherein each of the plurality of first terminal strips and/or each of the plurality of second terminal strips are spaced apart from one another along the length of the battery module substantially matching a spacing of a row of battery cells in the group of battery cells extending the length of the battery module. Aspects of the above battery cell group interconnection busbar further comprising: an expansion feature formed in the electrically-conductive strip and in the first plane between immediately adjacent terminal strips in the plurality of first terminal strips and/or the plurality of second terminal strips spaced apart from one another along the length of the battery module. Aspects of the above battery cell group interconnection busbar include wherein the expansion feature includes a first portion of the electrically-conductive strip extending a first distance in a direction away from an axis running along the first plane and in the first direction and a second portion of the electrically-conductive strip extending the first distance in a direction toward the axis, and wherein the first portion and the second portion are joined forming an uninterrupted and electrically-conductive path between adjacent terminal strips in the plurality of first terminal strips and/or the plurality of second terminal strips spaced apart from one another along the length of the battery module. Aspects of the above battery cell group interconnection busbar include wherein the first portion and the second portion of the expansion feature are arranged together in a substantially flat and U-shaped or V-shaped portion of the electrically-conductive strip. Aspects of the above battery cell group interconnection busbar include wherein the electrically-conductive strip includes a plurality of battery module mount holes arranged between the plurality of first terminal strips and the plurality of second terminal strips along a length of the electrically-conductive strip. Aspects of the above battery cell group interconnection busbar include wherein the first end of each of the plurality of first terminal strips includes a positive terminal contact pad area for a first battery cell in the battery module, and wherein the second end of each of the plurality of second terminal strips includes a negative terminal contact pad area for a different second battery cell in the battery module.

Embodiments include a battery module, comprising: an array of battery cells arranged in adjacent spaced apart series-connected rows, the rows spaced apart along a length of the battery module running from a first end to an opposite second end of the battery module, wherein all positive terminals for each battery cell in the array of battery cells are oriented facing a same direction; and a battery cell group interconnection busbar electrically interconnecting a group of battery cells in the array of battery cells, comprising: an electrically-conductive strip extending a length of the battery module in a first plane; a plurality of first terminal strips integrally formed from the electrically-conductive strip and extending in a first direction away from the electrically-conductive strip in the first plane, wherein each of the plurality of first terminal strips are spaced apart from one another along the length of the battery module; and a plurality of second terminal strips integrally formed from the electrically-conductive strip and extending in a second direction away from the electrically-conductive strip in the first plane, wherein each of the plurality of second terminal strips are spaced apart from one another along the length of the battery module, wherein the first and second terminal strips are electrically-conductive forming an electrically-conductive path running from each of the plurality of first terminal strips through the electrically-conductive strip to each of the plurality of second terminal strips, wherein each of the plurality of first terminal strips are in electrical contact with corresponding positive terminals for battery cells in the group of battery cells, and wherein each of the plurality of second terminal strips are in electrical contact with corresponding negative terminals for battery cells in the group of battery cells.

Aspects of the above battery module further comprising: a first high voltage busbar running along the length of the battery module at a first terminal edge of the battery module; and a first edge terminal battery module interconnection busbar, comprising: a first electrically-conductive member extending along the first terminal edge of the battery module, wherein the first electrically-conductive member includes a first substantially planar strip disposed in the first plane and a plurality of positive terminal contact fingers extending in the first plane in a direction away from the first substantially planar strip, and wherein the first electrically-conductive member includes a first plurality of busbar legs spaced apart from one another and extending in a second plane substantially orthogonal to the first plane. Aspects of the above battery module include wherein each of the plurality of positive terminal contact fingers is in electrical contact with corresponding positive terminals of battery cells disposed along the first terminal edge of the battery module, and wherein each of the first plurality of busbar legs is in electrical contact with points disposed along the first high voltage busbar. Aspects of the above battery module further comprising: a second high voltage busbar running along the length of the battery module at a second terminal edge of the battery module, the second terminal edge disposed opposite the first terminal edge; and a second edge terminal battery module interconnection busbar, comprising: a second electrically-conductive member extending along the second terminal edge of the battery module, wherein the second electrically-conductive member includes a second substantially continuous and planar strip disposed in the first plane and a plurality of negative terminal contact fingers extending in the first plane in a direction away from the second substantially continuous and planar strip, and wherein the second electrically-conductive member includes a second plurality of busbar legs spaced apart from one another and extending in a third plane substantially orthogonal to the first plane and parallel to the second plane. Aspects of the above battery module include wherein each of the plurality of negative terminal contact fingers is in electrical contact with corresponding negative terminals of battery cells disposed along the second terminal edge of the battery module, and wherein each of the second plurality of busbar legs is in electrical contact with points disposed along the second high voltage busbar. Aspects of the above battery module include wherein the battery cell group interconnection busbar, further comprises: a first bend region disposed in each of the plurality of first terminal strips, the first bend region disposing a first end of each of the plurality of first terminal strips in a fifth plane offset from and substantially parallel to the first plane; and a second bend region disposed in each of the plurality of second terminal strips, the second bend region disposing a second end of each of the plurality of second terminal strips in a sixth plane offset from and substantially parallel to the first plane. Aspects of the above battery module include wherein each of the first plurality of busbar legs and/or each of the second plurality of busbar legs are flexible and independently moveable relative to one another in an unaffixed state. Aspects of the above battery module include wherein each of the first plurality of busbar legs and/or each of the second plurality of busbar legs are welded to the first high voltage busbar and/or the second high voltage busbar, respectively. Aspects of the above battery module include herein the battery cell group interconnection busbar further comprises: an expansion feature formed in the electrically-conductive strip and in the first plane between immediately adjacent terminal strips in the plurality of first terminal strips and/or the plurality of second terminal strips spaced apart from one another along the length of the battery module, wherein the expansion feature includes a first portion of the electrically-conductive strip extending a first distance in a direction away from an axis running along the first plane and in the first direction and a second portion of the electrically-conductive strip extending the first distance in a direction toward the axis, wherein the first portion and the second portion are joined forming an uninterrupted and electrically-conductive path between adjacent terminal strips in the plurality of first terminal strips and/or the plurality of second terminal strips spaced apart from one another along the length of the battery module, and wherein the first portion and the second portion of the expansion feature are arranged together in a substantially flat and U-shaped or V-shaped portion of the electrically-conductive strip. Aspects of the above battery module include wherein each battery cell in each series-connected row in the array of battery cells is connected together in order from the first edge terminal battery module interconnection busbar, the battery cell group interconnection busbar, and the second edge terminal battery module interconnection busbar, and wherein the first high voltage busbar serves as a combined positive terminal for the array of battery cells in the battery module and the second high voltage busbar serves as a combined negative terminal for the array of battery cells in the battery module.

Embodiments include a battery for an electric vehicle, comprising: a plurality of battery modules electrically interconnected with one another via a high voltage connection, wherein each battery module of the plurality of battery modules comprises: an array of battery cells arranged in adjacent spaced apart series-connected rows, the rows spaced apart along a length of the battery module running from a first end to an opposite second end of the battery module, wherein all positive terminals for each battery cell in the array of battery cells are oriented facing a same direction; and a battery cell group interconnection busbar electrically interconnecting a group of battery cells in the array of battery cells, comprising: an electrically-conductive strip extending a length of the battery module in a first plane; a plurality of first terminal strips integrally formed from the electrically-conductive strip and extending in a first direction away from the electrically-conductive strip in the first plane, wherein each of the plurality of first terminal strips are spaced apart from one another along the length of the battery module; and a plurality of second terminal strips integrally formed from the electrically-conductive strip and extending in a second direction away from the electrically-conductive strip in the first plane, wherein each of the plurality of second terminal strips are spaced apart from one another along the length of the battery module, wherein the first and second terminal strips are electrically-conductive forming an electrically-conductive path running from each of the plurality of first terminal strips through the electrically-conductive strip to each of the plurality of second terminal strips, wherein each of the plurality of first terminal strips are in electrical contact with corresponding positive terminals for battery cells in the group of battery cells, and wherein each of the plurality of second terminal strips are in electrical contact with corresponding negative terminals for battery cells in the group of battery cells.

Embodiments include a battery cell terminal cover for a battery module, comprising: a substrate having a first surface and a second surface disposed substantially parallel to and offset from the first surface by a thickness, wherein the substrate is substantial planar along a length and width of the battery module; a first terminal aperture passing from the first surface to the second surface through the thickness of the substrate, the first terminal aperture providing an access opening to a first terminal contact surface of a battery cell in the battery module; a second terminal aperture disposed adjacent to the first terminal aperture, the second terminal aperture passing from the first surface to the second surface through the thickness of the substrate, the second terminal aperture providing an access opening to a second terminal contact surface of the battery cell in the battery module, wherein the first terminal aperture is separated from the second terminal aperture a distance by a bridging portion of the substrate; and a protrusion disposed on the bridging portion of the substrate and extending from the second surface of the substrate in a direction away from the substrate and toward the battery cell in the battery module, the protrusion extending beyond the first and second terminal contact surfaces.

Aspects of the above battery cell terminal cover include wherein the protrusion fits in an area between a first terminal of the battery cell and a second terminal of the battery cell blocking a path from the first terminal of the battery cell to the second terminal of the battery cell. Aspects of the above battery cell terminal cover include wherein the protrusion is disposed substantially at a center of the bridging portion of the substrate. Aspects of the above battery cell terminal cover further comprising: a plurality of busbar mount posts disposed on the first surface of the substrate and extending a height distance in a direction away from the substrate, wherein the plurality of busbar mount posts are sized to engage with corresponding holes disposed in one or more cell-to-cell interconnection busbars of the battery module. Aspects of the above battery cell terminal cover include wherein the plurality of busbar mount posts are integrally formed in the substrate, and wherein the substrate and the plurality of busbar mounts are made from a dielectric material. Aspects of the above battery cell terminal cover include wherein at least a portion of each of the plurality of busbar mount posts is structured to deform when subjected to a controlled application of heat and/or ultrasonic vibrations. Aspects of the above battery cell terminal cover include wherein each of the plurality of busbar mount posts is shaped as a truncated cone tapering from a first cone diameter at the first surface to a second cone diameter at the height distance, and wherein the second cone diameter is less than the first cone diameter. Aspects of the above battery cell terminal cover further comprising: a plurality of cover retaining protrusions disposed on the second surface of the substrate and extending a depth distance in a direction away from the substrate, wherein each of the plurality of retaining protrusions is disposed in an area between immediately adjacent battery cells in the battery module. Aspects of the above battery cell terminal cover include wherein each of the plurality of retaining protrusions includes an X-shaped cross-sectional area tapering from a first cross-sectional area at the second surface to a smaller second cross-sectional area at the depth distance. Aspects of the above battery cell terminal cover include wherein the substrate further comprises a plurality of sidewalls extending a distance from a periphery of the substrate in a direction away from the first surface, the substrate and sidewalls defining a battery cell containment cavity, and wherein the depth distance of the plurality of cover retaining protrusions is less than the distance of the plurality of sidewalls.

Embodiments include a battery module, comprising: an array of battery cells arranged in adjacent spaced apart series-connected rows, the rows spaced apart along a length of the battery module running from a first end to an opposite second end of the battery module, wherein all positive terminals for each battery cell in the array of battery cells are oriented facing a same direction; and a battery cell terminal cover, comprising: a substrate having a first surface and a second surface disposed substantially parallel to and offset from the first surface by a thickness, wherein the substrate is substantial planar along the length and a width of the battery module; a first terminal aperture passing from the first surface to the second surface through the thickness of the substrate, the first terminal aperture providing an access opening to a first terminal contact surface of a battery cell in the battery module; a second terminal aperture disposed adjacent to the first terminal aperture, the second terminal aperture passing from the first surface to the second surface through the thickness of the substrate, the second terminal aperture providing an access opening to a second terminal contact surface of the battery cell in the battery module, wherein the first terminal aperture is separated from the second terminal aperture a distance by a bridging portion of the substrate; and a protrusion disposed on the bridging portion of the substrate and extending from the second surface of the substrate in a direction away from the substrate and toward the battery cell in the battery module, the protrusion extending beyond the first and second terminal contact surfaces.

Aspects of the above battery module include wherein the battery cell terminal cover includes terminal access features, comprising the first terminal aperture, the second terminal aperture, and the protrusion, aligned with each battery cell in the array of battery cells. Aspects of the above battery module further comprising: a battery cell group interconnection busbar electrically interconnecting a group of battery cells in the array of battery cells, wherein the battery cell group interconnection busbar includes a substantially planar electrically-conductive strip in contact with the first surface and a plurality of positive terminal strips each including a first bent end extending from the first surface into the first terminal aperture toward the second surface, and wherein the first bent end is in contact with a positive terminal contact surface of a respective battery cell in the array of battery cells. Aspects of the above battery module include wherein the substantially planar electrically-conductive strip includes a plurality of negative terminal strips each including a second bent end extending from the first surface into the second terminal aperture toward the second surface, and wherein the second bent end is in contact with a negative terminal contact surface of a different respective battery cell in the array of battery cells. Aspects of the above battery module include wherein the protrusion of the terminal access features for each battery cell in the array of battery cells fits in an area between a positive terminal of the battery cell and a negative terminal of the battery cell blocking a path from the positive terminal of the battery cell to the negative terminal of the battery cell and isolating each of the plurality of negative terminal strips from moving into contact with any positive terminals for each battery cell in the array of battery cells. Aspects of the above battery module further comprising: a plurality of busbar mount posts disposed on the first surface of the substrate and extending a height distance in a direction away from the substrate, wherein the plurality of busbar mount posts are sized to engage with corresponding holes disposed in the battery cell group interconnection busbar. Aspects of the above battery module include wherein the plurality of busbar mount posts are integrally formed in the substrate, wherein the substrate and the plurality of busbar mounts are made from a dielectric material, wherein at least a portion of each of the plurality of busbar mount posts is structured to deform when subjected to a controlled application of heat and/or ultrasonic vibrations, and wherein when deformed the at least a portion of each of the plurality of busbar mount posts clamps the battery cell group interconnection busbar against the first surface without additional fasteners. Aspects of the above battery module include wherein the substrate further comprises: a plurality of cover retaining protrusions disposed on the second surface of the substrate and extending a depth distance in a direction away from the substrate, wherein each of the plurality of retaining protrusions is disposed in an area between immediately adjacent battery cells in the array of battery cells, wherein each of the plurality of retaining protrusions includes an X-shaped cross-sectional area tapering from a first cross-sectional area at the second surface to a smaller second cross-sectional area at the depth distance. Aspects of the above battery module include wherein the substrate further comprises a plurality of sidewalls extending a distance from a periphery of the substrate in a direction away from the first surface, the substrate and sidewalls defining a battery cell containment cavity, wherein the depth distance of the plurality of cover retaining protrusions is less than the distance of the plurality of sidewalls, and wherein a structural adhesive is dispersed between each of the battery cells in the array of battery cells in the battery cell containment cavity and in contact with each of the plurality of retaining protrusions fastening the array of battery cells and the battery cell terminal cover together.

Embodiments include a battery cell terminal cover for a battery module, comprising: a substantially planar member extending a length and width of the battery module; sidewalls integrally formed at each edge of the member and extending in a first direction substantially orthogonal to the member and forming a battery cell receiving cavity in a volume disposed between the sidewalls and the member; an array of battery cell locations arranged disposed in the battery cell receiving cavity; a positive terminal access hole disposed at each battery cell location in the array of battery cell locations, the positive terminal access hole passing through a thickness of the member from a first surface of the member to a second surface of the member, wherein the second surface of the member is disposed at least partially within the battery cell receiving cavity; a negative terminal access hole disposed adjacent to the positive terminal access hole at each battery cell location in the array of battery cell locations, the negative terminal access hole passing through a thickness of the member from the first surface of the member to the second surface of the member; and a terminal isolation feature protruding from the second surface into the battery cell receiving cavity, wherein the terminal isolation feature is formed in a portion of the member disposed between adjacent positive and negative terminal access holes for each battery cell location in the array of battery cell locations, and wherein the terminal isolation feature extends into an area between a first terminal location for a battery cell in the array of battery cells and a second terminal location for the battery cell in the array of battery cells, the terminal isolation feature isolating a first terminal connection to the first terminal location for the battery cell in the array of battery cells and a second terminal connection to the second terminal location for the battery cell in the array of battery cells.

Embodiments include a multiple-zone battery module temperature monitoring system, comprising: a first temperature probe disposed at a first location of a battery module in an area between three or more immediately adjacent battery cells, wherein the first temperature probe comprises: a first temperature sensor disposed adjacent to a first end of the first temperature probe; and a second temperature sensor spaced apart from the first temperature sensor and disposed adjacent to a second end of the first temperature probe; and a processor that receives data from the first temperature sensor and the second temperature sensor of the first temperature probe, wherein the data from the first temperature sensor corresponds to a temperature measurement in a first region associated with first ends of the three or more immediately adjacent battery cells, and wherein the data from the second temperature sensor corresponds to a temperature measurement in a second region associated with opposite second ends of the three or more immediately adjacent battery cells.

Aspects of the above system further comprising: a second temperature probe disposed at a second location of the battery module spaced apart from the first location in an area between three or more different immediately adjacent battery cells, wherein the second temperature probe comprises: a first temperature sensor disposed adjacent to a first end of the second temperature probe; and a second temperature sensor spaced apart from the first temperature sensor and disposed adjacent to a second end of the second temperature probe. Aspects of the above system include wherein the processor receives data from the first temperature sensor and the second temperature sensor of the second temperature probe, wherein the data from the first temperature sensor of the second temperature probe corresponds to a temperature measurement in a first stratum associated with first ends of the three or more different immediately adjacent battery cells, and wherein the data from the second temperature sensor of the second temperature probe corresponds to a temperature measurement in a second stratum associated with opposite second ends of the three or more different immediately adjacent battery cells. Aspects of the above system include wherein the processor determines a difference between the temperature measurements in the first and second strata of the first temperature probe and determines a difference between the temperature measurements in the first and second strata of the second temperature probe. Aspects of the above system include wherein the first temperature probe includes an elongated housing extending a length from the first end to the second end of the first temperature probe, and wherein the second temperature probe includes an elongated housing extending the length from the first end to the second end of the second temperature probe. Aspects of the above system include wherein the first and second temperature sensors of the first and second temperature probes are disposed at least partially within the elongated housing of the first and second temperature probes, respectively. Aspects of the above system include wherein the first and second temperature probes are electrically interconnected via a flexible printed circuit substrate running from the second ends of the first and second temperature probes to the processor.

Embodiments include a method of monitoring temperatures in multiple-zones in a battery module, comprising: measuring, via a first temperature sensor of a first temperature probe, a temperature of a first battery cell stratum at a first location in a battery module, wherein the first temperature probe is disposed in an area between three or more immediately adjacent battery cells at the first location; measuring, via a second temperature sensor of the first temperature probe, a temperature of a second battery cell stratum at the first location in the battery module, wherein the second temperature probe is disposed in the area between the three or more immediately adjacent battery cells at the first location; and determining, via a processor in communication with the first and second temperature sensors of the first temperature probe, a difference between the temperature measured for the first battery cell stratum and the temperature measured for the second battery cell stratum at the first location, wherein first ends of the three or more immediately adjacent battery cells are disposed at least partially within the first battery cell stratum at the first location, and wherein opposite second ends of the three or more immediately adjacent battery cells are disposed at least partially within the second battery cell stratum at the first location.

Aspects of the above method further comprising: measuring, via a first temperature sensor of a second temperature probe, a temperature of a first battery cell stratum at a second location in the battery module, wherein the second temperature probe is disposed in an area between three or more different immediately adjacent battery cells at the second location; measuring, via a second temperature sensor of the second temperature probe, a temperature of a second battery cell stratum at the second location in the battery module, wherein the second temperature probe is disposed in the area between the three or more different immediately adjacent battery cells at the second location; and determining, via the processor in communication with the first and second temperature sensors of the second temperature probe, a difference between the temperature measured for the first battery cell stratum and the temperature measured for the second battery cell stratum at the second location, wherein first ends of the three or more different immediately adjacent battery cells are disposed at least partially within the first battery cell stratum at the second location, and wherein opposite second ends of the three or more different immediately adjacent battery cells are disposed at least partially within the second battery cell stratum at the second location. Aspects of the above method further comprising: determining, via the processor, at least one of the differences between the temperatures measured for the first and second battery cell strata is an amount exceeding a predetermined temperature difference threshold; determining, via the processor, a thermal management control command based on the amount; and sending, via a communications module, a thermal management control signal including the thermal management control command across a communication bus. Aspects of the above method further comprising: generating, via the processor, a temperature map of the battery module including the temperatures measured at each strata for each location in the battery module. Aspects of the above method include wherein the thermal management control command includes instructions configured to control an operating temperature of a cooling plate of the battery module. Aspects of the above method include wherein the difference between the temperature measured for the first battery cell stratum and the temperature measured for the second battery cell stratum at the first location is determined to exceed the predetermined temperature difference threshold, wherein the difference between the temperature measured for the first battery cell stratum and the temperature measured for the second battery cell stratum at the second location is determined to be within the predetermined temperature difference threshold, and wherein the thermal management control command includes instructions configured to control the operating temperature of the cooling plate at an area of the cooling plate adjacent to the first location differently from an area of the cooling plate adjacent to the second location.

Embodiments include a battery module, comprising: an array of battery cells arranged in adjacent spaced apart series-connected rows, the rows spaced apart along a length of the battery module running from a first end to an opposite second end of the battery module, wherein all positive terminals for each battery cell in the array of battery cells are oriented facing a same direction; and a multiple-zone battery module temperature monitoring system, comprising: a first temperature probe disposed at a first location of the battery module in an area between three or more immediately adjacent battery cells in the array of battery cells, the first temperature probe comprising a first temperature sensor disposed adjacent to a first end of the first temperature probe and a second temperature sensor spaced apart from the first temperature sensor and disposed adjacent to a second end of the first temperature probe; and a processor that receives data from the first temperature sensor and the second temperature sensor of the first temperature probe, wherein the data from the first temperature sensor corresponds to a temperature measurement in a first region associated with first ends of the three or more immediately adjacent battery cells, and wherein the data from the second temperature sensor corresponds to a temperature measurement in a second region associated with opposite second ends of the three or more immediately adjacent battery cells.

Aspects of the above battery module include wherein the multiple-zone battery module temperature monitoring system further comprises: a second temperature probe disposed at a second location of the battery module spaced apart from the first location in an area between three or more different immediately adjacent battery cells in the array of battery cells, the second temperature probe comprising a first temperature sensor disposed adjacent to a first end of the second temperature probe and a second temperature sensor spaced apart from the first temperature sensor and disposed adjacent to a second end of the second temperature probe. Aspects of the above battery module include wherein the processor receives data from the first temperature sensor and the second temperature sensor of the second temperature probe, wherein the data from the first temperature sensor of the second temperature probe corresponds to a temperature measurement in a first stratum associated with first ends of the three or more different immediately adjacent battery cells in the array of battery cells, and wherein the data from the second temperature sensor of the second temperature probe corresponds to a temperature measurement in a second stratum associated with opposite second ends of the three or more different immediately adjacent battery cells in the in the array of battery cells. Aspects of the above battery module include wherein the processor determines a difference between the temperature measurements in the first and second strata of the first temperature probe and determines a difference between the temperature measurements in the first and second strata of the second temperature probe. Aspects of the above battery module include wherein the first temperature probe includes an elongated housing extending a length from the first end to the second end of the first temperature probe, and wherein the second temperature probe includes an elongated housing extending the length from the first end to the second end of the second temperature probe. Aspects of the above battery module include wherein the first and second temperature sensors of the first and second temperature probes are disposed at least partially within the elongated housing of the first and second temperature probes, respectively, and wherein the second ends of the first and second temperature probes are adjacent to positive terminals of the three or more immediately adjacent battery cells in the array of battery cells and the three or more different immediately adjacent battery cells in the array of battery cells, respectively. Aspects of the above battery module include wherein the first and second temperature probes are electrically interconnected via a flexible printed circuit substrate running from the second ends of the first and second temperature probes to the processor.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A multiple-zone battery module temperature monitoring system, comprising:
 a first temperature probe comprising a first probe end spaced apart from a second probe end, wherein the first temperature probe is disposed at a first location of a battery module in an area between three or more immediately adjacent battery cells, wherein the first probe end is arranged adjacent to first ends of the three or more immediately adjacent battery cells, wherein the second probe end is arranged adjacent to second ends of the three or more immediately adjacent battery cells, and wherein the first temperature probe comprises:
  a first temperature sensor that is disposed adjacent to the first probe end and that measures a temperature of a first stratum of the first ends of the three or more immediately adjacent battery cells; and
  a second temperature sensor that is disposed adjacent to the second probe end and that measures a temperature of a second stratum of the second ends of the three or more immediately adjacent battery cells independently of the first temperature sensor; and
 a processor that receives measurement data of the temperature of the first stratum from the first temperature sensor and different measurement data of the temperature of the second stratum from the second temperature sensor of the first temperature probe.

2. The multiple-zone battery module temperature monitoring system of claim 1, further comprising:
 a second temperature probe disposed at a second location of the battery module spaced apart from the first location in an area between three or more different immediately adjacent battery cells, wherein the second temperature probe comprises:
  a first temperature sensor disposed adjacent to a first probe end of the second temperature probe; and
  a second temperature sensor spaced apart from the first temperature sensor and disposed adjacent to a second probe end of the second temperature probe.

3. The multiple-zone battery module temperature monitoring system of claim 2, wherein the processor receives data from the first temperature sensor and the second temperature sensor of the second temperature probe, wherein the data from the first temperature sensor of the second temperature probe corresponds to a temperature measurement in a first stratum associated with first ends of the three or more different immediately adjacent battery cells, and wherein the data from the second temperature sensor of the second temperature probe corresponds to a temperature measurement in a second stratum associated with opposite second ends of the three or more different immediately adjacent battery cells.

4. The multiple-zone battery module temperature monitoring system of claim 3, wherein the processor determines a difference between the temperature measurements in the first and second strata of the first temperature probe and determines a difference between the temperature measurements in the first and second strata of the second temperature probe.

5. The multiple-zone battery module temperature monitoring system of claim 4, wherein the first temperature probe includes an elongated housing extending a length from the first probe end to the second probe end of the first temperature probe, and wherein the second temperature probe includes an elongated housing extending the length from the first probe end to the second probe end of the second temperature probe.

6. The multiple-zone battery module temperature monitoring system of claim 5, wherein the first and second temperature sensors of the first and second temperature probes are disposed at least partially within the elongated housing of the first and second temperature probes, respectively.

7. The multiple-zone battery module temperature monitoring system of claim 6, wherein the first and second temperature probes are electrically interconnected via a flexible printed circuit substrate running from the second probe ends of the first and second temperature probes to the processor.

8. A battery module, comprising:
 an array of battery cells arranged in adjacent spaced apart series-connected rows, the adjacent spaced apart series-connected rows being spaced apart along a length of the battery module running from a first end to an opposite second end of the battery module, wherein all positive terminals for each battery cell in the array of battery cells are oriented facing a same direction; and
 a multiple-zone battery module temperature monitoring system, comprising:

a first temperature probe disposed at a first location of the battery module in an area between three or more immediately adjacent battery cells in the array of battery cells, the first temperature probe comprising a first probe end spaced apart from a second probe end, wherein the first probe end is arranged adjacent to first ends of the three or more immediately adjacent battery cells, wherein the second probe end is arranged adjacent to second ends of the three or more immediately adjacent battery cells, wherein the first probe end comprises a first temperature sensor that measures a temperature of a first stratum of the first ends of the three or more immediately adjacent battery cells, and wherein the second probe end comprises a second temperature sensor that measures a temperature of a second stratum of the second ends of the three or more immediately adjacent battery cells independently of the first temperature sensor; and a processor that receives measurement data of the temperature of the first stratum from the first temperature sensor and different measurement data of the temperature of the second stratum from the second temperature sensor of the first temperature probe.

9. The battery module of claim 8, wherein the multiple-zone battery module temperature monitoring system further comprises:

a second temperature probe disposed at a second location of the battery module spaced apart from the first location in an area between three or more different immediately adjacent battery cells in the array of battery cells, the second temperature probe comprising a first temperature sensor disposed adjacent to a first probe end of the second temperature probe and a second temperature sensor spaced apart from the first temperature sensor and disposed adjacent to a second probe end of the second temperature probe.

10. The battery module of claim 9, wherein the processor receives data from the first temperature sensor and the second temperature sensor of the second temperature probe, wherein the data from the first temperature sensor of the second temperature probe corresponds to a temperature measurement in a first stratum associated with first ends of the three or more different immediately adjacent battery cells in the array of battery cells, and wherein the data from the second temperature sensor of the second temperature probe corresponds to a temperature measurement in a second stratum associated with opposite second ends of the three or more different immediately adjacent battery cells in the in the array of battery cells.

11. The battery module of claim 10, wherein the processor determines a difference between the temperature measurements in the first and second strata of the first temperature probe and determines a difference between the temperature measurements in the first and second strata of the second temperature probe.

12. The battery module of claim 11, wherein the first temperature probe includes an elongated housing extending a length from the first probe end to the second probe end of the first temperature probe, and wherein the second temperature probe includes an elongated housing extending the length from the first probe end to the second probe end of the second temperature probe.

13. The battery module of claim 12, wherein the first and second temperature sensors of the first and second temperature probes are disposed at least partially within the elongated housing of the first and second temperature probes, respectively, and wherein the second probe ends of the first and second temperature probes are adjacent to positive terminals of the three or more immediately adjacent battery cells in the array of battery cells and the three or more different immediately adjacent battery cells in the array of battery cells, respectively.

14. The battery module of claim 13, wherein the first and second temperature probes are electrically interconnected via a flexible printed circuit substrate running from the second probe ends of the first and second temperature probes to the processor.

* * * * *